United States Patent
Sevindik et al.

(10) Patent No.: US 12,407,631 B2
(45) Date of Patent: *Sep. 2, 2025

(54) METHODS AND APPARATUS FOR COORDINATING DATA TRANSMISSION IN A COMMUNICATIONS NETWORK

(71) Applicant: Charter Communications Operating, LLC, St. Louis, MO (US)

(72) Inventors: Volkan Sevindik, Parker, CO (US); Haider Syed, Parker, CO (US); Vijay K. Mechineni, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,543

(22) Filed: Oct. 1, 2023

(65) Prior Publication Data

US 2024/0039872 A1     Feb. 1, 2024

Related U.S. Application Data

(63) Continuation of application No. 17/528,488, filed on Nov. 17, 2021, now Pat. No. 11,805,079.

(51) Int. Cl.
*H04L 49/90*       (2022.01)
*H04L 12/28*       (2006.01)
(Continued)

(52) U.S. Cl.
CPC .......... *H04L 49/90* (2013.01); *H04L 12/2801* (2013.01); *H04W 28/0278* (2013.01); *H04W 88/08* (2013.01)

(58) Field of Classification Search
CPC . H04L 12/2801; H04L 12/2861; H04L 47/30; H04L 49/90; H04W 28/0278; H04W 28/14; H04W 88/08
See application file for complete search history.

(56) References Cited

U.S. PATENT DOCUMENTS

| | | | |
|---|---|---|---|
| 7,606,154 B1 * | 10/2009 | Lee | H04L 47/30 370/232 |
| 9,674,104 B1 * | 6/2017 | Pan | H04L 47/50 |

(Continued)

FOREIGN PATENT DOCUMENTS

EP          4236143 A2 *   8/2023   ............ H04L 1/1841

OTHER PUBLICATIONS

Andreoli-Fang et al., "Mobile-Aware Scheduling for Low Latency Backhaul over DOCSIS", 2017 IEEE 28th Annual International Symposium on Personal, Indoor, and Mobile Radio Communications (PIMRC), Montreal, QC, Canada, Total pp. 6 (Year: 2017).*

(Continued)

*Primary Examiner* — Shah M Rahman
(74) *Attorney, Agent, or Firm* — Straub & Straub; Stephen T. Straub; Michael P. Straub

(57) ABSTRACT

The presentation invention relates to methods and apparatus for coordinating the buffering and transmission of data between a Cable Modem Termination System (CMTS) and a wireless base station. An exemplary method in accordance with one embodiment includes the steps of: receiving a buffer management mode message at a CMTS from a wireless base station; switching, by the CMTS, from operating in a first mode of operation to operating in a second mode of operation with respect to buffering and communicating downlink data to the wireless base station; and while operating in the second mode of operation: (i) creating a plurality of CMTS downlink data buffers, each of the plurality of CMTS downlink data buffers corresponding to a different user equipment device to which the wireless base station is actively providing services; and (ii) storing a received downlink data packet in one of the plurality of CMTS downlink data buffers.

20 Claims, 22 Drawing Sheets

(51) Int. Cl.
  *H04W 28/02* (2009.01)
  *H04W 88/08* (2009.01)

(56) References Cited

U.S. PATENT DOCUMENTS

| | | | |
|---|---|---|---|
| 10,616,810 B2* | 4/2020 | Ryu .................... | H04W 76/27 |
| 2012/0324520 A1* | 12/2012 | Van Deventer ....... | H04L 65/765 |
| | | | 725/109 |
| 2014/0369205 A1* | 12/2014 | Bernstein ............... | H04L 47/10 |
| | | | 370/235.1 |
| 2017/0318492 A1* | 11/2017 | Rönneke ............... | H04W 76/28 |
| 2020/0077161 A1* | 3/2020 | Lohmar ................ | H04L 65/762 |
| 2020/0275464 A1* | 8/2020 | Andreoli-Fang ..... | H04W 72/52 |
| 2020/0404541 A1* | 12/2020 | Mitra ..................... | H04W 4/40 |
| 2022/0030594 A1* | 1/2022 | Sevindik ............... | H04W 72/52 |
| 2022/0060346 A1* | 2/2022 | Sevindik ............. | H04L 12/2801 |
| 2022/0060347 A1* | 2/2022 | Sevindik ............ | H04N 7/17309 |
| 2023/0142266 A1* | 5/2023 | Sevindik .............. | H04L 1/1848 |
| | | | 370/329 |

OTHER PUBLICATIONS

Martin et al., "Cable modem buffer management in DOCSIS networks", 2010 IEEE Sarnoff Symposium, Princeton, NJ, USA, Total pp. 6 (Year: 2010).*

* cited by examiner

| FIGURE 3A |
|---|
| FIGURE 3B |
| FIGURE 3C |

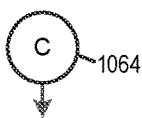

1066

THE WIRELESS BASE STATION SETS A THRESHOLD CAPACITY VALUE FOR EACH CREATED WIRELESS BASE STATION DOWNLINK DATA BUFFER, EACH OF THE THRESHOLD CAPACITY VALUES BEING DETERMINED BASED ON ONE OR MORE OF THE FOLLOWING: (i) DEVICE TYPE OF THE USER EQUIPMENT DEVICE FOR WHICH THE WIRELESS BASE STATION DOWNLINK DATA BUFFER IS TO BE USED, (ii) TRAFFIC LATENCY REQUIREMENTS OF THE USER EQUIPMENT DEVICE FOR WHICH THE WIRELESS BASE STATION DOWNLINK DATA BUFFER IS TO BE USED (E.G., LOW LATENCY REQUIREMENT OR A MAXIMUM AMOUNT OF TRANSMISSION LATENCY REQUIREMENT FOR THE USER ACCOUNT ON WHICH THE USER EQUIPMENT DEVICE IS REGISTERED AND/OR OPERATING, (iii) DATA RATE OR SPEED WITH WHICH AN AMOUNT OF DATA CAN BE TRANSMITTED FROM THE CMTS TO THE WIRELESS BASE STATION, (iv) CHANNEL STATE INFORMATION OF THE WIRELESS DOWNLINK COMMUNICATIONS CHANNEL CONNECTION BETWEEN THE FIRST WIRELESS BASE STATION AND THE USER EQUIPMENT DEVICE FOR WHICH THE WIRELESS BASE STATION DOWNLINK BUFFER IS TO BE USED, (v) CHANNEL CONDITIONS BETWEEN THE WIRELESS BASE STATION AND THE USER EQUIPMENT DEVICE FOR WHICH THE WIRELESS BASE STATION DOWNLINK DATA BUFFER IS TO BE USED, (vi) MODULATION CODING SCHEME USED BY THE WIRELESS BASE STATION TO TRANSMIT DOWNLINK DATA TO THE USER EQUIPMENT DEVICE FOR WHICH THE WIRELESS BASE STATION DOWNLINK DATA BUFFER IS TO BE USED, AND (vii) DISTANCE OF THE USER EQUIPMENT DEVICE FOR WHICH THE WIRELESS BASE STATION DOWNLINK DATA BUFFER IS TO BE USED FROM THE WIRELESS BASE STATION THE WIRELESS BASE STATION SETS A FIRST THRESHOLD CAPACITY VALUE FOR THE FIRST WIRELESS BASE STATION DOWNLINK DATA BUFFER (E.G., 20% WHICH CORRESPONDS TO WHEN 20% OF THE FIRST WIRELESS BASE STATION DOWNLINK DATA BUFFER IS BEING UTILIZED AND 80% OF THE FIRST WIRELESS BASE STATION DOWNLINK DATA BUFFER IS NOT BEING UTILIZED FOR EXAMPLE WHEN THE FIRST DOWNLINK DATA BUFFER SIZE IS 1000 BYTES - 200 BYTES ARE BEING UTILIZED AND 800 BYTES OF THE BUFFER ARE EMPTY OR NOT BEING UTILIZED TO STORE DATA) 1068

THE WIRELESS BASE STATION SETS A SECOND THRESHOLD CAPACITY VALUE FOR THE SECOND WIRELESS BASE STATION DOWNLINK DATA BUFFER (E.G., 40% WHICH CORRESPONDS TO WHEN 40% OF THE SECOND WIRELESS BASE STATION DOWNLINK DATA BUFFER IS BEING UTILIZED AND 60% OF THE SECOND WIRELESS BASE STATION DOWNLINK DATA BUFFER IS NOT BEING UTILIZED – FOR EXAMPLE WHEN THE SECOND DOWNLINK DATA BUFFER SIZE IS 1000 BYTES - 400 BYTES ARE BEING UTILIZED AND 600 BYTES OF THE BUFFER ARE EMPTY OR NOT BEING USED) 1070

THE WIRELESS BASE STATION SETS A THIRD THRESHOLD CAPACITY VALUE FOR A THIRD WIRELESS BASE STATION DOWNLINK DATA BUFFER (E.G., 60% WHICH CORRESPONDS TO WHEN 60% OF THE THIRD WIRELESS BASE STATION DOWNLINK DATA BUFFER IS BEING UTILIZED AND 40% OF THE THIRD WIRELESS BASE STATION DOWNLINK DATA BUFFER IS NOT BEING UTILIZED – FOR EXAMPLE WHEN THE SECOND DOWNLINK DATA BUFFER SIZE IS 1000 BYTES - 600 BYTES ARE BEING UTILIZED AND 400 BYTES OF THE BUFFER ARE EMPTY OR NOT BEING USED) 1072

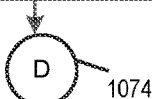

FIGURE 10D

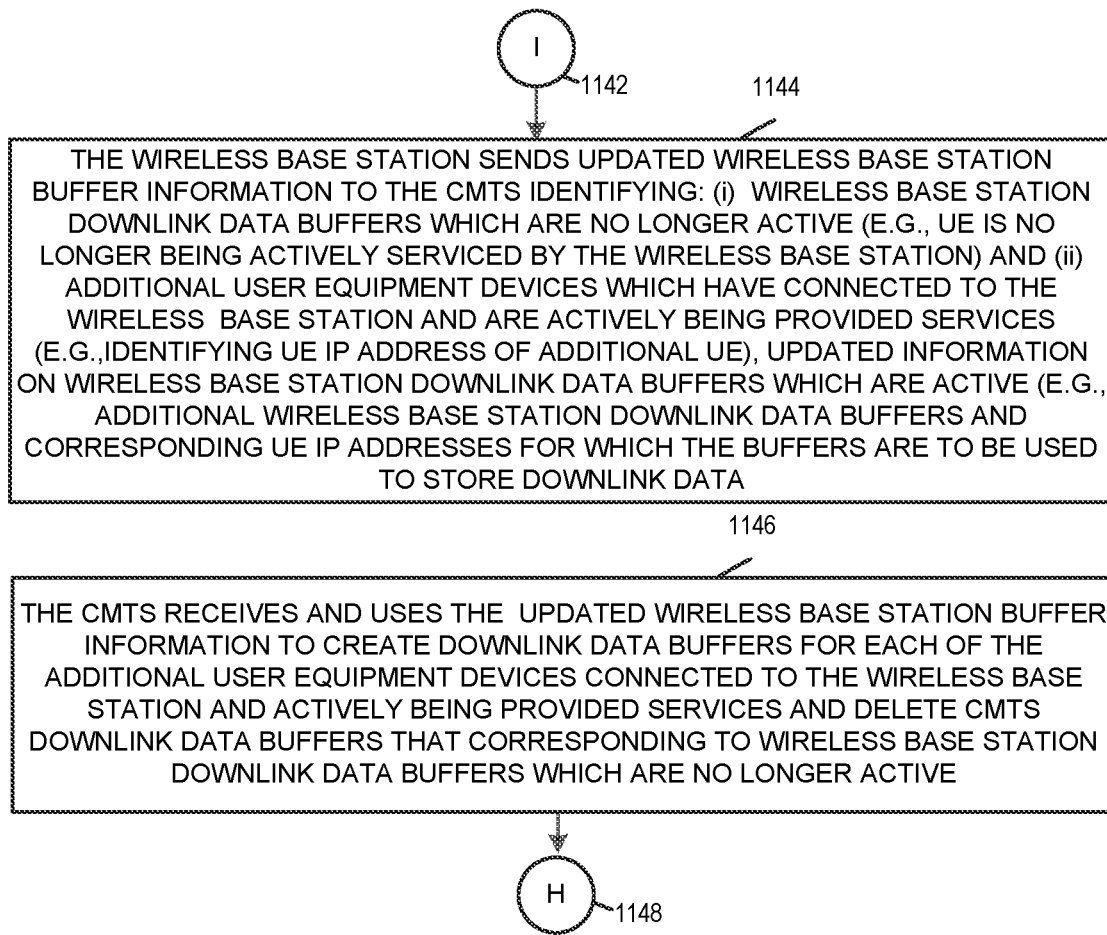

METHODS AND APPARATUS FOR COORDINATING DATA TRANSMISSION IN A COMMUNICATIONS NETWORK

RELATED APPLICATIONS

The present application is a continuation of U.S. patent application Ser. No. 17/528,488 which was filed on Nov. 17, 2021 and which was published as U.S. Patent Application Publication No. US 2023-0155963 A1 on May 18, 2023 which is hereby expressly incorporated by reference in its entirety.

FIELD OF INVENTION

The present invention relates to methods and apparatus for coordinating and/or managing data transfer in communications networks. The present invention is also directed to implementing methods and apparatus in cable systems, e.g., Data Over Cable Service Interface Specification (DOCSIS) networks. The present invention more particularly relates to methods and apparatus for storing and/or buffering data in a cable modem termination system and coordinating the transfer of the stored data to a wireless base station coupled to the cable modem termination system via a cable modem.

BACKGROUND OF THE INVENTION

With the introduction of new 5G networks and 5G wireless networks, e.g., 5G Citizens Broadband Radio Service (CBRS) networks, new wireless base station network configurations and deployment models are being implemented.

Systems in which a wireless base station connects to a core network via a Cable Modem Termination System can result in the loss of user data and the degradation of service quality because while a CMTS has a buffer for each cable modem to which it is providing services, it does not have information about the wireless base station or the users that are connected to the wireless base station.

Each wireless base station connected to a CMTS has different downlink data needs, and each user equipment device/mobile terminal connected to the wireless base station may also have different downlink data needs. Wireless base stations typically maintain a different wireless base station downlink data buffer for each user equipment device/mobile terminal the wireless base station supports. When a wireless base station is unable to send downlink data received from a CMTS for a user device/mobile terminal in a timely manner, then the downlink buffer for the user device/ireless terminal will overflow resulting in data for the user device/mobile terminal being lost. Furthermore, if the CMTS keeps sending downlink data to the wireless base station and the downlink data includes data for the user device/mobile terminal whose wireless base station downlink data buffer is full, the wireless base station will not be able to save this data to its user device data buffer. When the CMTS sends data to the wireless base station for a user device which has a full downlink data buffer, the data will be lost and the service quality will be degraded.

From the foregoing, it should be understood that there is a need for new and/or improved methods and apparatus for storing and/or buffering data in cable modem termination systems and wireless base stations in an efficient and effective manner so as to minimize, reduce and/or eliminate the loss of user downlink data. From the above it should also be understood that there is a need for new and/or improved methods and apparatus for efficiently and effectively communicating and managing the communication of data, e.g., data packets, between devices in communications networks. Furthermore, there is a need for a technology solution to how to communicate downlink data from CMTS devices to wireless base stations without losing user data or degrading the quality of service provided to users of wireless base stations coupled to CMTS devices. There is a further need for new and/or improved methods and apparatus for coordinating the downlink data buffering and data transmission from CMTS devices to wireless base station which take into account expected downlink data traffic for different user devices based on devices types. There is a further need for new and/or improved methods and apparatus for storing and/or buffering and transmitting data in cable modems, cable modem termination systems and wireless base stations in a manner allowing for efficient and fast communication of packets, e.g., TCP data packets, between a cable modem termination system and a wireless base station via a cable modem. There is a further need for new and/or improved methods and apparatus for storing and/or buffering and transmitting data between cable modems, cable modem termination systems and wireless base stations which allows for the dynamic management of the amount of downlink data to be sent for each user equipment device/mobile terminal being serviced by a wireless base station.

SUMMARY OF THE INVENTION

The present invention provides new and/or improved methods and apparatus for coordinating the buffering and transmission of downlink data between a CMTS and wireless base station to which it is providing services. The present invention is also directed to implementing new and/or improved data buffering and transmission apparatus in cable systems, e.g., Data Over Cable Service Interface Specification (DOCSIS) networks which are coupled to wireless base statin. Various features of the present invention relate to methods and apparatus for efficiently and effectively managing and coordinating the buffering and/or transmission of downlink data from a CMTS to a wireless base station. Various embodiments of the present invention also provide new and/or improved methods and apparatus for storing and/or buffering and transmitting data between cable modems, cable modem termination systems and wireless base stations which allows for the dynamic management of the amount of downlink data to be sent from a CMTS to a wireless base station for each user equipment device/mobile terminal being serviced by a wireless base station. Various embodiments include new and/or improved methods and apparatus for communicating downlink data from CMTS devices to wireless base stations without losing user data or degrading the quality of service provided to users of wireless base stations coupled to CMTS devices. Various embodiments of the present invention include new and/or improved methods and apparatus for reducing, minimizing and/or eliminating the loss of user data due to wireless base station downlink buffer overflows. Various embodiments of the present invention solve one or more of the problems discussed above.

In explaining the various features and/or embodiments of the invention, the features and/or embodiments will sometimes be discussed in the context of examples where the wireless base stations are CBSD devices in a CBRS network connected to a cable modem which is connected to CMTS which in turn is connected to a core network. However, such examples are to facilitate understanding of the invention and it should be appreciated that the methods and apparatus are not limited to CBRS embodiments or wireless base stations which are CBSDs.

An exemplary method in accordance with one embodiment of the present invention includes the steps of: receiving a buffer management mode of operation message at a cable modem termination system (CMTS) from a first wireless base station via a cable modem located on a communications path between the CMTS and the first wireless base station; switching, by the CMTS, from operating in a first mode of operation to operating in a second mode of operation with respect to buffering and communicating downlink data to the first wireless base station in response to receiving said buffer management mode of operation message; and while operating in said second mode of operation: (i) creating by the CMTS at the CMTS a plurality of CMTS downlink data buffers, each of said plurality of CMTS downlink data buffers corresponding to a different user equipment device to which the first wireless base station is actively providing services, (ii) receiving at the CMTS a first downlink data packet for one of the user equipment devices to which the first wireless base station is actively providing services; and (iii) storing said received first downlink data packet in one of said plurality of CMTS downlink data buffers.

In some embodiments, the communications method further includes that prior to storing said received first downlink data packet in one of said plurality of CMTS downlink data buffers performing the steps of: (i) determining from the first downlink data packet a user equipment device to which the first downlink data packet has been sent, said user equipment device being one of the user equipment devices to which the first wireless base station is actively providing services; (ii) determining which CMTS downlink data buffer of the plurality of CMTS downlink data buffers corresponds to the determined user equipment device to which the first downlink data packet has been sent; and wherein the step of storing, said received first downlink data packet in one of said plurality of CMTS downlink data buffers includes: storing said first downlink data packet in the determined CMTS downlink data buffer which corresponds to the determined user equipment device to which the first downlink data packet has been sent.

In some embodiments, the one of said plurality of user equipment devices to which the first wireless base station is actively providing services is a first user equipment device, said first user equipment device having a first Internet Protocol address. In some embodiments, the plurality of CMTS downlink data buffers includes a first CMTS downlink data buffer corresponding to the first user equipment device. In some embodiments, the first downlink data packet includes a first IP destination address, said first IP destination address being the first IP address; and the step of storing said first downlink data packet in the determined CMTS downlink data buffer which corresponds to the determined user equipment device to which the first downlink data packet has been sent includes: storing the first downlink data packet in the first CMTS downlink data buffer.

In at least some embodiments, the one of said plurality of user equipment devices to which the first wireless base station is actively providing services is a second user equipment device, said second user equipment device having a second Internet Protocol address. In some such embodiments, the plurality of CMTS downlink data buffers includes a second CMTS downlink data buffer corresponding to the second user equipment device.

In various embodiments, the communications method further includes that while operating in said second mode of operation the following steps are performed: (i) receiving a second downlink data packet at the CMTS, said second downlink data packet including a second destination IP address, said second destination IP address being said second IP address; and (ii) storing by the CMTS the received second downlink data packet in the second CMTS downlink data buffer.

In at least some embodiments, the first wireless base station is a Citizens Broadband Radio Service Device operating as part of a Citizens Broadband Radio Service Network.

In some embodiments, the first mode of operation is a non-buffer management mode of operation and the second mode of operation is a buffer management mode of operation.

In some embodiments, while operating in said first mode of operation with respect to the first wireless base station, the CMTS utilizes a single CMTS downlink buffer for storing all downlink data received from a core network for the first wireless base station without regard to user equipment devices being serviced by the first wireless base station to which the received downlink data is to be sent.

In some embodiments, the method further includes that while operating in said first mode of operation, the CMTS performs the additional steps of: (i) receiving downlink data at the CMTS for two different user equipment devices being serviced by the first wireless base station; (ii) storing said received downlink data in the single downlink data buffer for the first wireless base station; and (iii) transmitting said stored downlink data to the first wireless base station without waiting to receive a buffer status message from the first wireless base station. In some embodiments the buffer management mode of operation message includes information notifying the CMTS that the CMTS is serving a wireless base station.

In some embodiments the method further includes the steps of receiving at the CMTS from the first wireless base station first information, said first information including an identifier for each user equipment device to which the first wireless base station is actively providing services, said first information including a first user equipment device identifier for the first user equipment device to which the first wireless base station is actively providing services. In some embodiments, the first information is included in the buffer management mode of operation message. In some embodiments, the first information is included in one or more messages which are different than said buffer management mode of operation message. In various embodiments, the first information includes one or more of the following: (i) a maximum number of user equipment devices that the first wireless base station is capable of supporting; (ii) number of active downlink data buffers at the first wireless base station, (iii) number of user equipment devices actively being serviced by the first wireless base station, (iv) size of each active downlink data buffer and the corresponding user equipment device for which it is being used to store received downlink data, and (v) Internet Protocol (IP) address of each user equipment device actively being serviced by the first wireless base station.

In some embodiments, the user equipment device IP address is used as a downlink data buffer identifier by the first wireless base station; and the size of each active downlink data buffers is specified in bytes. In various embodiments, the user equipment IP address is used as a downlink data buffer identifier by the CMTS. In at least some embodiments, the first information is included in the buffer management mode of operation message. In some other embodiments, the first information is included in one or more messages which are different than said buffer management mode of operation message. In some embodiments, the first information is included in a plurality of messages which are different from the buffer management mode of operation message, each of said plurality of messages including a portion of the first information corresponding to a single user equipment device.

In some embodiments, the identifier for each user equipment device is an Internet Protocol (IP) address being used by the user equipment device, each of said IP addresses being different. In some embodiments, the first user equipment device identifier is a first IP address being used by the first user equipment device.

In various embodiments, the step of determining from the first downlink data packet to which user equipment device being serviced by the first wireless base station the first downlink data packet has been sent includes: identifying the user equipment device to which the first downlink data packet has been sent based on a destination IP address included in the first downlink data packet and said first information received from said first wireless base station.

In some embodiments, each user equipment device to which the wireless base station is actively providing services has a separate active wireless base station downlink data buffer located at the wireless base station. In some embodiments, the first information further includes a buffer size of each of the active wireless base station downlink data buffers and an indication as to which wireless base station downlink data buffer each buffer size corresponds and an indication as to which user equipment device each active wireless base station downlink data buffer corresponds.

In various embodiments, the method further includes the step of: maintaining the first downlink data packet in buffer storage at the CMTS until the CMTS makes a determination that a first wireless base station active downlink data buffer corresponding to the determined user equipment device to which the first data packet has been sent has available capacity to store the first downlink data packet.

In some embodiments, the method further includes the step of: receiving a buffer status report at the CMTS from the first wireless base station, said buffer status report including information from which the available capacity of the first wireless base station downlink data buffer, being used to store downlink data for the user equipment device corresponding to the determined user equipment device to which the first data packet has been sent, can be determined; and the CMTS makes said determination that the first wireless base station active downlink data buffer corresponding to the determined user equipment device to which the first data packet has been sent has available capacity to store the first data packet based on said received buffer status report.

In some embodiments, the buffer status report includes: (i) the user equipment device IP address of the user equipment device to which the buffer status report corresponds and (ii) the amount of buffer capacity corresponding to the user equipment device IP address currently being used for data storage at the first wireless base station.

In some embodiments, the buffer status report includes: (i) the user equipment device IP address of the user equipment device to which the buffer status report corresponds and (ii) the amount of available downlink buffer capacity corresponding to the user equipment device having the IP address to which the buffer status report corresponds.

In some embodiments, the communications method further includes the step of: determining by the CMTS the amount of available downlink data buffer capacity at the first wireless base station for downlink data for the user equipment device having the IP address to which the buffer status report corresponds includes: subtracting the amount of buffer capacity currently in use by the first wireless base station for the user equipment device having the IP address to which the buffer status report corresponds from the maximum size of the first wireless base station downlink buffer corresponding to the user equipment device having the IP address to which the buffer status report corresponds (e.g., UE 1 has a first IP address, first wireless base station creates a first downlink data buffer corresponds to first IP address to store data received for the UE 1, the first downlink data buffer has a maximum size of 100 bytes, the buffer status report indicates 20 bytes are in use, the CMTS determines that 80 bytes of data can be transmitted to the first wireless base station for UE 1 from the CMTS downlink data buffer for UE 1 corresponding to the first IP address).

In some embodiments, the communications method further includes performing the following steps while the CMTS is operating in said second mode of operation: (i) storing, by the CMTS, downlink data received for each user equipment device actively being serviced by the first wireless base station in a separate CMTS downlink data buffer, each of said separate CMTS downlink data buffers being one of the plurality of CMTS created downlink data buffers; (ii) receiving by the CMTS buffer status messages from the first wireless base station, each of said buffer status messages including information indicating an amount of buffer storage capacity available for storing downlink data corresponding to a specific user equipment device actively being serviced by the first wireless base station; and (iii) scheduling the transmission of stored downlink data to the first wireless base station for the user equipment devices being serviced by the first wireless base station based on the available buffer capacity at the first wireless base station for storing downlink data corresponding to the particular user equipment device.

In some embodiments, the step of scheduling the transmission of stored downlink data to the first wireless base station for the user equipment devices being serviced by the first wireless base station based on the available buffer capacity at the first wireless base station for storing downlink data corresponding to the particular user equipment device includes only scheduling the transmission of downlink data to the first wireless base station for a particular user equipment device in response to receiving a buffer status message including information that the first wireless base station has an amount of buffer capacity available for storing downlink data for the particular user equipment device at the first wireless base station and then only scheduling the transmission of the amount of downlink data equal to or less than the amount of available buffer capacity indicated as being available.

In some embodiments, the method further includes the steps of: establishing a plurality of wireless connections between the first wireless base station and the plurality of user equipment devices to which the first wireless base station is providing wireless services; and creating by the first wireless base station a wireless base station downlink data buffer for each of the plurality of user equipment devices.

In some embodiments, prior to creating a wireless base station downlink data buffer for a user equipment device, the communications method includes the steps of: determining the size of the downlink data buffer to be created for the user equipment device based on one or more of the following: information received from the user equipment device (e.g., device type, hardware version, software version, model type, anticipated traffic type (e.g., downlink dominated traffic type or uplink dominated traffic type), latency requirements, amount of storage space available for buffering downlink data at the first wireless base station, number of user equipment devices being serviced by the first wireless base station, maximum number of user equipment devices which the first wireless base station is capable of servicing, historical amount of downlink data traffic received for the user equipment device; and associating with each created wireless base station downlink data buffer a unique buffer identifier, said wireless base station downlink buffer identifier identifying the user equipment device for which the wireless base station downlink data buffer is to be used.

In various embodiments, the unique wireless base station buffer identifier is a user equipment device IP address. The user equipment device IP address is the user equipment device IP address of the user equipment device for which wireless base station downlink data buffer is to be used to store data.

In some embodiments, the method further includes the step of: setting, by the wireless base station, a threshold capacity value, for each created wireless base station downlink data buffer, said threshold capacity value being based on one or more of the following: (i) user equipment device type of the user equipment for which the wireless base station downlink data buffer is to be used, (ii) traffic latency requirements of the user equipment device for which the wireless base station downlink data buffer is to be used (e.g., low latency requirement or a maximum amount of transmission latency), (iii) data rate or speed with which an amount of data can be transmitted from the CMTS to the first wireless base station, (iv) channel state information of the wireless downlink communications channel between the first wireless base station and the user equipment device for which the wireless base station downlink buffer is to be used, (v) channel conditions between the first wireless base station and the user equipment device for which the wireless base station downlink buffer is to be used, (vi) modulation coding scheme used by the first wireless base station to transmit downlink data to the user equipment device for which the wireless base station downlink data buffer is to be used, and (vii) distance of the user equipment device, for which the wireless base station downlink data buffer is to be used, from the first wireless base station.

In some embodiments, when an amount of downlink data in a wireless base station downlink data buffer falls below its threshold capacity value, the wireless base station generates a buffer status report for the wireless base station downlink data buffer; and transmits the generated buffer status report to the CMTS.

In some embodiments, the buffer status report includes: (i) an indication of the user equipment device for which downlink buffer data is to be sent, and (ii) a maximum amount of downlink data that is to be sent in response to the buffer status report.

In some embodiments, the method further includes the wireless base station dynamically adjusting the threshold capacity value for one or more wireless base station downlink data buffers based on changes in channel state information.

In some embodiments, the step of setting, by the wireless base station, a threshold capacity value, for each created wireless base station downlink data buffer includes determining an optimum threshold capacity for each created wireless base station downlink data buffer based on latency requirements for the data traffic being stored in the particular wireless base station downlink data buffer and which also prevents buffer overflow for the created wireless base station downlink data buffer.

The present invention is also applicable to apparatus and system embodiments wherein one or more devices implement the steps of the method embodiments. In some apparatus embodiments each of the cable modems, cable modem termination systems, wireless base stations, CBSDs, user equipment devices, mobile terminals, cable modem termination system power management devices, resource allocation management devices, SAS devices, and each of the other apparatus/devices/nodes of the system include one or more processors and/or hardware circuitry, input/output interfaces including receivers and transmitters, and a memory. The memory including instructions when executed by one or more of the processors control the apparatus/device of the system to operate to perform the steps and/or functions of various method embodiments of the invention.

The present invention is also applicable to and includes apparatus and systems such as for example, apparatus and systems that implement the steps and/or functions of the method embodiments. For example, a communication system in accordance with one embodiment of the present invention includes a cable modem termination system including: a memory, and a processor that controls the cable modem termination system to perform the following operations: receive a buffer management mode of operation message from a first wireless base station via a cable modem located on a communications path between the CMTS and the first wireless base station; switch, by the CMTS, from operating in a first mode of operation to operating in a second mode of operation with respect to buffering and communicating downlink data to the first wireless base station in response to receiving said buffer management mode of operation message; and while operating in said second mode of operation: (i) create in the CMTS memory by the CMTS a plurality of CMTS downlink data buffers, each of said plurality of CMTS downlink data buffers corresponding to a different user equipment device to which the first wireless base station is actively providing services, (ii) receive at the CMTS a first downlink data packet for one of the user equipment devices to which the first wireless base station is actively providing services; and (iii) store said received first downlink data packet in one of said plurality of CMTS downlink data buffers.

In various embodiments, the processor further controls the cable modem termination system to perform the additional operations of: prior to storing said received first downlink data packet in one of said plurality of CMTS downlink data buffers performing the steps of: (i) determining from the first downlink data packet a user equipment device to which the first downlink data packet has been sent, said user equipment devices being one of the user equipment devices to which the first wireless base station is actively providing services; (ii) determining which CMTS downlink data buffer of the plurality of CMTS downlink data buffers corresponds to the determined user equipment device to which the first downlink data packet has been sent; and wherein the step of storing, said received first downlink data packet in one of said plurality of CMTS downlink data buffers includes: storing said first downlink data packet in the determined CMTS downlink data buffer which corresponds to the determined user equipment device to which the first downlink data packet has been sent.

The present invention is also directed to non-transitory computer readable medium embodiments. In an exemplary non-transitory computer readable medium, the non-transitory computer readable medium includes a first set of computer executable instructions which when executed by a processor of a cable modem termination system cause the cable modem termination system to perform the steps of: receiving a buffer management mode of operation message at a cable modem termination system (CMTS) from a first wireless base station via a cable modem located on a communications path between the CMTS and the first wireless base station; switching, by the CMTS, from operating in a first mode of operation to operating in a second mode of operation with respect to buffering and communicating downlink data to the first wireless base station in response to receiving said buffer management mode of operation message; and while operating in said second mode of operation: (i) creating by the CMTS at the CMTS a plurality of CMTS downlink data buffers, each of said plurality of CMTS downlink data buffers corresponding to a different user equipment device to which the first wireless base station is actively providing services, (ii) receiving at the CMTS a first downlink data packet for one of the user equipment devices to which the first wireless base station is actively providing services; and (iii) storing said received first downlink data packet in one of said plurality of CMTS downlink data buffers.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 10 illustrates the combination of FIGS. 10A, 10B, 10C, 10D, 10E, 10F, 10G, 10H, 10I, and 10J.

FIG. 10D illustrates the steps of the fourth part of an exemplary method in accordance with an embodiment of the present invention.

FIG. 10J illustrates the steps of the tenth part of an exemplary method in accordance with an embodiment of the present invention.

DETAILED DESCRIPTION

Figure 1:
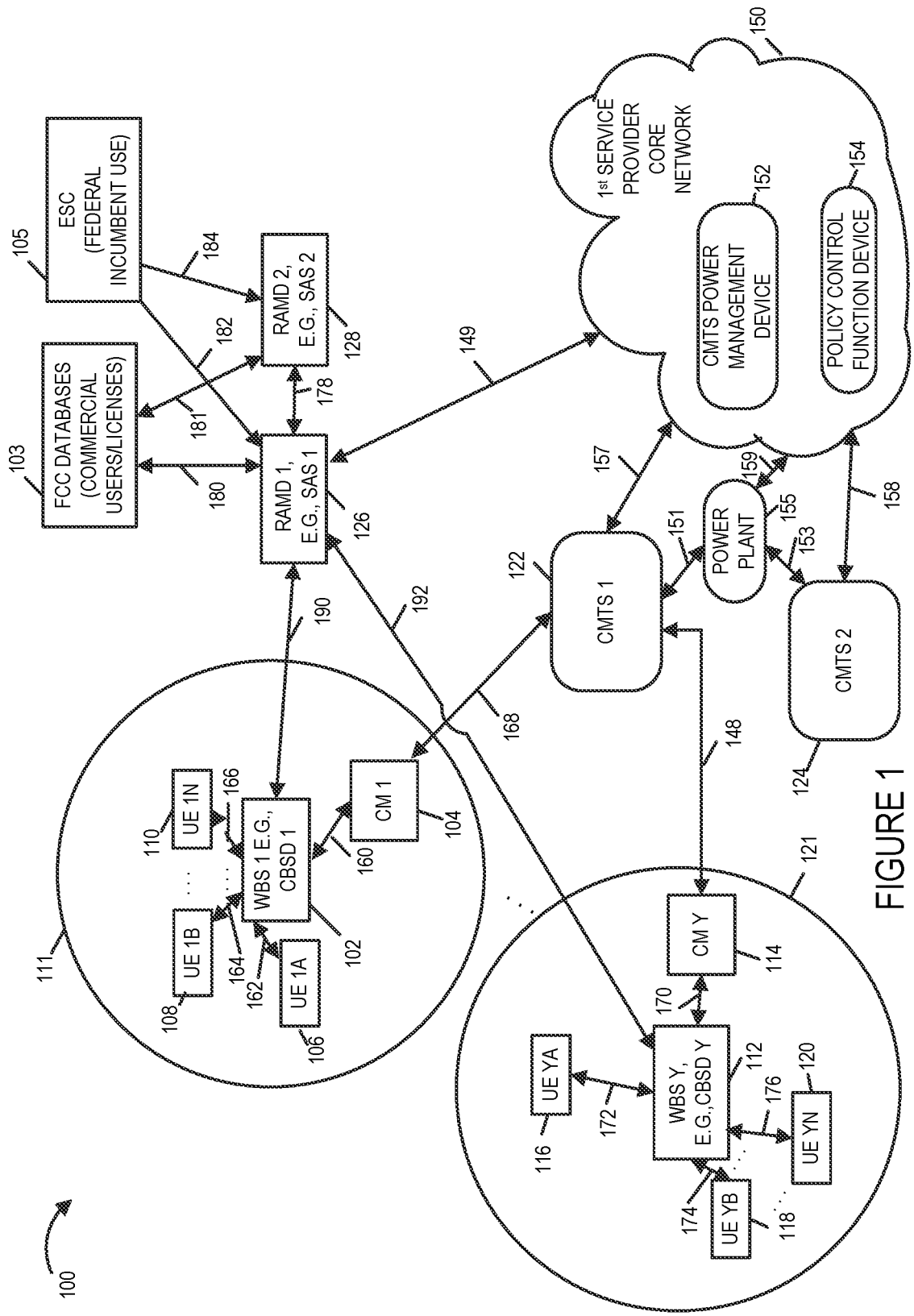
FIG. 1 illustrates an exemplary system in accordance with one embodiment of the present invention.

The current invention is applicable to service providers which operate both wireless and wired networks that use a strand based deployment model for at least a portion of their wireless base stations. In the strand based deployment model, the service provider places or connects one or more of its wireless base stations, e.g., Citizen Broadband Radio Service Devices (CBSDs) in a Citizen Broadband Radio Service (CBRS) network, to the service providers cable strand to provide services, e.g., 5G services, to its subscribers. Each of the wireless base stations, e.g., CBSDs, is connected to a separate cable modem (CM) and each of the separate cable modems is in turn connected to a cable modem termination system (CMTS). The cable modem termination system is a server which typically resides in the service providers data center. The cable modem termination system may be, and in some embodiments, is located in the service provider's cable head end location. The cable modem termination system is connected to the service provider's core network, e.g., a 5G core network. In some embodiments, the service provider's data center and the cable modem termination systems located in the data center are located in the service providers core network.

The cable modem termination system receives data from core network elements and/or devices and will schedule and send this data to the wireless base stations, e.g., CBSDs, via the cable modems to which the CBSDs are connected.

The cable modem termination system typically receives power from a power plant that is owned and/or operated by the service provider. The cable modem termination system provides power to the cable modems to which it is connected. Each cable modem in turn typically provides power to the wireless base station. e.g., CBSD, which is connected to the cable modem. A cable modem in most embodiments supports and/or is connected to a single wireless base station. Each cable modem termination system may, and typically, does support a plurality of cable modems, i.e., has a plurality of cable modems connected to it. In some embodiments, the cable modem termination system supports thousands or tens of thousands of cable modems.

As discussed above, the present invention provides new and/or improved methods and apparatus for managing the buffering and transfer of downlink data from the CMTS device to a wireless base station. Various embodiments of the present invention provide new and/or improved method and apparatus for storing and/or buffering data in cable modems, cable modem termination systems and wireless base stations which allow for the coordination of data transfer from the CMTS to the wireless base station on a per user equipment device basis reducing, minimizing and/or eliminating the loss of user data and/or the degradation of the quality of service provided to users which are provided services via the wireless base station.

In at least some embodiments of the present invention, the cable modem termination system operates in a first and second mode of operation with respect to devices being served by the CMTS. The first mode of operation is a non-buffer management mode of operation. The second mode of operation is a buffer management mode of operation.

When the cable modem termination system is operating in a non-buffer management mode of operation with respect to a cable modem and the device(s) the cable modem is serving, the cable modem termination system includes a single uplink data buffer and single downlink data buffer for the cable modem. While operating in the non-buffer management mode of operation, the cable modem termination system typically does not have any information about the wireless base stations. e.g., CBSDs. or other users that are connected to the wireless base stations, e.g., CBSDs.

When the cable modem termination system is operating in a buffer management mode of operation with respect to a wireless base station connected to the CMTS via a cable modem, the CMTS creates and uses one downlink data buffer for each user equipment device being actively serviced by the wireless base station or for each wireless downlink data buffer identified to the CMTS by the wireless base station. The cable modem termination system includes at least one uplink data buffer for data received from the wireless base station when operating in the buffer management mode of operation. In some embodiments when the CMTS is operating in the buffer management mode of operation, the CMTS creates and uses one uplink data buffer for each user equipment device being serviced by the wireless base station.

In various embodiments of the present invention, the wireless base station sends a buffer status report to the CMTS indicating that the wireless base station has available buffer space for receiving downlink data from the CMTS for a particular user equipment device being serviced by the wireless base station. In the buffer status report the wireless base station identifies the user device, e.g., by the user device's IP address, and an indication of the amount or quantity of downlink data to be sent, e.g., the number of bytes of buffer space available in the wireless base station downlink data buffer being used at the wireless base station to store downlink data for the user equipment device identified in the buffer status report.

For explanatory purposes various features of the current invention will be explained using CBRS wireless network. However, as also explained above a CBRS wireless network is merely an exemplary wireless network in which the invention may be implemented.

Citizens Broadband Radio Service networks are networks that include user equipment devices, e.g., mobile or wireless devices such as for example cell phones, smart phones, laptops, tablets, Citizens Broadband Radio Service Devices (CBSDs) which serve as access points/base stations, and Spectrum Access Systems which are resource allocation management devices that provide spectrum assignments and manage frequency interference through power management of the wireless base stations (CBSDs) transmission power. The Citizens Broadband Radio Service network utilizes 150 megahetz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes resource allocation management devices referred to as Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users such as the General Authorized Access users; ensures secure and reliable transmission of information between the SAS, ESC, and CBSDs; and it facilitates coordination and information exchange between SASs. Through the management of the CBSDs power transmission levels in a geographical area the SAS manages the radio interference in the geographical area.

FIG. 1 illustrates an exemplary communications system 100 having an architecture implemented in accordance with the present invention. This exemplary communications system includes a 5G Citizens Broadband Radio Service wireless network, a core network and a cable network which couples at least some of the wireless base stations of the CBRS network to the core network. In the exemplary embodiment, a first service provider or operator operates and/or owns the cable network, the CBRS wireless network and the core network. The communications system 100 includes a plurality of wireless base stations (WBS 1 (e.g., Citizens Broadband Radio Service Device (CBSD) 1 102, . . . , WBS Y (e.g., CBSD Y) 112, a resource allocation management device (RAMD 1)(e.g., Spectrum Access System device 1 (SAS 1)) 126, a RAMD 2 (e.g., SAS 2) 128, databases of commercial users/licenses (e.g., an FCC Database) 103, an Environmental Sensing Capability (e.g., Federal Incumbent Use) (ESC)) system 105, a plurality of user equipment (UE) devices UE 1A 106, UE 1B 108, . . . , UE IN 110, UE YA 116, UE YB 118, . . . , UE YN 120, Cable Modem (CM) 1 104, . . . , Cable Modem Y 114, Cable Modem Termination System (CMTS) 1 122, Cable Modem Termination System 124, Cable Modem Termination System Power Management Device 152, Policy Control Function Device 154, communications links 148, 149, 156, 158, 160, 162, 164, . . . , 166, 168, 170, 172, 174, . . . , 176, 178, 181, 182, 184, 190, 192, a first cell 111 illustrating the first base station 102's coverage area, a second cell 121 illustrating the second base station 112's coverage area.

The first cell 111 of the network is serviced by the WBS 1 (e.g., CBSD 1) 102. The first cell 111 illustrates the wireless coverage range of WBS 1 (e.g., CBSD 1) 102 at a first time T1. The user equipment devices also sometimes referred to as user terminal devices UE 1A 106, UE 1B 108, . . . , UE IN 110 are located in the first cell 111 and are in active wireless communications with WBS 1 (e.g., CBSD 1) 102. Communications links 162, 164, and 166 illustrate wireless communications channels, e.g., radio channels, over which WBS 1 (e.g., CBSD 1) 102 and UE 1A 106, UE 1B 108, . . . , UE IN 110 communicate respectively.

The second cell 121 of the wireless network is serviced by WBS 2 (e.g., CBSD 2) 112. The second cell 121 illustrates the wireless coverage range of WBS 2 (e.g., CBSD 2) 112 at the first time T1. The user equipment devices UE YA 116, UE YB 118, . . . , UE YN 120, (Y being an integer greater than 1) are located in the second cell 121 and are in communication with WBS 2 (e.g., CBSD 2) 112. Communications links 172, 174, . . . , 176 illustrate wireless communications channels, e.g., radio channels, over which WBS 2 (e.g., CBSD 2) 112 and UE YA 116, UE YB 116, . . . , UE YN 1260 communicate respectively.

Resource Allocation Management Device (RAMD) 1 (e.g., SAS 1) 126 is coupled to Resource Allocation Management Device (RAMD) 2 (e.g., SAS 2) 128 via communications link 178. RAMD 1 (e.g., SAS 1) 126 is coupled to databases 103 via communications link 180. RAMD 2 (e.g., SAS 2) 128 is coupled to databases 103 via communications link 181. ESC system 105 is coupled to RAMD 1 (e.g., SAS 1) 126 and RAMD 2 (e.g., SAS 2) 128 via communications links 182 and 184. The ESC system is used to detect, sense Navy radar operations in the wireless bands utilized for communications in the wireless network, e.g., in CBRS networks the ESC detects or senses Navy radar operation within 3550-3650 MHz near the coasts, and provide notifications over the communications links to RAMD 1 (e.g., SAS 1) 126 and RAMD 2 (e.g., SAS 2) 128. RAMD 1 (e.g., SAS 1) 126 manages the WBS 1 (e.g., CBSD 1) 102 and WBS 2 (e.g., CBSD 2) 112 spectrum allocation and transmission power to limit interference in the wireless network (e.g., CBRS wireless network). RAMD 2 (e.g., SAS 2) 128 manages other wireless base stations (e.g., CBSDs) in the wireless network which are not shown in FIG. 1. Resource Allocation Management Device 1 (e.g., SAS 1) 126 and Resource Allocation Management Device 2 (e.g., SAS 2) 128 communicate and share information regarding the wireless network coverage of the wireless base stations (e.g., CBSDs) each respectively manage and coordinate management of the allocation of spectrum and power transmission levels of wireless base stations (e.g., CBSDs) throughout the wireless network. While only two Resource Allocation Management Devices (e.g., SAS devices) are shown in FIG. 1 it should be understood that additional Resource Allocation Management Devices (e.g., SAS devices) are typically used in the wireless network (e.g., CBRS network). The WBS 1 102, and WBS Y 112 coupled and/or connected to the RAMD 1 126 via the 1st service provider core network 150. The RAMD 1 126 is coupled to the first service provider's core network 150 via communications link 149. The WBS 1 102 is coupled and/or connected to the RAMD 1 126 via communications link 190. WBSD 2 112 is coupled and/or connected to RAMS 1 128 via communications link 192.

WBS 1 102 is coupled and/or connected to cable modem 104 via communications link 160. The cable modem 1 104 is coupled and/or connected to the cable modem termination system 1 122 via communications link 168. The cable modem termination system 1 122 is coupled and/or connected to the first service provider core network 150 via communications link 156. The WBS 1 102 communicates with the devices in the first service provider core network 150 via cable modem 104 and CMTS 1 122.

WBS Y 112 is coupled and/or connected to cable modem CM Y 114 via communications link 170. Cable Modem Y 114 is coupled and/or connected to the cable modem termination system 1 122 via communications link 148. The cable modem termination system 1 122 is coupled and/or connected to the first service provider core network 150 via communications link 156. The WBS Y 112 communicates with the devices in the first service provider core network 150 via the cable modem Y 114 and CMTS 1 122.

WBS 1 102, WBS Y 112, CM 1 104, CM Y 114, CMTS 1 122 and CMTS 2 124 are owned and/or operated by the first service provider.

The nodes, devices and elements of the first service providers core network 150 are interconnected via a communications network including communications links which allow the various nodes, devices and elements of the first service providers core network 150 to communicate and exchange information and data.

The first service provider's core network 150 in this exemplary embodiment is a 5G network including a cable modem termination system power management device 152 and a policy control function device 154. The 5G network core typically also includes a session management function device or node, security gateway function device or node, an access and mobility management function (AMF) device and a user plane function (UPF) device. The cable modem termination system power management device 152 is connected and/or coupled to a power plant system 155 via communications link 159. The cable modem termination system power management device 152 controls the management, supply and/or distribution of power for the cable modem system. The cable modem termination system power management device 152 instructs the CMTS devices in specific regions on whether it needs to reduce power and/or have the cable modems connected to the CMTS devices enter a power savings mode of operation as will be explained herein. In some embodiments, the CMTS power management device 152 is not located in the core network of the first service provider but is instead coupled and/or connected to the core network of the first service provider. In some embodiments, the CMTS power management device 152 is located at the service provider's power plant 155. The service provider's power plant 155 supplies power to the cable modem termination system devices in the cable modem system. In this example, the service provider's power plant 155 supplies power to the cable modem termination system 1 122 and cable modem termination system 2 124 via power cables 151 and 153 respectively as in this example CMTS 1 122 and CMTS 2 124 are located at different locations. In some embodiments the power plant also supplies power to the service providers data center and/or location at which the core network devices are located so that the power plant can provide power to one, some or all of the service providers equipment located in the data center, e.g., CMTS devices, and/or core network, e.g., CMTS power management device, etc.

CMTS 2 124 is coupled to the core network via communications link 158. CMTS 1 and CMTS 2 may be, and in some embodiments are, included in a cable head end system of first service provider.

The cable modems 1 104 and cable modem Y 114 may be, and in some embodiments are DOCSIS compliant cable modems, e.g., DOCSIS compliant 3.0, 3.1, 4.0 cable modems. The particular release/version of DOCSIS is not important to the invention as the messages exchanged between the cable modem and the CMTS devices may be, and in some embodiments are, text messages which can be sent between any CMTS and cable modem.

The communications links 148, 149, 156, 158, 159, 160, 168, 170, 178, 180, 181, 182, 183, 190, and 192 as well as the communications links coupling together the elements of the core network 150 are typically wired communications links or fiber optic cables. The communications links 162, 164, . . . , 166, 172, 174, . . . , 176 are wireless or over the air communications links. It is to be understood that the communication links shown in system 100 are only exemplary and other network configurations and communications links may be employed that couple together the devices, servers, nodes, entities, databases and controllers of the system. Elements or steps with the same reference numbers used in different figures are the same or similar and those elements or steps will not be described in detail again.

While for the sake of simplicity in explaining the invention system 100 only illustrates two active wireless base stations (e.g., CBSD devices), two cable modems, two CMTS devices, two Resource Allocation Management Devices (e.g., SAS devices) and a few UE devices, it will be appreciated that system 100 typically includes a large plurality of active wireless base stations (e.g., CBSDs) in the wireless network supporting a large plurality of UE devices with a large number of the plurality of active wireless base stations being coupled to the core network via a cable modem and CMTS. The cable system includes a large plurality of cable modem termination systems each coupled to a large plurality of cable modems which may be either connected to a single wireless base station, e.g., CBSD, or another device or devices. As previously discussed, the CMTS devices are typically located in the service provider's data center or cable head end and provide high speed data service connections.

The Cable Modem Termination System powers up the cable modems connected to it through the communications link which connects the cable modem termination system to the cable modem. The communications link for example may be, and in some embodiments is, an Ethernet cable. The Cable Modem Termination System also powers the wireless base station, e.g., CBSD, which is connected to the cable modem termination system via the cable modem. That is the Cable Modem Termination System first powers up the cable modem which in turn provides and/or supplies power to the wireless base station, e.g., CBSD. The power passing through the cable modem and communications link connecting the wireless base station and the cable modem. In some embodiments, the communications link coupling the cable modem to the wireless base station is an Ethernet cable.

The cable modems are located on the cable strands to provide the connection to the wireless base stations, e.g., a DOCSIS connection to CBSDs in a CBRS system.

The first service provider will also operate one or more power plants, e.g., power plant 155 in system 100. Each power plant is the power house which provides power for all Cable Modem Termination Systems in the network. Power plants are local power resources that are responsible for the provisioning and distribution of power for all Cable Modem Termination Systems and Cable Modems (through the CMTSs) running in the local region for which the power plant is supplying power. Cables through which power is supplied run from the power plant to Cable Modem Termination Systems.

Figure 2:
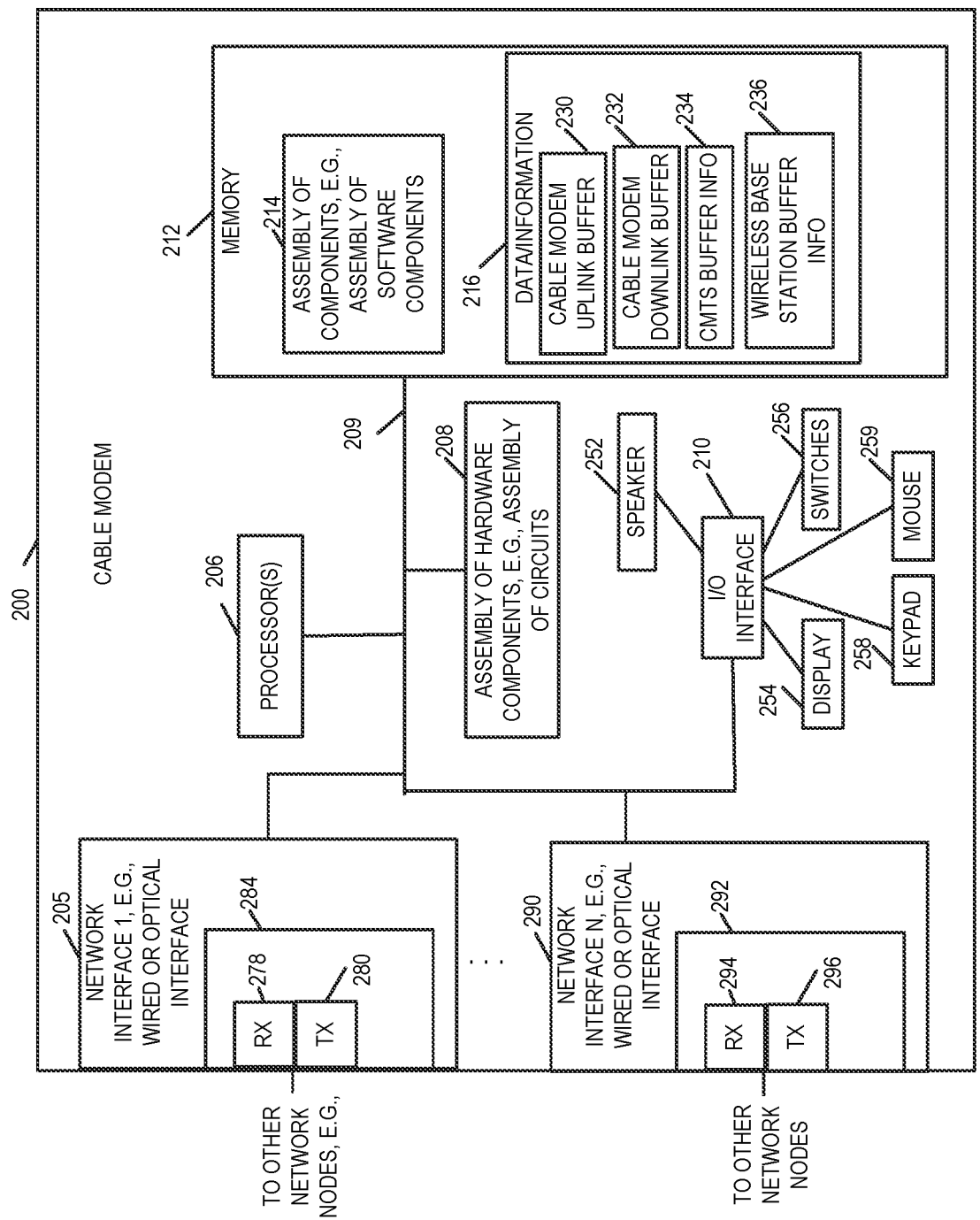
FIG. 2 illustrates details of an exemplary cable modem in accordance with one embodiment of the present invention.

FIG. 2 is a drawing of an exemplary cable modem such as a cable modem 1 104 of system 100. The cable modem 200 includes a plurality of network interfaces 1 205, . . . , network interface N 290, e.g., each being a wired or optical interface, a processor(s) 206 (e.g., one or more processors), e.g., a CPU, an assembly of hardware components 208, e.g., an assembly of circuits, and I/O interface 210 and memory 212 coupled together via a bus 209 over which the various elements may interchange data and information. The cable modem 200 further includes a speaker 252, a display 254, switches 256, keypad 258 and mouse 259 coupled to I/O interface 210, via which the various I/O devices (252, 254, 256, 258, 259) may communicate with other elements (206, 208, 212) of the cable modem 200. Network interface 205 includes a receiver 278 and a transmitter 280. Network interface 290 includes receiver 299 and transmitter 296. In some embodiments, network interfaces 205 and/or 290 includes multiple receivers and transmitters. The network interfaces 205 and 290 are used to communicate with other devices, e.g., wireless base station and/or cable modem termination system. In some embodiments, receiver 278 and transmitter 280 are part of a transceiver 284. In some embodiments, receiver 294 and transmitter 296 are part of a transceiver 292. Memory 212 includes an assembly of component 214, e.g., an assembly of software components, and data/information 216. Data/information 216 typically includes, among other things, cable modem uplink buffer 230, cable modem downlink buffer 232, cable modem termination system buffer information 234, and wireless base station buffer information 236. In some embodiments, the cable modems disclosed in the figures and/or discussed in connection with the various embodiments of the invention are implemented in accordance with cable modem 200. The cable modem has faster processing time than either the CMTS or the wireless base station. The cable modem acts as a pass through device receiving downlink data from the CMTS and communicating or transmitting it to the wireless base station. The cable modem in at least some embodiments uses a single downlink buffer to hold all downlink data and a single uplink buffer to hold all uplink data. In various embodiments, the cable modem transmits downlink data to the wireless base station as it receives and processes it therein avoiding the introduction of additional delay in the transmission of the downlink data from the CMTS to the wireless base station. For example, cable modem 1 (e.g., CM 1 104), . . . , cable modem Y (CM Y 114) of FIG. 1 are implemented in accordance with cable modem 200.

Figures 3, 3A:
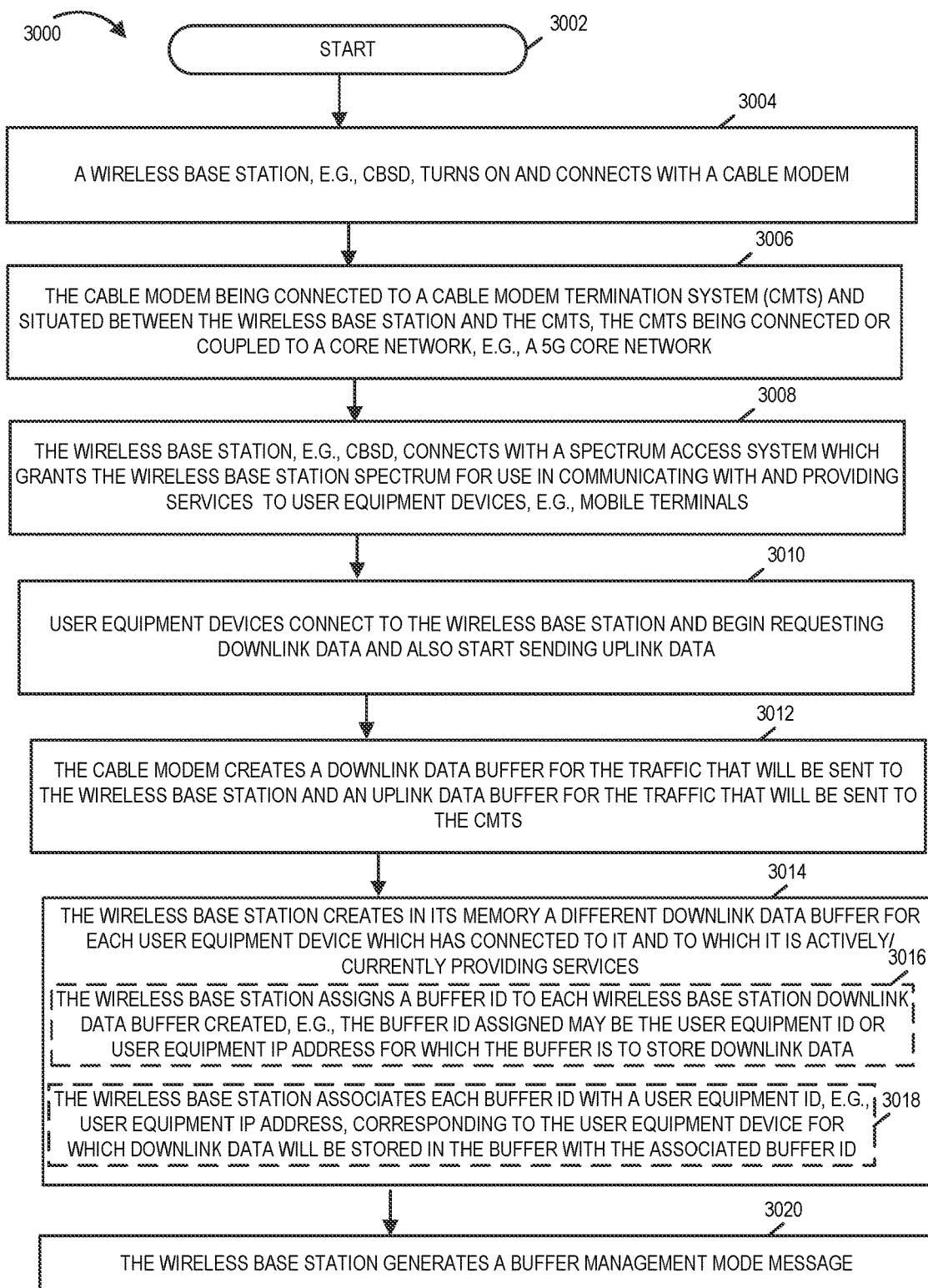
FIG. 3 illustrates the combination of FIGS. 3A, 3B, and 3C.
FIG. 3A illustrates the steps of the first part of an exemplary method in accordance with one embodiment of the present invention.
Figure 3B:
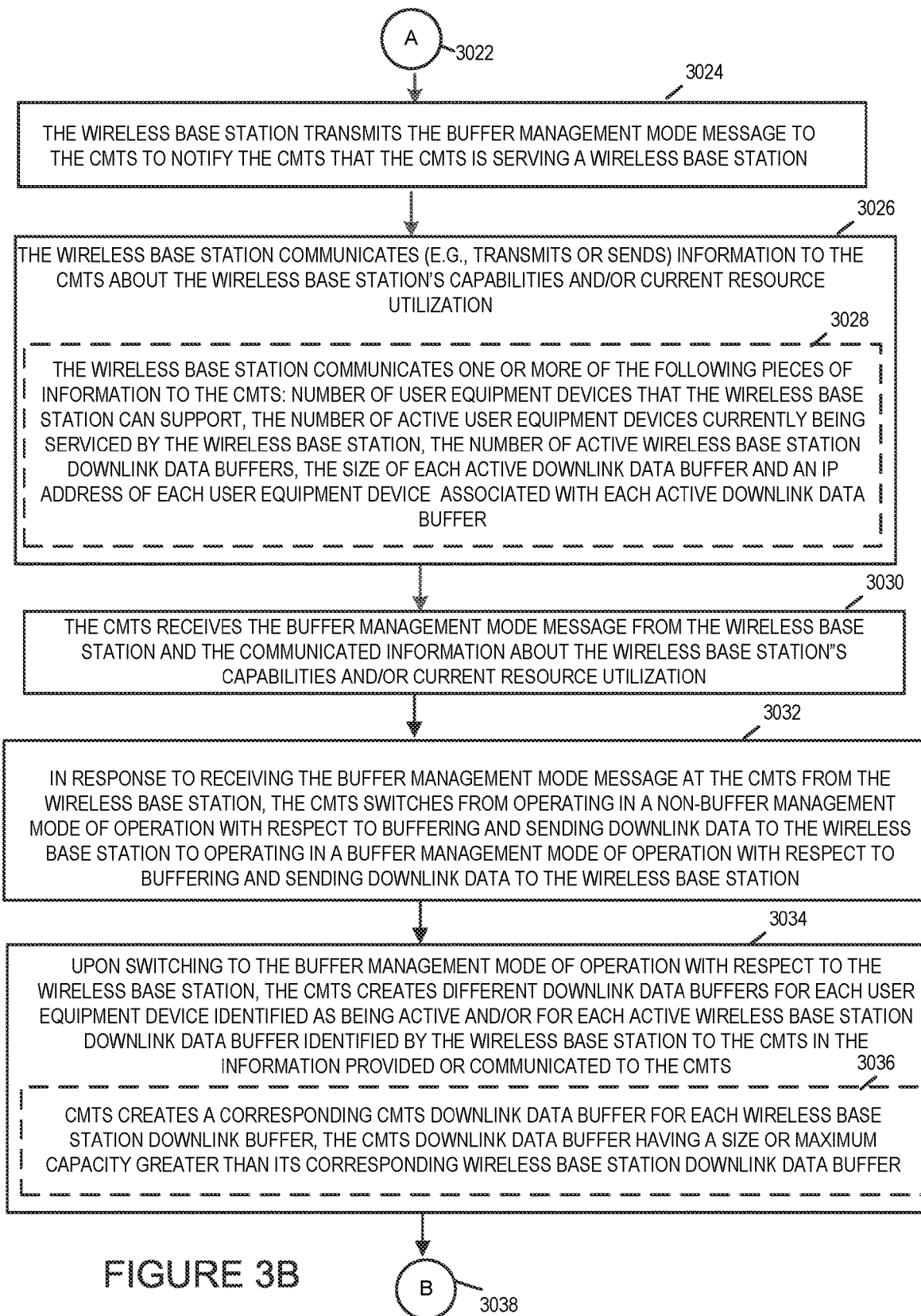
FIG. 3B illustrates the steps of the second part of an exemplary method in accordance with one embodiment of the present invention.
Figure 3C:
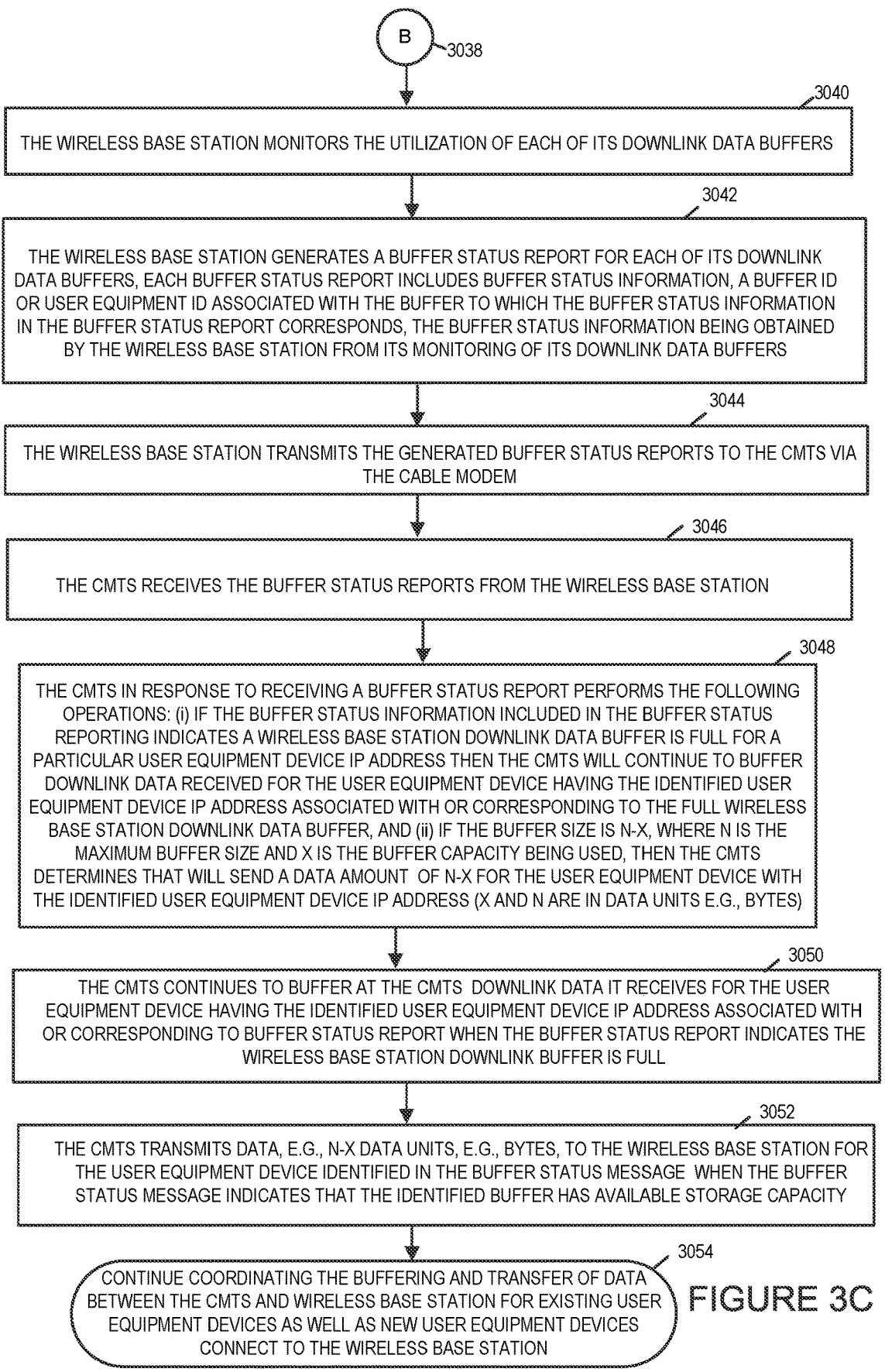
FIG. 3C illustrates the steps of the third part of an exemplary method in accordance with one embodiment of the present

FIG. 3, which comprises the combination of FIGS. 3A, 3B, and 3C illustrates an exemplary method 3000. FIG. 3A illustrates the steps of the first part of an exemplary method 3000 in accordance with one embodiment of the present invention. FIG. 3B illustrates the steps of the second part of an exemplary method 3000 in accordance with one embodiment of the present invention. FIG. 3C illustrates the steps of the third part of an exemplary method 3000 in accordance with one embodiment of the present invention.

For explanatory purposes the exemplary method 3000 will be explained in connection with the exemplary system 100 illustrated in FIG. 1 wherein the wireless network is a CBRS network, wireless base stations are CBSD devices, the resource allocation management devices are SAS devices, the core network is a 5G network, the cable network is a DOCSIS cable network. However, it should be understood that the method may be implemented using other system configurations then those illustrated in FIG. 1. While it will be readily understood that additional steps and signaling are performed in connection with communicating information, messages, and packets between devices, the method 3000 focuses on and discusses the steps and signaling for understanding the invention.

The method 3000 starts in start step 3002 shown on FIG. 3A. Operation proceeds from start step 3002 and proceeds to step 3004.

In step 3004, A wireless base station (e.g., CBSD 1 102 of system 100) turns on and connects with a cable modem (e.g., CM 1 104 of system 100). Operation proceeds from step 3004 to step 3006.

In step 3006, the cable modem is connected to and powered by a cable modem termination system (e.g., CMTS 1 122 of system 100). The cable modem is positioned or situated between the wireless base station and the cable modem termination system. The wireless base station connects to its service providers core network via the cable modem and cable modem termination system. The cable modem termination system being connected to the core network. Operation proceeds from step 3006 to step 3008.

In step 3008, the wireless base station connects with a Spectrum Access System (e.g., SAS 1 126 of system 100). The Spectrum Access System grants spectrum to the CBSD for use in communicating with and providing services to user equipment devices (e.g., UE 1A 106, UE 1B 108, . . . , UE 1N 110 of system 100). Operation proceeds from step 3008 to step 3010.

In step 3010, the user equipment devices connect to the wireless base station and begin requesting downlink data and also start sending uplink data. Operation proceeds from step 3010 to step 3012.

In step 3012, the cable modem creates a downlink data buffer for the traffic that will be sent to the wireless base station and an uplink data buffer for the traffic that will be sent to the CMTS. Operation proceeds from step 3012 to step 3014.

In step 3014, the wireless base station creates in its memory a different downlink data buffer for each user equipment device which has connected to it and to which it is actively/currently providing services. In some embodiments, step 3014 includes one or more sub-steps 3016 and 3018.

In sub-step 3016, the wireless base station during the creation of its downlink data buffers assigns a buffer ID to each downlink data buffer it creates. In some embodiments, the buffer ID is the user ID or user IP address corresponding to the user equipment device for which the downlink data buffer will be used to store data.

In sub-step 3018, the downlink data buffer ID is associated with a user ID, e.g., user equipment device IP address, corresponding to the user equipment device for which downlink data will be stored in the buffer with the associated buffer ID. For example, wireless base station downlink buffer ID=1, is associated with user equipment device IP address 1. The wireless base station stores downlink data for the user equipment device having IP address 1 in its downlink data buffer having downlink data ID=1. Operation proceeds from step 3014 to step 3020.

In some embodiments, the CMTS receives data from the core network to which it is connected, e.g., a 5G core network, and will begin sending or transmitting the data to the wireless base station through the cable modem which connects the wireless base station to the CMTS upon the wireless base station powering up. At this time the CMTS only has a single downlink buffer for storing data destined for the wireless base station.

In step 3020, the wireless base station generates a buffer management mode message. Operation proceeds from step 3020 to step 3024 shown on FIG. 3B via connection node B 3022.

In step 3024, the wireless base station transmits the buffer management mode message to the CMTS to notify the CMTS that the CMTS is serving a wireless base station and is to operate in a buffer management mode of operation with respect to the wireless base station. Operation proceeds from step 3024 to step 3026. Operation proceeds from step 3024 to step 3026.

In step 3026, the wireless base station communicates (e.g., sends or transmits) information to the CMTS about its capabilities and/or current resource utilization (e.g., downlink buffer creation and usage). In some embodiments, step 3026 includes sub-step 3028. In sub-step 3028, the wireless base station communicates one or more of the following pieces of information: number of user equipment devices that the wireless base station can support, the number of active user equipment devices, the number of active downlink data buffer, the size of each active downlink data buffer and an IP address of each user equipment device associated with each active downlink data buffer. In some embodiments, the wireless base station includes this information in the Buffer Management Mode message instead of communicating the information separately from the Buffer Management Mode message. In some embodiments, the wireless base station sends this information about capabilities and/or current utilization in one or more separate messages sent to the CMTS for example one message sent for each wireless base station downlink buffer it creates and an additional message about the wireless base stations overall capabilities, e.g., maximum user equipment devices it can support. Operation proceeds from step 3026 to step 3030.

In step 3030, the CMTS receives the buffer management mode message from the wireless base station and the communicates information about the wireless base station capabilities and/or current resource utilization, e.g., downlink buffer creation and resource usage. Operation proceeds from step 3030 to step 3032.

In step 3032, in response to receiving the Buffer Management Mode message, at the CMTS, from the wireless base station, the CMTS switches from operating in a non-buffer management mode of operation with respect to buffering and sending downlink data to the wireless base station to operating in a buffer management mode of operation with respect to buffering and sending downlink data to the wireless base station. Operation proceeds from step 3032 to step 3034.

In step 3034, upon switching to the buffer management mode of operation with respect to the wireless base station, the CMTS creates different downlink data buffers for each user equipment device identified as being active and/or for each active wireless base station downlink data buffer identified by the wireless base station to the CMTS in the information provided or communicated to the CMTS. In some embodiments, step 3034 includes sub-step 3036. In sub-step 3036, the CMTS creates a corresponding CMTS downlink data buffer for each wireless base station downlink data buffer. The created CMTS downlink data buffer having a size or maximum capacity which is greater than its corresponding wireless base station downlink data buffer. In this way, the CMTS and wireless base station will each have a downlink data buffer for each user equipment device being actively/currently serviced by the wireless base station. The CMTS downlink data buffer having a greater capacity the corresponding wireless base station downlink data buffer. Operation proceeds from step 3034 via connection node B 3038 to step 3040 shown on FIG. 3C.

In step 3040, the wireless base stations monitors the utilization of each of its downlink data buffers. Operation proceeds from step 3040 to step 3042.

In step 3042, the wireless base station generates a buffer status report for each of its downlink data buffers. Each buffer status report includes buffer status information, a buffer ID or the user equipment ID associated with the buffer to which the buffer status information corresponds (e.g., user equipment IP address). The buffer status information for each downlink buffer is based on information obtained by the wireless base station from its monitoring of its downlink data buffers. In some embodiments, the buffers status information indicates the amount of buffer capacity available for storage in the corresponding wireless base station downlink data buffer (e.g., the current utilization of the downlink data buffer or the amount of the buffer not currently utilized (e.g., number of bytes available to store downlink data). transmits buffer status reports about each its downlink data buffers. Operation proceeds from step 3042 to step 3044.

In step 3044, the wireless base station transmits the generated buffer status reports to the CMTS via the cable modem. Operation proceeds from step 3044 to step 3046.

In step 3046, the CMTS receives the buffer status reports from the wireless base station. It should be noted that while buffer status reports for each buffer can be sent at one time, they are typically sent as separate buffer status reports at different time. For example, the time when a buffer status report may be sent may be, and in some embodiments is, based on the available storage capacity in the individual wireless base station downlink data buffer as will be discussed in further detail below. Operation proceeds from step 3046 to step 3048.

In step 3048, the CMTS upon receiving or in response to receiving a buffer status report performs the following operations: (i) if the buffer status information indicates a downlink data buffer is full at the wireless base station for a particular user equipment device IP address, then the CMTS will continue to buffer downlink data received for the user equipment device having the identified IP address associated with or corresponding to the full wireless base station downlink data buffer (the downlink data, e.g., coming from the 5G core network for the user equipment device with the identified IP address, being buffered at the CMTS in the CMTS downlink data buffer created for the identified IP address associated with the full CBSD downlink data buffer), and (ii) if the buffer size is N-X, where N is the maximum buffer size, and X is the buffer capacity currently being used, then the CMTS determines that it will send a data amount of N-X data units (e.g., bytes) for the user equipment device with the identified IP address. In various embodiments, N and X are positive integers and expressed in terms of bytes. The CMTS only sends data to the wireless base station for a user equipment device in response to receiving a buffer status report from the wireless base station indicating that the wireless base station downlink data buffer for the user equipment device has available storage capacity. Operation proceeds from step 3048 to step 3050.

In step 3050, the CMTS continues to buffer at the CMTS downlink data it receives for the user equipment device having the identified user equipment device IP address associated with or corresponding to the buffer status when the buffer status report indicates that the wireless base station downlink buffer for the user equipment device is full.

In step 3052, the CMTS transmits data, e.g., N-X data units (e.g., bytes) to the wireless base station for the user equipment device identified in the buffer status message when the buffer status message indicates that the identified buffer has available storage capacity. Operation proceeds from step 3052 to step 3054.

In step 3054, the process of coordinating the buffering and transfer of data between the CMTS and the wireless base station continues for the existing user equipment devices as well as for new user equipment devices which connect to the wireless base station. In response to the connection of new user equipment, the wireless base station will create a wireless base station downlink buffer and assign it a buffer ID and then communicate information about the newly connected and active user equipment device and the created buffer to the CMTS as previously described. The coordination of the buffering and transmission of downlink data between the CMTS and the wireless base station will be achieved through buffer status messages as previously described.

In some embodiments, the wireless base station only sends buffer status reports when a threshold amount of buffer capacity is available in a downlink data buffer. For example, the wireless base station may, and in some embodiments does, set a first threshold value for a first wireless base station downlink data buffer for a first user equipment device having a first user equipment IP address. The wireless base station sets a second threshold value for a second wireless base station downlink data buffer for a second user equipment device having a second user IP address. The first and second threshold values being different for example, the first threshold value being 80% and the second threshold value being 70%. In such situation the wireless base station monitors its first and second downlink data buffers. When the wireless base station detects through its monitoring that its first downlink data buffer has 20% or less of its buffer capacity being used for data storage and 80% or more of its capacity is available to store data, the wireless base station generates a first buffer status report and transmits it to the CMTS indicating that first buffer corresponding or associated with the first equipment device IP address has available buffer capacity and indicates the amount of buffer storage space available. The CMTS in response to receiving the first buffer status message determines the amount of data to send to the wireless base station for the first user equipment IP address based on the received buffer status information. The amount determined being less than an amount which would overflow the wireless base station's first downlink data buffer (e.g., if N=1000 bytes for the first wireless base station downlink buffer and X=200 bytes, the amount determined would be 800 bytes or less. In various embodiments, it is N−X=1000 bytes−200 bytes=800 bytes). Similarly, when the wireless base station detects through its monitoring that its second downlink data buffer has 30% or less of its buffer capacity being used for data storage and 70% or more of its capacity is available to store data, the wireless base station generates a second buffer status report and transmits it to the CMTS indicating that second buffer corresponding to or associated with the second equipment device IP address has available buffer capacity and indicates the amount of buffer storage space available. The CMTS in response to receiving the second buffer status message determines the amount of data to send to the wireless base station for the second user equipment IP address based on the received buffer status information. The amount determined being less than an amount which would overflow the wireless base station's second downlink data buffer (e.g., if N=1000 bytes for the second wireless base station downlink buffer and X=300 bytes, the amount determined would be 700 or less. In various embodiments, it is N−X=1000 bytes−300 bytes=700 bytes). This process is continuously repeated to coordinate the buffer and transfer of downlink data from the CMTS to the wireless base station for each of the user equipment devices being actively serviced by the wireless base station. This coordination of the buffering and transfer of data between the CMTS and the wireless base station minimizing, reducing, and/or eliminating the loss of downlink data for user equipment devices being serviced by the wireless base station.

The wireless base station in many embodiments determines the downlink buffer size for each user equipment devices based on one or more of the following user equipment device type, estimated amount of downlink traffic for the user equipment device, the channel conditions of the connection between the CBSD and the user equipment device, the coding scheme used for transmitting data from the CBSD to the user equipment device, the number of active user equipment devices being serviced by the CBSD, and the distance from the CBSD to the user equipment.

The wireless base station in many embodiments determines the buffer capacity threshold values for each user equipment device downlink data buffer based on one or more of the following: user equipment device type, estimated amount of downlink traffic for the user equipment device, the channel conditions of the connection between the CBSD and the user equipment device, the coding scheme used for transmitting data from the CBSD to the user equipment device, the number of active user equipment devices being serviced by the CBSD, and the distance from the CBSD to the user equipment.

In various embodiments, when the CMTS operates in anon-buffer management mode of operation with respect to the wireless base station, the CMTS buffers all data that it receives, e.g., from the core network, for user equipment devices connected to the wireless base station in one CMTS downlink data buffer for the wireless base station. In at least some such embodiments, when the CMTS operates in the non-buffer management mode of operation, the CMTS transmits the downlink data to the wireless base station without regard to whether the wireless base station downlink buffers for individual user equipment devices are full or not. In some embodiments, when the CMTS is operating in the non-buffer management mode of operation buffers all downlink data it receives for the wireless base station (e.g., all downlink data received for user equipment devices connected to the wireless base station) in a first in first out (FIFO) buffer. The CMTS transmitting the received downlink data to the wireless base station in the order it was received at the CMTS.

While the method 3000 illustrated in FIG. 3, has been explained with respect to a single CMTS serving a single wireless base station, it is to be understood that each CMTS may, and in some embodiments do, serve a plurality of wireless base stations. Each of the wireless base stations in such a system would send a buffer management mode message to the CMTS notifying the CMTS that it is a wireless base station and/or requesting that the CMTS switch to the buffer management mode operation with respect to the wireless base station sending the buffer management mode of operation message. For example, with respect to system 100 one or more of the WBS 1 102, . . . , WBS Y 112, and in many embodiments all, transmit a buffer management mode message to the CMTS 1 122 notifying the CMTS 1 122 that they are wireless base stations and/or requesting that the CMTS 1 122 switch to a buffer management mode of operation with respect to the wireless base stations which sent the buffer management mode of operation messages.

Additionally, it is to be understood as shown in system 100 that each network may, and typically does, include multiple CMTS.

Figure 4:
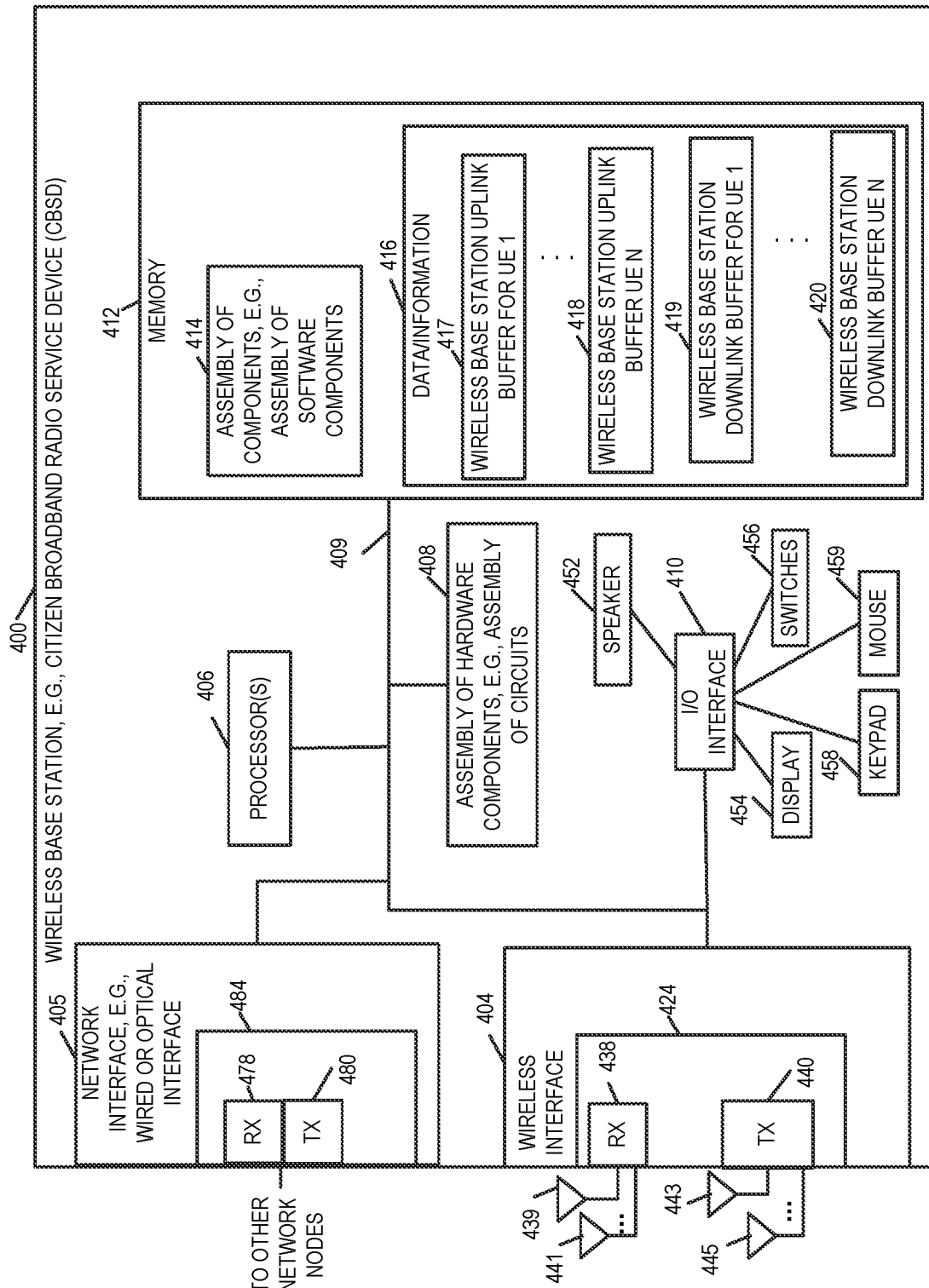
FIG. 4 illustrates details of an exemplary wireless base station (e.g., Citizens Broadband Radio Service Device (CBSD)) in accordance with one embodiment of the present invention.

FIG. 4 is a drawing of an exemplary wireless base station (WBS) (e.g., Citizens Broadband Radio Service Device (CBSD), LTE base station, 4G base station, 5G base station) 400 in accordance with an exemplary embodiment. The wireless base station device (e.g., CBSD device) 400. In some embodiments, the wireless base station (e.g., CBSD device) 400 also includes the capabilities of a CBSD as defined by the Federal Communications Commission's Rules with Regard to Commercial Operations in the 3550-3650 MHz Band. Exemplary wireless base station (e.g., CBSD device) 400 includes a wireless interface 404, a network interface 405, e.g., a wired or optical interface, processor(s) 406 (one or more processors), e.g., a CPU, an assembly of hardware components 408, e.g., an assembly of circuits, and I/O interface 410 and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. Network interface 405 includes a receiver 478 and a transmitter 480. In some embodiments, receiver 478 and transmitter 480 are part of a transceiver 484. Wireless interface 404 includes a wireless receiver 438 and a wireless transmitter 440. In some embodiments, receiver 438 and transmitter 440 are part of a transceiver 442. In various embodiments, wireless interface 404 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signals from other wireless communications devices including a second wireless communications device, e.g., a UE device. Wireless transmitter 440 is coupled to a plurality of wireless transmit antennas (transmit antenna 1 443, . . . , transmit antenna N 445) via which the wireless base station 400 can transmit signals to other wireless communications devices including a second wireless communications device, e.g., a UE device. Memory 412 includes an assembly of component 414, e.g., an assembly of software components, and data/information 416.

Data/information 416 includes wireless base station uplink buffer UE 1 417, ..., wireless base station uplink buffer UE N 418, wireless base station downlink buffer UE 1 419, ..., wireless base station UE N 420. The wireless base station includes a separate uplink data buffer for each user equipment device which is connected to the wireless base station, e.g., to which it is actively providing services. The wireless base station also includes a separate downlink data buffer for each user equipment device which is connected to the wireless base station, e.g., to which it is actively providing services. In some embodiments, the wireless base stations discussed in the Figures and/or in connection with the embodiments of the present invention described are implemented in accordance with wireless base station 400. For example, WBS 1 (e.g., CBSD 1) 102 and/or WBS 2 (e.g., CBSD 2) 112 of system 100, may be, and in some embodiments are, implemented in accordance with wireless base station 400.

Figure 5:
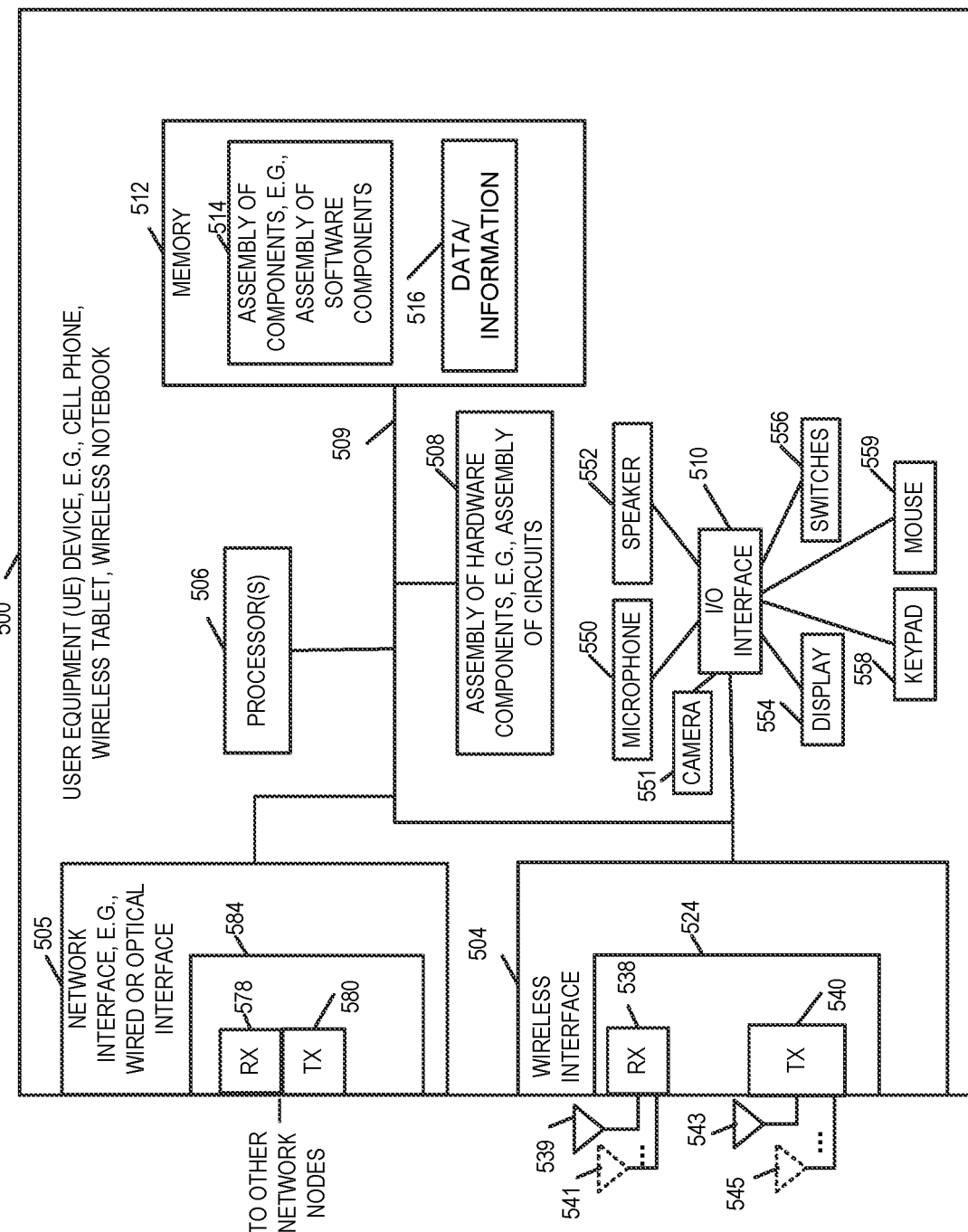
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a mobile device such as a cell phone, a smart phone, wireless tablet or wireless notebook. UE device 500, in some embodiments, includes CBRS, 5G, Long Term Evolution (LTE), e.g., 4G LTE, mobile device capabilities. Exemplary UE device 500 includes a wireless interface 504, a network interface 505, a processor(s) 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the UE device. Network interface 505 includes a receiver 578 and a transmitter 580. In some embodiments, receiver 578 and transmitter 580 are part of a transceiver 584. Wireless interface 504 includes a wireless receiver 538 and a wireless transmitter 540. In some embodiments, receiver 538 and transmitter 540 are part of a transceiver 524. In various embodiments, wireless interface 504 includes a plurality of wireless receivers and a plurality of wireless transmitters. Wireless receiver 538 is coupled to one or more receive antennas (receive antenna 1 539, ..., receive antenna M 541), via which UE device 500 can receive wireless signals from other wireless communications devices including, e.g., a wireless base station such as wireless base station 400. Wireless transmitter 540 is coupled to one or more wireless transmit antennas (transmit antenna 1 543, ..., transmit antenna N 545) via which the UE device 500 can transmit signals to other wireless communications device including a first wireless communications device, e.g., a wireless base station 400. Memory 512 includes an assembly of components 514, e.g., an assembly of software components, and data/information 516. The user equipment devices illustrated in FIG. 1 may be, and in some embodiments are, implemented in accordance with user equipment device 500.

Figure 6:
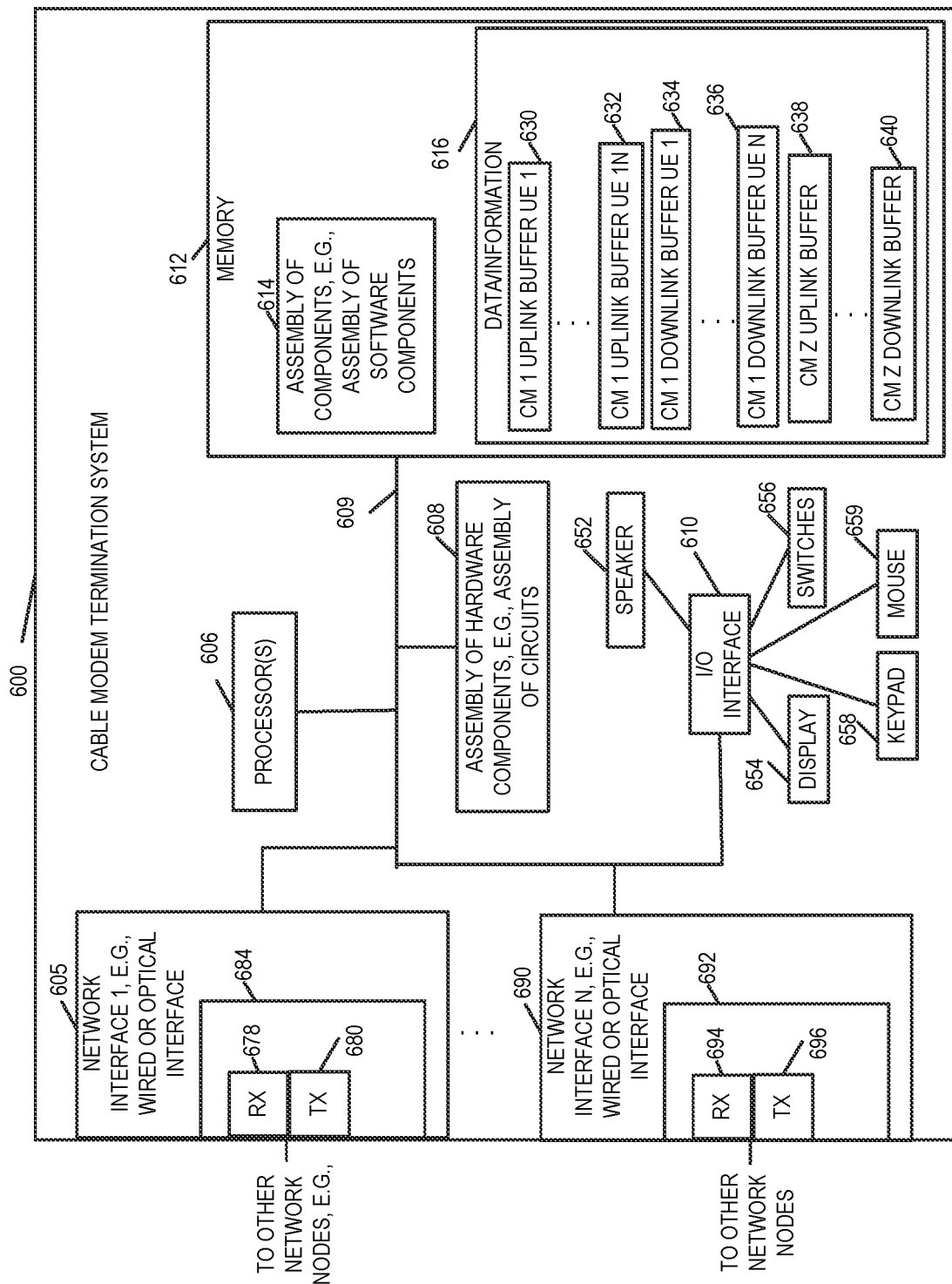
FIG. 6 illustrates details of an exemplary cable modem termination system in accordance with one embodiment of the present invention.

FIG. 6 is a drawing of an exemplary cable modem termination system in accordance with an exemplary embodiment. The cable modem termination system in some embodiments is implemented in accordance with DOCSIS standards. The cable modem termination system 600 includes a plurality of network interfaces 605, ..., 690, e.g., a wired or optical interface, a processor(s) 606 (e.g., one or more processors), e.g., a CPU, an assembly of hardware components 608, e.g., an assembly of circuits, and I/O interface 610 and memory 612 coupled together via a bus 609 over which the various elements may interchange data and information. The computing device 600 further includes a speaker 652, a display 654, switches 656, keypad 658 and mouse 659 coupled to I/O interface 610, via which the various I/O devices (652, 654, 656, 658, 659) may communicate with other elements (605, ..., 690, 606, 608, 612) of the cable modem termination system 600. Network interface 605 includes a receiver 678 and a transmitter 680. The network interface 605 is typically used to communicate with other devices, e.g., cable modems, CMTS power management device, other devices in the network core. In some embodiments, receiver 678 and transmitter 680 are part of a transceiver 684. Memory 612 includes an assembly of component 614, e.g., an assembly of software components, and data/information 616. Data/information 616 includes, among other things, uplink and downlink buffers for each cable modem to which it is connected when it is operating in non-buffer management mode of operation with respect to the cable modem or devices, e.g., wireless base stations connected to the cable modem and uplink and downlink buffers for each user equipment device and/or wireless base station uplink and/or downlink buffer identified by a wireless base station when operating in buffer management mode of operation with respect to a wireless base station the CMTS is serving. In this example, it includes CM 1 uplink data buffer UE 1 632, ..., CM 1 uplink data buffer UE 1632, and CM 1 downlink buffer UE 1634, ..., CM 1 downlink buffer UE N 636 as the CMTS is operating in buffer management mode of operation with respect to the wireless base station 1 connected to cable modem 1 and hence has separate downlink buffer for each user equipment device actively/currently connected to the wireless base station connected to CM 1 which in this example is UE 1, ..., UE N. The CMTS also includes cable modem termination system cable modem Z uplink buffer 638 and cable modem termination system CM Z downlink buffer 640 as the CMTS is operating in a non-buffer management mode of operation with respect to the devices connected to a cable modem Z. In some embodiments when operating in the buffer management mode of operation with respect to a wireless base station which the CMTS is serving, the CMTS uses a single uplink data buffer for all uplink data received from the wireless base station instead of having separate uplink data buffers for each user equipment device. In some embodiments, cable modem termination systems disclosed in the figures and/or discussed in connection with the various embodiments of the invention are implemented in accordance with cable modem termination system 600. For example, cable modem termination system 1 122 and cable modem termination system 2 124 of system 100 of FIG. 1 are implemented in accordance with cable modem termination system 600.

Figure 7:
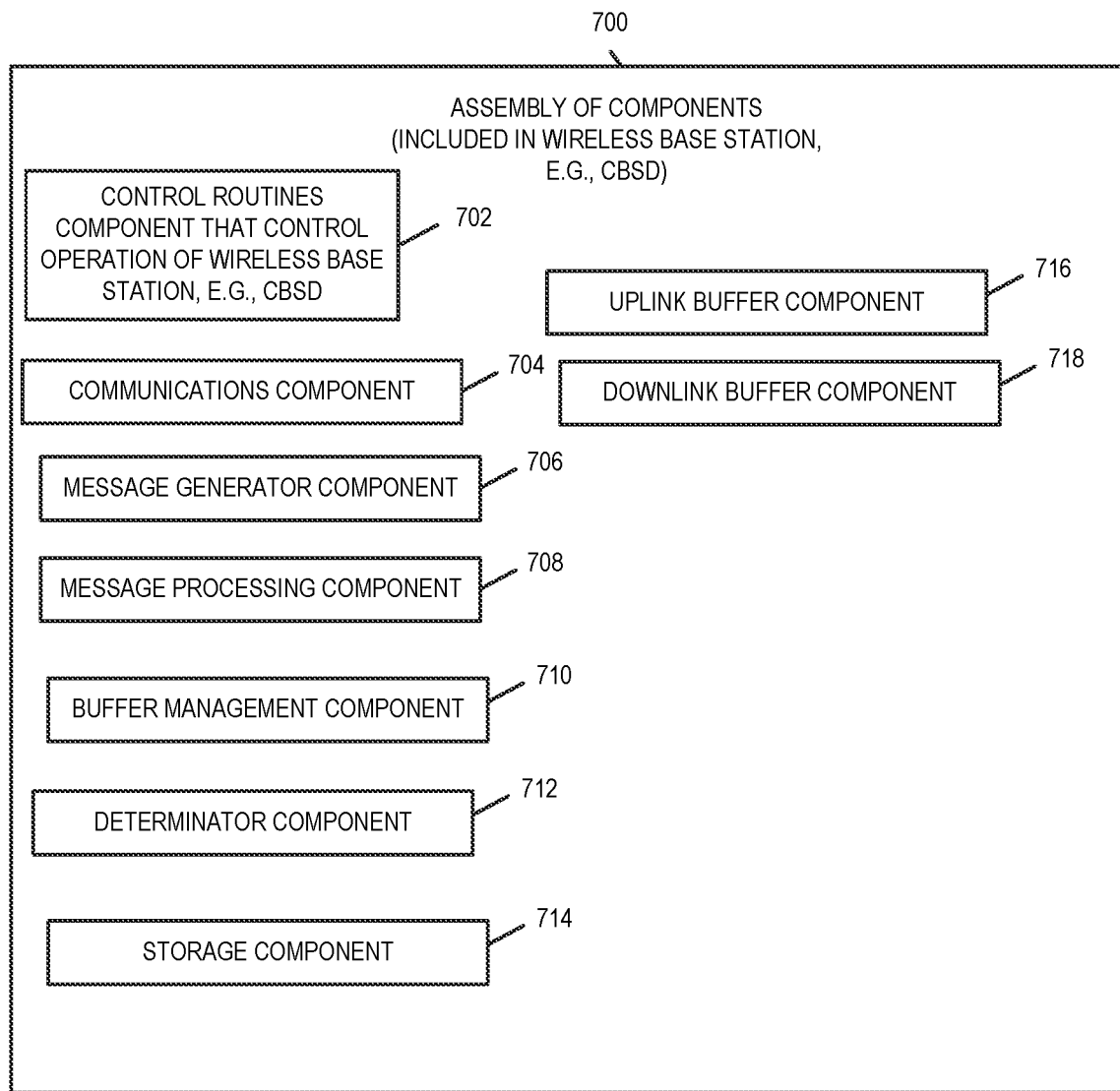
FIG. 7 illustrates an exemplary assembly of components for a wireless base station (e.g., CBSD) in accordance with an embodiment of the present invention.

FIG. 7 is a drawing of an exemplary assembly of components 700 which may be included in an exemplary wireless base station (e.g., exemplary wireless base station 400 of FIG. 4), in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, a communications component 704, a message generator component 706, a message processing component 708, a buffer management component 710, a determinator component 712, a storage component 714, an uplink buffer component 716, and a downlink buffer component 718.

The control routines component 702 is configured to control operation of the wireless base station (e.g., CBSD). The communication component 704 is configured to handle communications, e.g., transmission and reception of messages, and protocol signaling for the wireless base station (e.g., CBSD). The message generator component 706 is configured to generate messages for transmission to other devices. The message processing component 708 is configured to process messages received from other devices, e.g., messages from user equipment devices, messages from a cable modem, messages from an Spectrum Access System, and policy control function devices.

The buffer management component 710 is configured to implement all aspects related to buffer management including creation and management of uplink data buffer(s) for storing data from user equipment devices to be transmitted to the CMTS via the cable modem, creation of downlink buffer(s) for storing data received from the CMTS via the cable modem, providing wireless base station buffer information to the CMTS including uplink and downlink buffer size and fill rates, buffer ID, information correlating wireless base station downlink buffers to user equipment devices for which the buffer is being used to store downlink data, buffer status reports, buffer management mode of operation messages, creation of buffer status reports, creation of buffer mode of operation messages, notifications regarding buffer status, buffer capacity threshold generation and management for different UEs, uplink and downlink buffer sizes.

The determinator component 712 is configured to make determinations and decisions for the wireless base station including for example: buffer size, buffer capacity thresholds, when a buffer capacity threshold has been exceeded, when to send buffer status reports to the CMTS for a wireless base station downlink data buffer, when to send a buffer mode of operation message to a CMTS.

The storage component 714 is configured to manage the storage, and retrieval of data and/or instructions to/and from memory, buffers in memory, hardware buffers and/or storage device coupled and/or connected to the wireless base station.

The uplink buffer component 716 is configured to handle uplink buffer creation and modification, e.g., increase and decrease in buffer size, management, storage and retrieval of data to the uplink buffer, flushing and/or transmittal of data from the uplink buffer to the cable modem, provide notifications when thresholds have been exceeded with respect to buffer storage, provide notifications when the uplink buffer is full, determine the uplink buffer size, increase uplink buffer size, determine uplink buffer fill rate, determine amount of time it takes for the uplink buffer to become full, respond to queries and/or requests from the cable modem termination system to provide uplink buffer information. In some embodiments, uplink buffer component 716 is a sub-component of buffer management component 710 or storage component 714.

The downlink buffer component 718 is configured to handle downlink buffer creation and modification, e.g., increase and decrease in buffer size, management, storage and retrieval of data to the downlink buffer, increase downlink buffer size, flushing and/or transmittal of data from the downlink buffer to the user equipment devices, provide notifications when thresholds have been exceeded with respect to buffer storage, provide notifications when the downlink buffer is full, generate buffer status reports, send buffer status reports to the CMTS, determine the downlink buffer size for each downlink buffer, respond to queries and/or requests from the cable modem termination system to provide downlink buffer information. Determine buffer capacity threshold values for downlink data buffers. Determine when downlink buffer capacity threshold values have been exceeded. Determine when to send buffer status reports to a CMTS. Determine when to send a buffer mode of operation message to a CMTS. In some embodiments, downlink buffer component 718 is a sub-component of buffer management component 710 or storage component 714.

Figure 8:
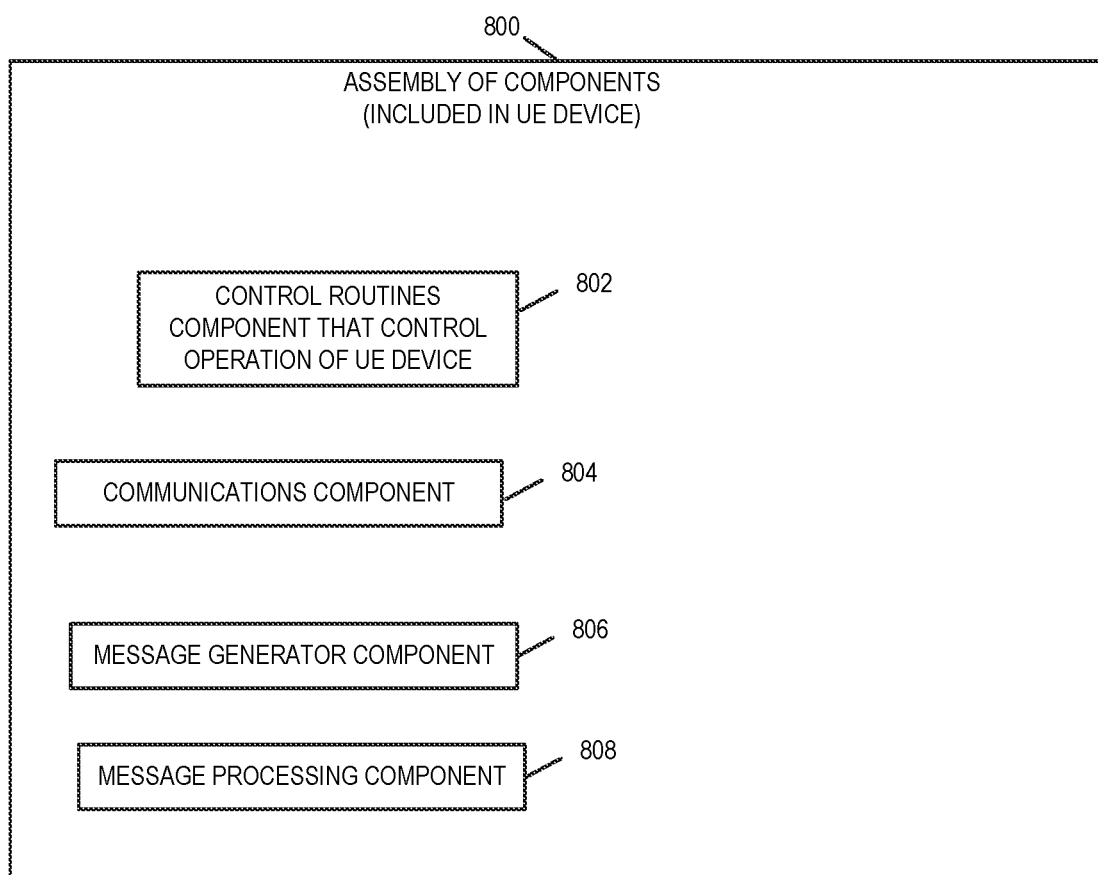
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits.

The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a communications component 804, a message generator component 806, a message processing component 808.

The control routines component 802 is configured to control operation of the UE. The communication component 804 is configured to handle communications, e.g., receipt and transmission of signals and provide protocol signal processing for one or protocols for the UE. The message generator component 806 is configured to generate messages for transmission to the wireless base stations (e.g., CBSD devices) such as messages including user data and/or user data requests, control messages, etc. In some embodiments, the message generator component 806 is a sub-component of the communications component 804. The message processing component 808 processes received messages, e.g., requests for information. In some embodiments, the message processing component is a sub-component of the communications component 808.

Figure 9:
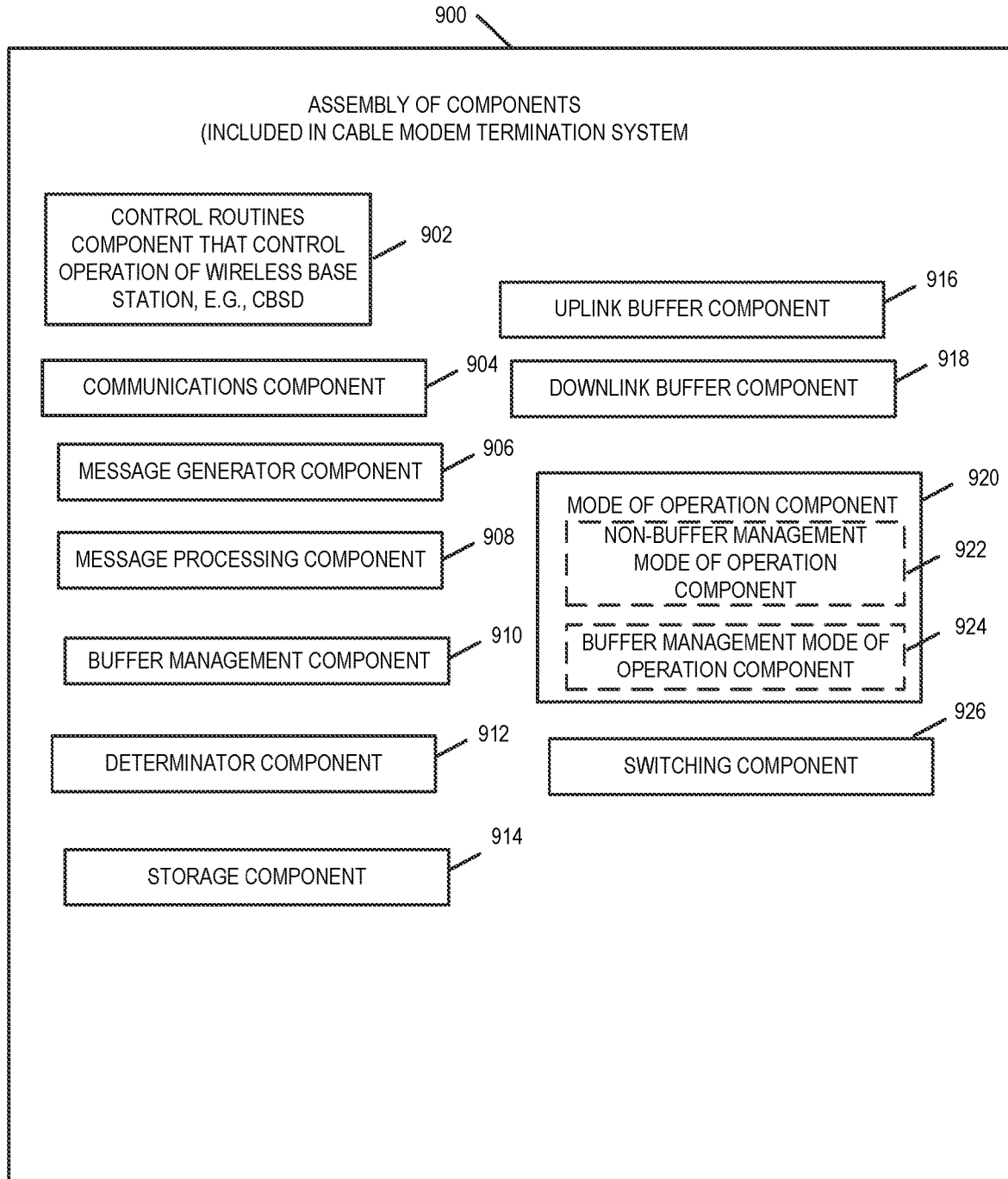
FIG. 9 illustrates an exemplary assembly of components for a cable modem termination system in accordance with an embodiment of the present invention.

FIG. 9 is a drawing of an exemplary assembly of components 900 which may be included in a cable modem termination system, e.g., cable modem termination system 600 of FIG. 6, in accordance with an exemplary embodiment. The components in the assembly of components 900 can, and in some embodiments are, implemented fully in hardware within a processor or one or more processors, e.g., processor(s) 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor(s) 606 with other components being implemented, e.g., as circuits within assembly of components 608, external to and coupled to the processor(s) 606. As should be appreciated the level of integration of components on the processor and/or with some components being external to the processor may be one of design choice. Alternatively, rather than being implemented as circuits, all or some of the components may be implemented in software and stored in the memory 612 of the cable modem termination system 600, with the components controlling operation of the cable modem termination system 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor or one or more processors, e.g., processor(s) 606, configure the processor(s) to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the cable modem termination system 600 or elements therein such as the processor(s) 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a communications component 904, a message generator component 906, a message processing component 908, a buffer management component 910, a determinator component 912, a storage component 914, an uplink buffer component 916, a downlink buffer component 918, a mode of operation component 920, and a switching component 926. In some embodiments, the mode of operation component 920 includes one or more of the following: non-buffer management mode of operation component 922 and buffer management mode of operation 924.

The control routines component 902 is configured to control operation of the cable modem termination system. The communication component 904 is configured to handle communications, e.g., transmission and reception of messages, and protocol signaling for the cable modem termination system. The message generator component 906 is configured to generate messages for transmission to other devices. The message processing component 908 is configured to process messages received from other devices, e.g., messages from cable modems, messages from core network, and messages from wireless base station, e.g., buffer management mode of operation messages, buffer status reports, buffer information messages.

The buffer management component 910 is configured to implement all aspects related to buffer management including creation and management of uplink data buffer(s) for storing data from cable modem devices to be transmitted to the core network devices, creation of downlink buffer(s) for storing data received from devices, e.g., core network devices for transmission to user equipment devices via cable modems and wireless base station(s).

The determinator component 912 is configured to make determinations and decisions for the cable modem termination system including for example: number of downlink data buffers to create for communications with a wireless base station, whether to operate in a non-buffer management mode of operation or a buffer management mode of operation with respect to a cable modem and/or a wireless base station, determination of what CMTS downlink buffer to store received downlink data in, determination of whether to maintain downlink data in a CMTS downlink buffer to communicate the data to a wireless base station via a cable modem, an amount of data to transmit to a wireless base station using information received in a buffer status report.

The storage component 914 is configured to manage the storage, and retrieval of data and/or instructions to/and from memory, buffers in memory, hardware buffers and/or storage device coupled and/or connected to the wireless base station.

The uplink buffer component 916 is configured to handle uplink buffer creation and modification, e.g., increases and decreases in buffer size, management, storage and retrieval of data to the uplink buffer, flushing and/or transmittal of data from the uplink buffer to the other devices, e.g., devices in the core network. In some embodiments, uplink buffer component 916 is a sub-component of buffer management component 910 or storage component 914.

The downlink buffer component 918 is configured to handle downlink buffer creation and modification, e.g., increases and/or decreases to buffer size, management, storage and retrieval of data to the downlink buffer, flushing and/or transmittal of data from the downlink buffer to the cable modem, determine the downlink buffer size, determine when the downlink buffer should not send data to the wireless base station but should instead store and/or maintain the data in a CMTS buffer, determine when and amount of data to send to a wireless base station for a user equipment device being serviced by the wireless base station based on information included in or derived from a buffer status report. In some embodiments, downlink buffer component 918 is a sub-component of buffer management component 910 or storage component 914.

The mode of operation component 920 is configured to control the cable mode termination to perform operations and steps of the methods disclosed herein while operating in the non-buffer management mode of operation and the buffer management mode of operation. In some embodiments, the mode of operation component 920 also makes determinations as to when the cable modem termination system is to enter or exit either the non-buffer management mode of operation or the buffer management mode of operation and with respect to which devices the CMTS is serving. In some embodiments, the mode of operation component 920 controls the cable modem termination system to switch from the non-buffer management mode of operation to the buffer management mode of operation with respect to buffering and communicating downlink data to a wireless base station. In some embodiments, the mode of operation component 920 controls the cable modem termination system to switch from the buffer management mode of mode of operation to the non-buffer management mode of operation with respect to buffering and communicating downlink data to a wireless base station. In some embodiments, the mode of operation component includes a non-buffer mode of operation component 922 which controls the operation of the cable modem termination system to perform the steps, functions and/or operations of various methods described herein while operating in the non-buffer management mode of operation with respect to a wireless base station or cable modem. In some embodiments, the mode of operation component includes a buffer mode of operation component 924 which controls the operation of the cable modem termination system to perform the steps, functions and/or operations of various methods described herein while operating in the buffer management mode of operation with respect to a wireless base station or cable modem.

The switching component 926 is configured to control the cable modem termination to: (i) switch from a first mode of operation to a second mode of operation, and (ii) switch from a second mode of operation to a first mode of operation. The first mode of operation may be and typically is a non-buffer management mode of operation with respect to a wireless base station or cable modem and the second mode of operation is typically a buffer management mode of operation with respect to a wireless base station. In some embodiments, the switching component is also configured to make the determination of when the cable modem termination system is to switch: (i) from the first mode of operation to the second mode of operation, and (ii) from the second mode of operation to the first mode of operation. In some embodiments, the switching component 926 is a sub-component of the mode of operation component 920.

Figure 11:
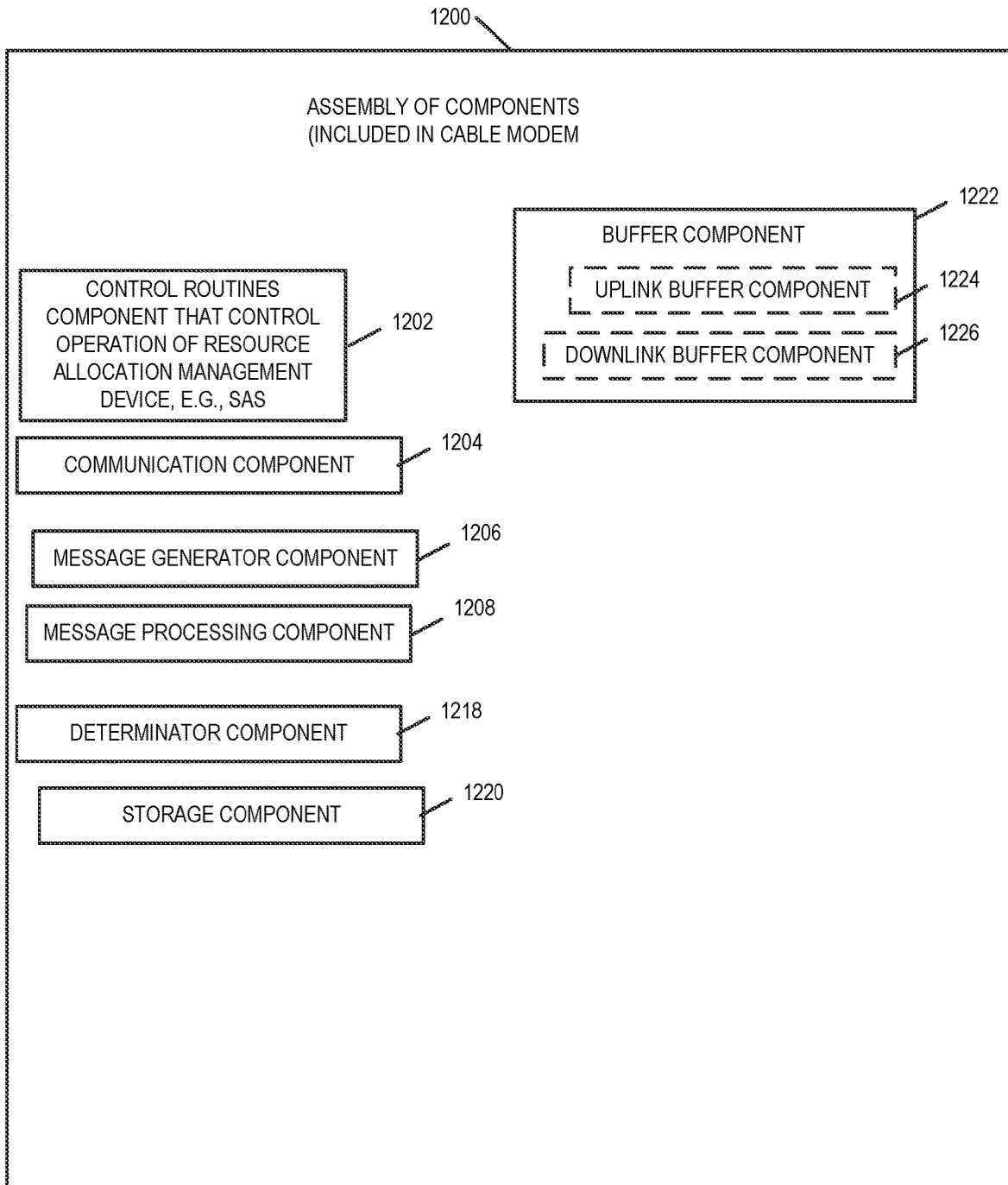
FIG. 11 illustrates details of an exemplary assembly of components for a cable modem in accordance with an embodiment of the present invention.

FIG. 11 is a drawing of an exemplary assembly of components 1200 which may be included in an exemplary cable modem (e.g., exemplary cable modem 200 of FIG. 2), in accordance with an exemplary embodiment. The components in the assembly of components 200 can, and in some embodiments are, implemented fully in hardware within a processor, e.g., processor 206, e.g., as individual circuits. The components in the assembly of components 200 can, and in some embodiments are, implemented fully in hardware within the assembly of hardware components 208, e.g., as individual circuits corresponding to the different components. In other embodiments some of the components are implemented, e.g., as circuits, within processor 206 with other components being implemented, e.g., as circuits within assembly of components 208, external to and coupled to the processor 206. As should be appreciated the level of integration of components on the processor and/or with some components being external to the processor may be one of design choice. Alternatively, rather than being implemented as circuits, all or some of the components may be implemented in software and stored in the memory 212 of the cable modem 200, with the components controlling operation of cable modem 200 to implement the functions corresponding to the components when the components are executed by a processor e.g., processor 206. In some such embodiments, the assembly of components 1200 is included in the memory 212 as assembly of software components 214. In still other embodiments, various components in assembly of components 1200 are implemented as a combination of hardware and software, e.g., with another circuit external to the processor providing input to the processor which then under software control operates to perform a portion of a component's function.

When implemented in software the components include code, which when executed by a processor, e.g., processor 206, configure the processor to implement the function corresponding to the component. In embodiments where the assembly of components 200 is stored in the memory 212, the memory 212 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 2 control and/or configure the cable modem 200 or elements therein such as the processor 206, to perform the functions of corresponding steps illustrated and/or described in the method of one or more of the flowcharts, signaling diagrams and/or described with respect to any of the Figures. Thus the assembly of components 1200 includes various components that perform functions of corresponding one or more described and/or illustrated steps of an exemplary method.

Assembly of components 1200 includes a control routines component 1202, a communications component 1204, a message generator component 1206, a message processing component 1208, a determinator component 1218, a storage component 1220, and a buffer component 1222. In some embodiments, the buffer component 1222 includes one or more of the following sub-components: an uplink buffer component 1224 and a downlink buffer component 1226.

The control routines component 1202 is configured to control operation of the cable modem. The communication component 1104 is configured to handle communications, e.g., transmission and reception of messages, data packets, and protocol signaling for the cable modem. The message generator component 1206 is configured to generate messages for transmission to other devices such as for example messages to be sent to the cable modem termination system and/or the wireless base station. The message processing component 1208 is configured to process messages received from other devices, e.g., messages such as messages including wireless bae station buffer management mode of operation messages, wireless base station buffer information messages, wireless base station, buffer status messages and/or data packets from a wireless base station and/or a cable modem termination system.

The determinator component 1218 is configured to make determinations and decisions for the cable modem.

The storage component 1220 is configured to manage the storage, and retrieval of data and/or instructions to/and from memory, buffers in memory, hardware buffers and/or storage devices coupled and/or connected to the cable modem.

The buffer component 1222 is configured to control the cable modem to implement all aspects related to buffer management including creation and management of an uplink data buffer for storing data from wireless base station to be transmitted to the cable modem termination system, creation of downlink buffer for storing data received from the cable modem termination system. In some embodiments, the buffer component 1222 is a sub-component of the storage component 1220.

In some embodiments the buffer component 1222 includes uplink buffer component 1224. The uplink buffer component 1224 is a sub-component of the buffer component 1222 and is configured to perform operations relating to the uplink buffer including uplink buffer creation and modification, e.g., increase and decrease in buffer size, management, storage and retrieval of data to the uplink buffer, flushing and/or transmittal of data from the uplink buffer to the cable modem termination system. In some embodiments, uplink buffer component 1224 is not a sub-component of buffer component 1222 but is a separate component. In some embodiments, the uplink buffer component 1224 is a sub-component of the storage component 1220.

In some embodiments the buffer component 1222 includes downlink buffer component 1226. The downlink buffer component 1226 is a sub-component of the buffer component 1222 and is configured to perform operations relating to the downlink buffer including downlink buffer creation and modification, e.g., increase and decrease in buffer size, management, storage and retrieval of data to the downlink buffer, flushing and/or transmittal of data from the downlink buffer to the wireless base station. In some embodiments, downlink buffer component 1226 is not a sub-component of buffer component 1222 but is a separate component. In some embodiments, the downlink buffer component 1226 is a sub-component of the storage component 1220.

FIG. 10 illustrates the steps of a flowchart of a method 1000 which illustrates another exemplary method embodiment for dynamically managing communications between a cable modem termination system and a wireless base station. FIG. 10 illustrates the combination of FIGS. 10A, 10B, 10C, 10D, 10E, 10F, 10G, 10H, 10I, and 10J. FIG. 10A illustrates the steps of the first part of an exemplary method in accordance with an embodiment of the present invention. FIG. 10B illustrates the steps of the second part of an exemplary method in accordance with one embodiment of the present invention. FIG. 10C illustrates the steps of the third part of an exemplary method in accordance with an embodiment of the present invention. FIG. 10D illustrates the steps of the fourth part of an exemplary method in accordance with an embodiment of the present invention. FIG. 10E illustrates the steps of the fifth part of an exemplary method in accordance with an embodiment of the present invention. FIG. 10F illustrates the steps of the sixth part of an exemplary method in accordance with an embodiment of the present invention. FIG. 10(G illustrates the steps of the seventh part of an exemplary method in accordance with an embodiment of the present invention. FIG. 10H illustrates the steps of the eighth part of an exemplary method in accordance with an embodiment of the present invention. FIG. 10I illustrates the steps of the ninth part of an exemplary method in accordance with an embodiment of the present invention. FIG. 10J illustrates the steps of the tenth part of an exemplary method in accordance with an embodiment of the present invention.

For explanatory purposes the exemplary method 1000 will be explained in connection with the exemplary communications system 100 illustrated in FIG. 1 wherein the wireless network is a CBRS network, the wireless base stations are CBSD devices, the resource allocation management devices are SAS devices, the user equipment devices are mobile terminals, and cables connect the cable modem 1 104, . . . , CM Y 114 to the cable modem termination system 1 122. The cable modem termination system 1 122 supplying power to the cable modems which in turn supplies power to the wireless base station 1 (CBSD 1) 102 and wireless base station 2 (CBSD 2) 112. However, it should be understood that the method may be implemented using other systems, e.g., other non-CBRS wireless systems as well as other system configurations then those illustrated in FIG. 1. While it will be readily understood that additional steps and signaling are performed in connection with communicating information, messages, and packets between devices, the method 1000 focuses on and discusses the steps and signaling for understanding the invention.

The method 1000 shown in FIG. 10 will now be discussed in detail. The method starts in start step 1002 shown on FIG. 10A.

Figure 10A:
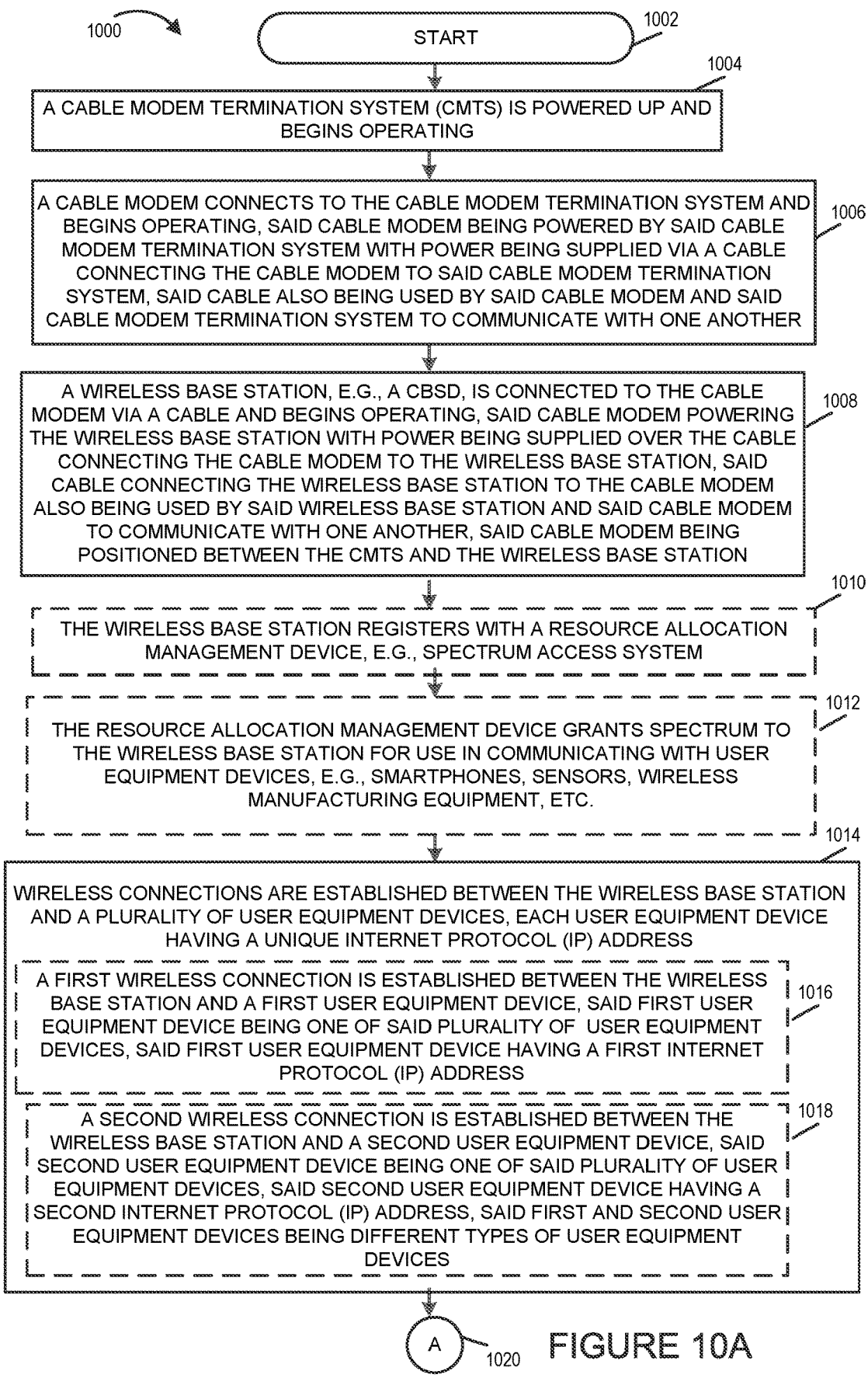
FIG. 10A illustrates the steps of the first part of an exemplary method in accordance with an embodiment of the present invention.
Figure 10B:
FIG. 10B illustrates the steps of the second part of an exemplary method in accordance with an embodiment of the present invention.

Operation proceeds from start step 1002 to step 1004 shown on FIG. 10A.

In step 1004, a cable modem termination system (e.g., cable modem termination system 1 122 of system 100) is powered up and begins operating. Operation proceeds from step 1004 to step 1006.

In step 1006, a cable modem (e.g., cable modem 1 104 of system 100) connects to the cable modem termination system and begins operating. In this exemplary embodiment, the cable modem is powered by the cable modem termination system with power being supplied via a cable connecting the cable modem to the cable modem termination system. In various embodiments, the cable is also used by the cable modem termination system and the cable modem to communicate with one another. In at least some embodiments, the power is supplied using power over Ethernet protocols, technologies and/or connections. Operation proceeds from step 1006 to step 1008.

In step 1008, a wireless base station (e.g., wireless base station 102 (e.g., a CSBD) of system 100) is connected to the cable modem via a cable and begins operating. In various embodiments, the cable modem supplies power to the wireless base station. In some embodiments, the power is supplied by the cable modem to the wireless base station over the cable connecting the wireless base station to the cable modem. In various embodiments, the cable connecting the wireless base station to the cable mode is also by the cable modem and the wireless base station to communicate with one another. The cable modem is positioned between the wireless base station and the cable modem termination system. The cable modem is situated on the communications path between the wireless base station and the CMTS. The cable modem in this exemplary system is faster than the CMTS or the wireless base station in processing received uplink and downlink data and forwarding it to its respective destination (e.g., downlink data is received by the cable modem from the CMTS and transmitted to the wireless base station while uplink data is received by the cable modem from the wireless base station and transmitted to the CMTS).

When the system is operating, the wireless base station provides services, e.g., broadband services, to user equipment devices, e.g., wireless devices such as laptops, smartphones, cellphones, tablets, cars, sensors, etc. which connect to the wireless base station. The user equipment device uplink data is sent to the core network (e.g., core network 150) of the service provider (e.g., service provider 1 in system 100) which operates both the wireless base station 1 102, the cable modem 104, the cable modem termination system 1 122 and the core network 150. In this example, the service provider provides both wireless and cable services. The user equipment device uplink data which is sent to the core network traverses the following path: user equipment device to wireless base station to cable modem to cable modem termination system to core network device. Downlink data sent via the core network to the user equipment device follows the reverse path: core network to cable modem termination system to cable modem to wireless base station to user equipment device.

Operation proceeds from step 1008 to optional step 1010. In optional step 1010. The wireless base station registers with a resource allocation management device, e.g., a spectrum access system (e.g., RAMD 1 126 of system 100). This optional step is typically implemented by wireless base stations such as for example CBSD base stations of CBRS systems wherein a Spectrum Access System allocates and manages spectrum, e.g., General Authorized Access spectrum, which a wireless base station is to utilize. Operation proceeds from optional step 1010 to optional step 1012.

In optional step 1012, the resource allocation management device grants spectrum to the wireless base station for use in communicating with user equipment devices. Operation proceeds from optional step 1012 to step 1014.

When optional steps 1010 and 1012 are not implemented, operation proceeds from step 1008 to step 1014.

In step 1014, wireless connections are established between the wireless base station and a plurality of user equipment devices, each user equipment device having a unique Internet Protocol (IP) address. In some embodiments, step 1014 includes one or more sub-steps 1016 and 1018. In sub-step 1016, a first wireless connection is established between the wireless base station and a first user equipment device. The first user equipment device being one of said plurality of user equipment devices. The first user equipment device has a first Internet Protocol (IP) address. In sub-step 1018, a second wireless connection is established between the wireless base station and a second user equipment device. The second user equipment device being one of the plurality of user equipment devices. The second user equipment device having a second Internet Protocol address. The first and second user equipment devices being different types of user equipment devices. In some embodiments the first and second user equipment devices have different downlink data usage patterns. In some embodiments, the first and second user equipment devices have different downlink latency requirements. Operation proceeds from step 1014 via connection node A 1020 to step 1022 shown on FIG. 10B.

In step 1022, the wireless base station creates at the wireless base station a downlink data buffer for each of the user equipment devices of the plurality of user equipment devices connected to the wireless base station. In some embodiments, step 1022 includes sub-step 1024. In sub-step 1024, the wireless base station determines a size of the downlink data buffer for each of the plurality of user equipment devices based on one or more of the following: (i) information received from the user equipment device (e.g., during the establishment of the wireless connection with the user equipment device), (ii) channel state information corresponding to the wireless connection between the wireless base station and the particular user equipment device, and (iii) the number of user equipment devices being serviced by the wireless base station. In some embodiments, step 1024 includes one or more sub-steps 1026, 1028, 1030, 1032, 1034, 1036, 1038 and 1040.

In sub-step 1026, the wireless base station determines a device type for each of the user equipment devices of the plurality of user equipment devices.

In sub-step 1028, the wireless base station determines a size of the downlink data buffer for each user equipment device of the plurality of user equipment devices based on the determined user equipment device's device type.

In sub-step 1030, the wireless base station assigns and/or associates a unique downlink data buffer identifier (ID) to each of the downlink data buffers it has created. In various embodiments, the downlink data buffer ID is the IP address of the user equipment device for which the downlink data buffer is to be used to store downlink data.

In sub-step 1032, the wireless base station determines the first user equipment device is a smartphone device type based on device type information received from the first user equipment device when the first wireless connection was established. For example, the first user equipment device sent a device type message to the wireless base station during the establishment of the first wireless connection.

In sub-step 1034, the wireless base station determines the second user equipment device is a sensor device type based on device type information received from the second user equipment device when the second connection was established. For example, the second user equipment device sent a device type message to the wireless base station during the establishment of the second wireless connection In sub-step 1036, the wireless base station creates a first downlink data buffer to use for storing downlink data to be transmitted to the first user equipment device. The first downlink data is received from the CMTS via the cable modem. The first downlink data buffer having a first buffer size. The first buffer size being determined based on the determined first user equipment device's device type.

In sub-step 1038, the wireless base station creates a second downlink data buffer for storing downlink data to be transmitted to the first user equipment device. The downlink data is received from the CMTS via the cable modem. The second downlink data buffer having a second buffer size. The second buffer size being determined based on the determined second user equipment device's device type.

In sub-step 1040, the wireless base station assigns and/or associates a first downlink buffer ID to the first downlink buffer and a second downlink buffer ID to the second downlink data buffer. In some embodiments, the first downlink buffer ID is the first IP address. In some embodiments, the second downlink buffer ID is the second IP address.

Figure 10C:
FIG. 10C illustrates the steps of the third part of an exemplary method in accordance with an embodiment of the present

Operation proceeds via connection node B 1042 to step 1044 shown on FIG. 10C.

In step 1044, the wireless base station creates an uplink data buffer for each of the user equipment devices of the plurality of user equipment devices connected to the wireless base station.

In some embodiments step 1044 includes sub-step 1046. In sub-step 1046, the wireless base station determines a size of the uplink data buffer for each of the plurality of user equipment devices based on one or more of the following: (i) information received from the user equipment device, e.g., during the establishment of the connection with the user equipment device, (ii) channel state information corresponding to the wireless connection between the wireless base station and the particular user equipment device, and (iii) the number of user equipment devices being serviced by the wireless base station. In some embodiments, sub-step 1046 includes one or more sub-steps 1048, 1050, 1052, 1054, 1056, 1058, 1060, and 1062.

In sub-step 1048, the wireless base station determines a device type for each of the user equipment devices of the plurality of user equipment devices. In sub-step 1050, the wireless base station determines a size of the uplink data buffer for each user equipment device of the plurality of user equipment devices based on the determined user equipment device's device type. In sub-step 1052, the wireless base station assigns and/or associates a unique uplink data buffer ID to each of the uplink data buffers created. In some embodiments, the wireless base station assigns and/or associates each user equipment device's IP address to the uplink data buffer to be used for storing the user equipment device's uplink data. In sub-step 1054, the wireless base station determines the first user equipment device is a smartphone device type based on device type information received from the first user equipment device when the first wireless connection was established. In sub-step 1056, the wireless base station determines the second user equipment device is a sensor device type based on device type information received from the second user equipment device when the second wireless connection was established. In sub-step 1058, the wireless base station creates a first uplink data buffer for storing data received from the first user equipment device. The first uplink data buffer having a third buffer size. The third buffer size being determined based on the determined first user equipment device's device type. In sub-step 1060, the wireless base station creates a second uplink data buffer for storing data received from the second user equipment device. The second uplink data buffer having a fourth buffer size. The fourth buffer size being determined based on the determined second user equipment device's device type. In sub-step 1062, the wireless base station assigns and/or associates a first uplink buffer ID to the first uplink data buffer and a second uplink buffer ID to the second uplink data buffer. In some embodiments, the wireless base station assigns and/or associates the first IP address to the first uplink data buffer. In some embodiments, the wireless base station assigns and/or associates the second IP address to the second uplink data buffer.

In various embodiments, the buffer sizes are in bytes. In various embodiments, the first buffer size, second buffer size, third buffer size and fourth buffer size are different from one another.

Operation proceeds from step 1062 via connection node C 1064 to step 1066 shown on FIG. 10D.

In step 106, the wireless base station sets a threshold capacity value for each created wireless base station downlink data buffer, each of threshold capacity values being determined based on one or more of the following: (i) device type of the user equipment device for which the wireless base station downlink daa buffer is to be used, (ii) traffic latency requirements of the user equipment device for which the wireless base station downlink data buffer is to be used (e.g., low latency requirement or a maximum amount of transmission latency requirement for the user account on which the user equipment device is registered and/or operating, (iii) data rate or speed with which an amount of data can be transmitted from the CMTS to the wireless base station, (iv) channel state information of the wireless downlink communications channel connection between the wireless base station and the user equipment device for which the wireless base station downlink data buffer is to be used, (v) channel conditions between the wireless base station and the user equipment device for which the wireless base station downlink data buffer is to be used, (vi) modulation coding scheme used by the wireless base station to transmit downlink data to the user equipment device for which the wireless base station downlink data buffer is to be used, and (vii) distance of the user equipment device for which the wireless base station downlink data buffer is to be used form the wireless base station. In some embodiments, step 1066 includes one or more sub-steps 1068, 1070, and 1074.

In sub-step 1068, the wireless base station sets a first threshold capacity value for the first wireless base station downlink data buffer (e.g., 20% which corresponds to when 20% of the first wireless base station downlink data buffer is being utilized and 80% of the first wireless base station downlink data buffer is not being utilized. For example, when the first wireless base station downlink data buffer is 1000 bytes-200 bytes are being utilized and 800 bytes of the buffer are empty or not being utilized to store data.

In sub-step 1070, the wireless base statin sets a second threshold capacity value for the second wireless base station downlink data buffer (e.g., 40% which corresponds to when 40% of the second wireless base station downlink data buffer is being utilized and 60% of the second wireless base station downlink data buffer is not being utilized. For example, when the second downlink data buffer size is 1000 bytes-400 bytes are being utilized and 600 bytes of the buffer are empty or not being used to store data.

In sub-step 1072, the wireless base statin sets a third threshold capacity value for a third wireless base station downlink data buffer (e.g., 60% which corresponds to when 60% of the third wireless base station downlink data buffer is being utilized and 40% of the third wireless base station downlink data buffer is not being utilized. For example, when the third downlink data buffer size is 1000 bytes-600 bytes are being utilized and 400 bytes of the buffer are empty or not being used to store data.

Figure 10E:
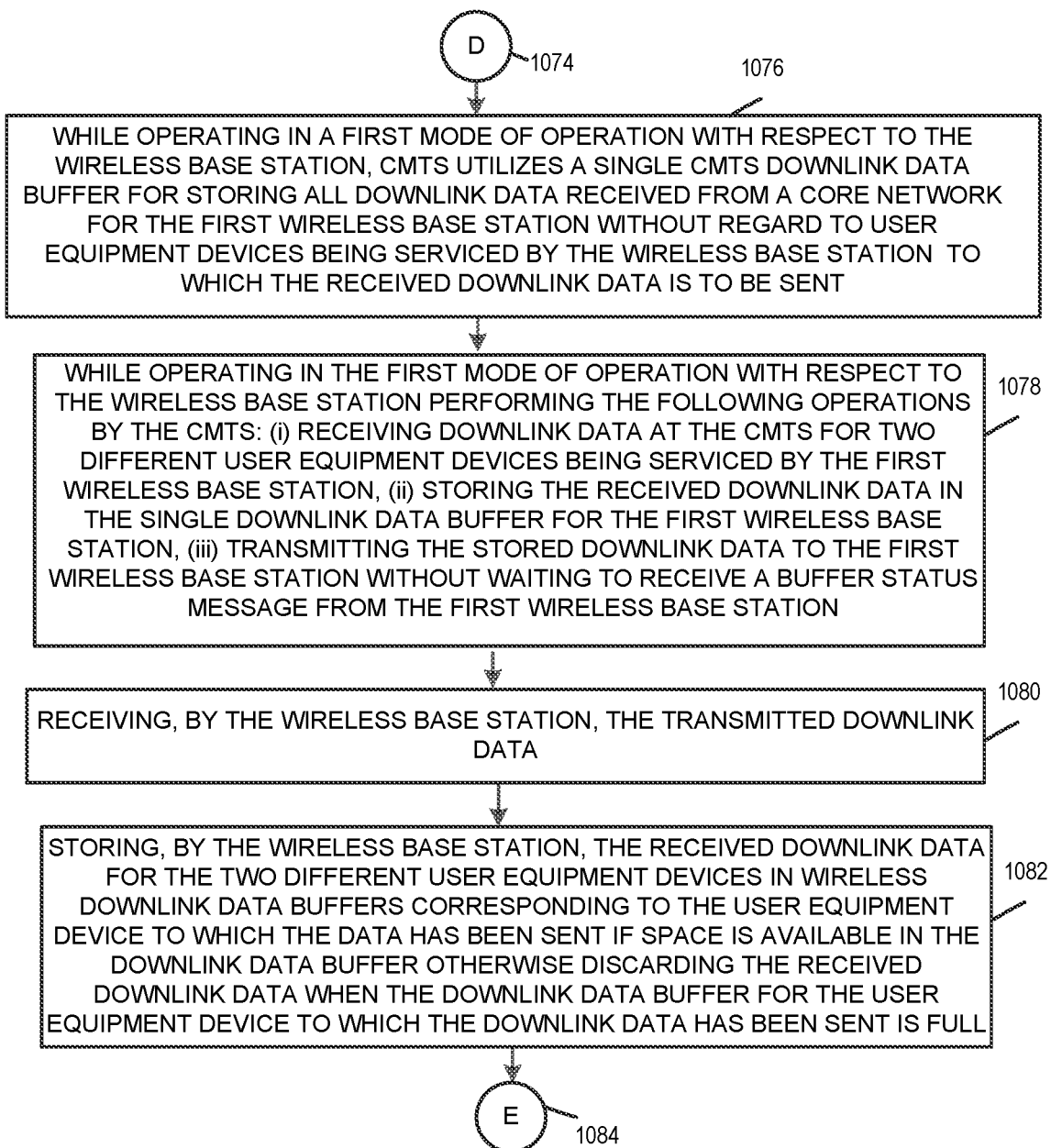
FIG. 10E illustrates the steps of the fifth part of an exemplary method in accordance with an embodiment of the present invention.
Figure 10F:
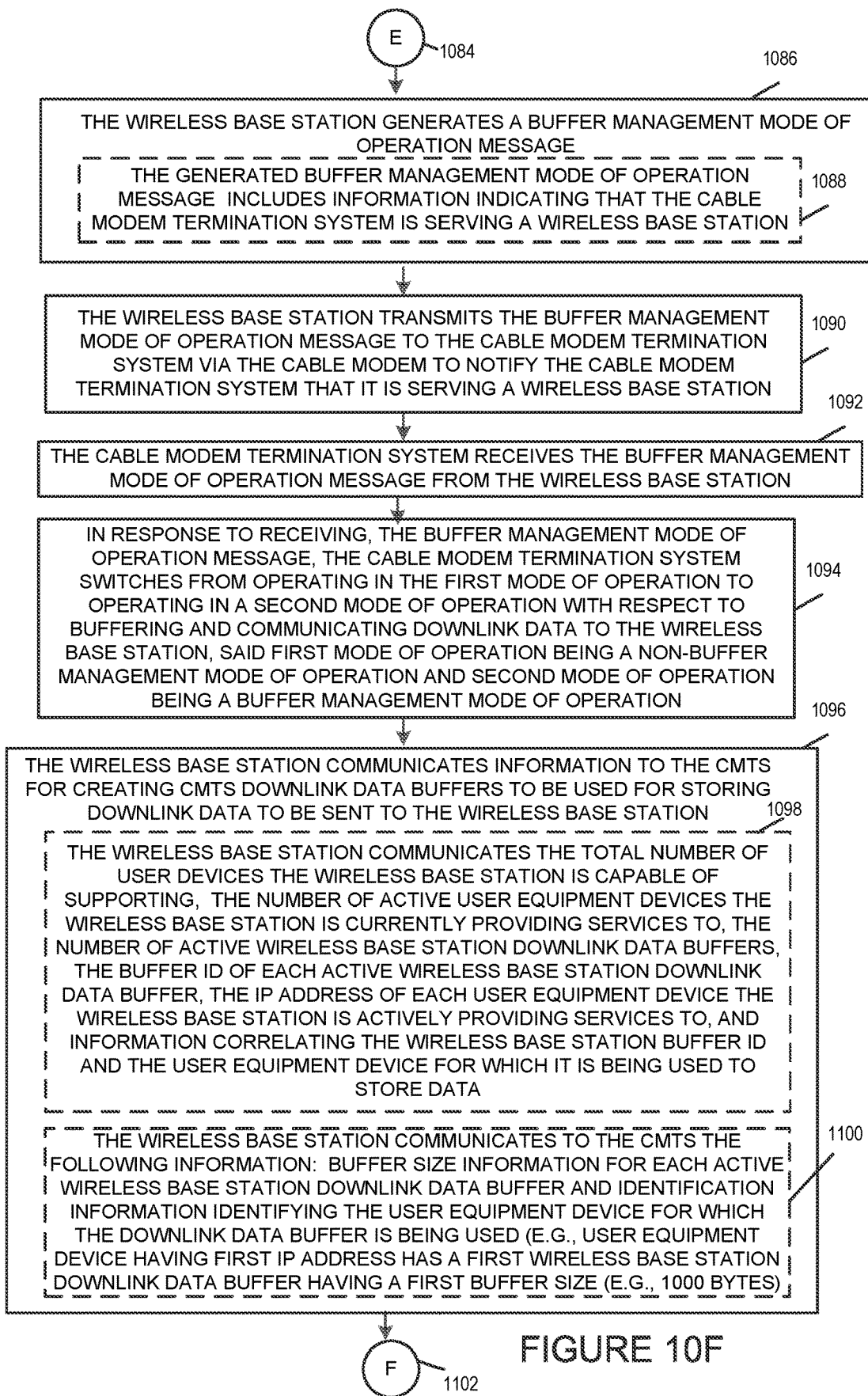
FIG. 10F illustrates the steps of the sixth part of an exemplary method in accordance with an embodiment of the present invention.

Operation proceeds from step 1068 via connection node D 1074 to step 1076 shown on FIG. 10E.

In step 1076, while operating n a first mode of operation with respect to the wireless base station, the CMTS utilizes a single CMTS downlink data buffer downlink data buffer for storing all downlink data received from a core network for the wireless base station without regard to user equipment devices being serviced by the wireless base station to which the received downlink data is to be sent. Operation proceeds from step 1076 to step 1078.

In step 1078, while operating in the first mode of operation with respect to the wireless base station, the CMTS performs the following operations: (i) receiving downlink data at the CMTS for two different user equipment devices being serviced by the wireless base station, (ii) storing the received downlink data in the single downlink data buffer for the wireless base station, and (iii) transmitting the stored downlink data to the wireless base station without waiting to receive a buffer statue message from the wireless base station. Operation proceeds from step 1078 to step 1080.

In step 1080, the wireless base station receives the data transmitted from the CMTS. Operation proceeds from step 1080 to step 1082.

In step 1082, the wireless base station stores the received downlink data for the two different user equipment devices in wireless downlink data buffers corresponding to the user equipment devices to which the data has been sent if space if available in the downlink data buffer otherwise the CMTS discards the received downlink data when the downlink data buffer for the user equipment device to which the downlink data has been sent is full. Operation proceeds from step 1082 via connection node E 1084 to step 1086 shown on FIG. 10F.

In step 1086, the wireless base station generates a buffer management mode of operation. In some embodiments step 1086 includes sub-step 1088. In sub-step 1088, the generated buffer management mode of operation message includes information indicating that the cable modem termination system is serving a wireless base station. Operation proceeds from step 1086 to step 1090.

In step 1090, the wireless base station transmits the buffer management mode of operation message to the cable modem termination system via the cable modem to notify the cable modem termination system that it is serving a wireless base station. Operation proceeds from step 1090 to step 1092.

In step 1092, the cable modem termination system receives the buffer management mode of operation message from the wireless base station. Operation proceeds from step 1092 to step 1094.

In step 1094, in response to receiving the buffer management mode of operation message, the cable modem termination system switches from operating in the first mode of operation to operating in a second mode of operation with respect to buffering and communicating downlink data to the wireless base station. The first mode of operation being a non-buffer management mode of operation and the second mode of operation being a buffer management mode of operation. Operation proceeds from step 1094 to step 1096.

In step 1096, the wireless base station communicates information to the CMTS for crating CMTS downlink data buffers to be used for storing downlink data to be sent to the wireless base station, e.g., downlink data received from the core network or from another user connected to another wireless base station. In some embodiments step 1096 includes one or more sub-steps 1098 and 1100.

In sub-step 1098, the wireless base station communicates, e.g., transmits, the total number of user equipment devices the wireless base station is capable of supporting, the number of active user equipment devices the wireless base station is currently providing services to, the number of active wireless base station downlink data buffers, the buffer ID of each active wireless base station downlink data buffer, the IP address of each user equipment device the wireless base station is actively providing services to, and information correlating the wireless base station buffer ID and the user equipment device for which it is being used to store data. In sub-step 1100, the wireless base station communicates to the CMTS the following information: buffer size information for each active wireless base station downlink and identification information identifying the user equipment device for which the downlink data buffer is being used (e.g., user equipment device having first IP address has a first wireless base station downlink data buffer having a first buffer size (e.g., 1000 bytes).

Figure 10G:
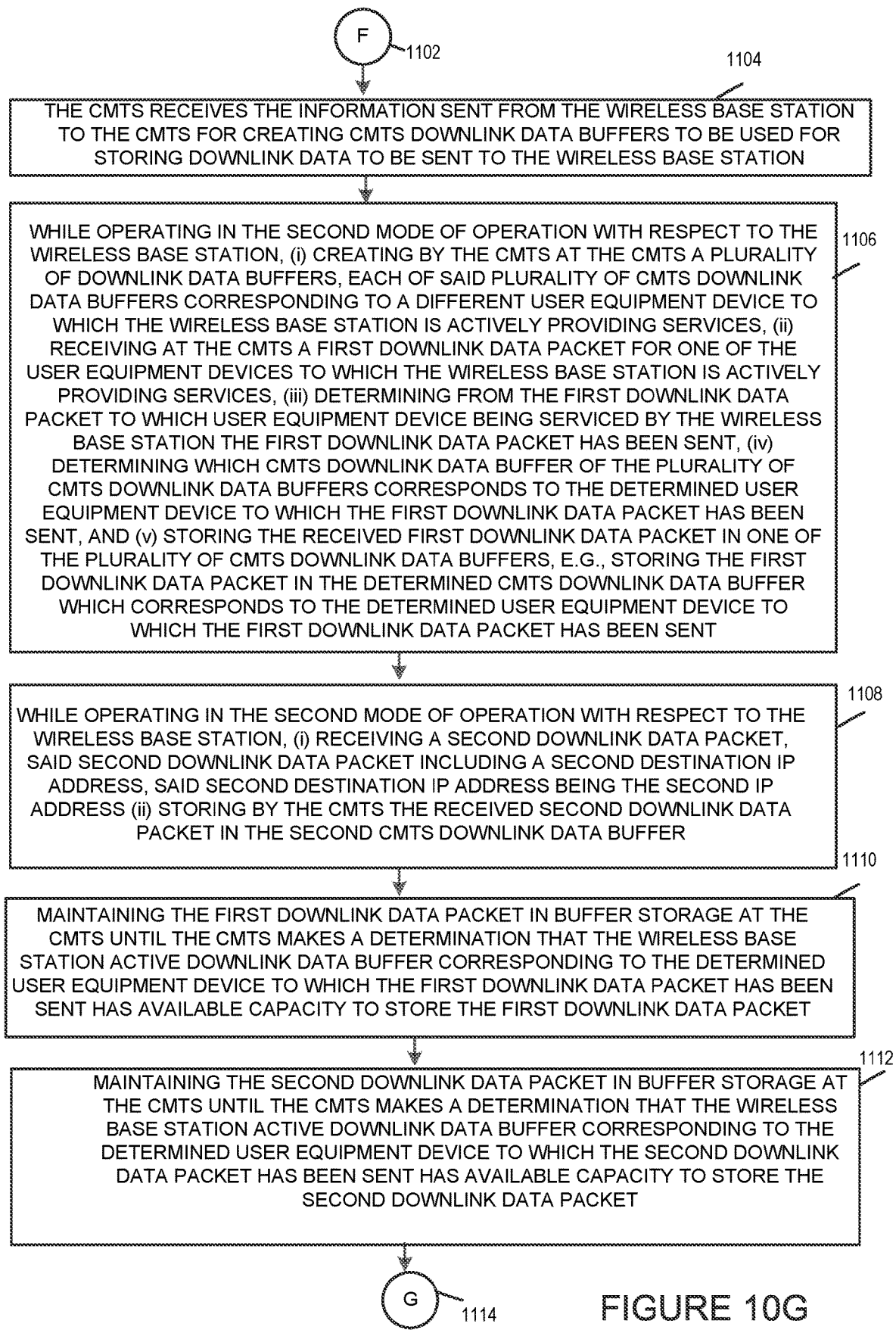
FIG. 10G illustrates the steps of the seventh part of an exemplary method in accordance with an embodiment of the present invention.
Figure 10H:
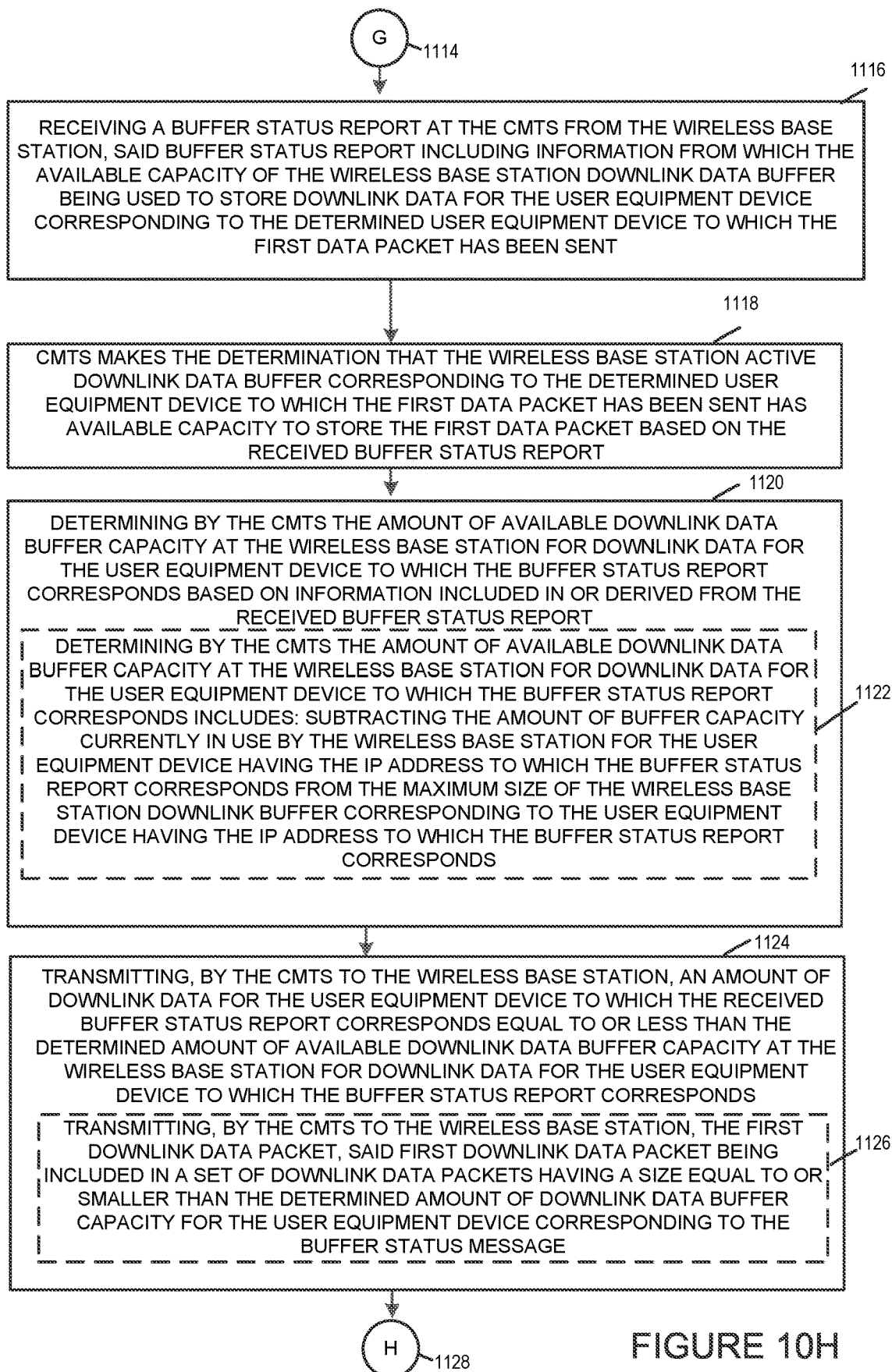
FIG. 10H illustrates the steps of the eighth part of an exemplary method in accordance with an embodiment of the present invention.
Figure 10I:
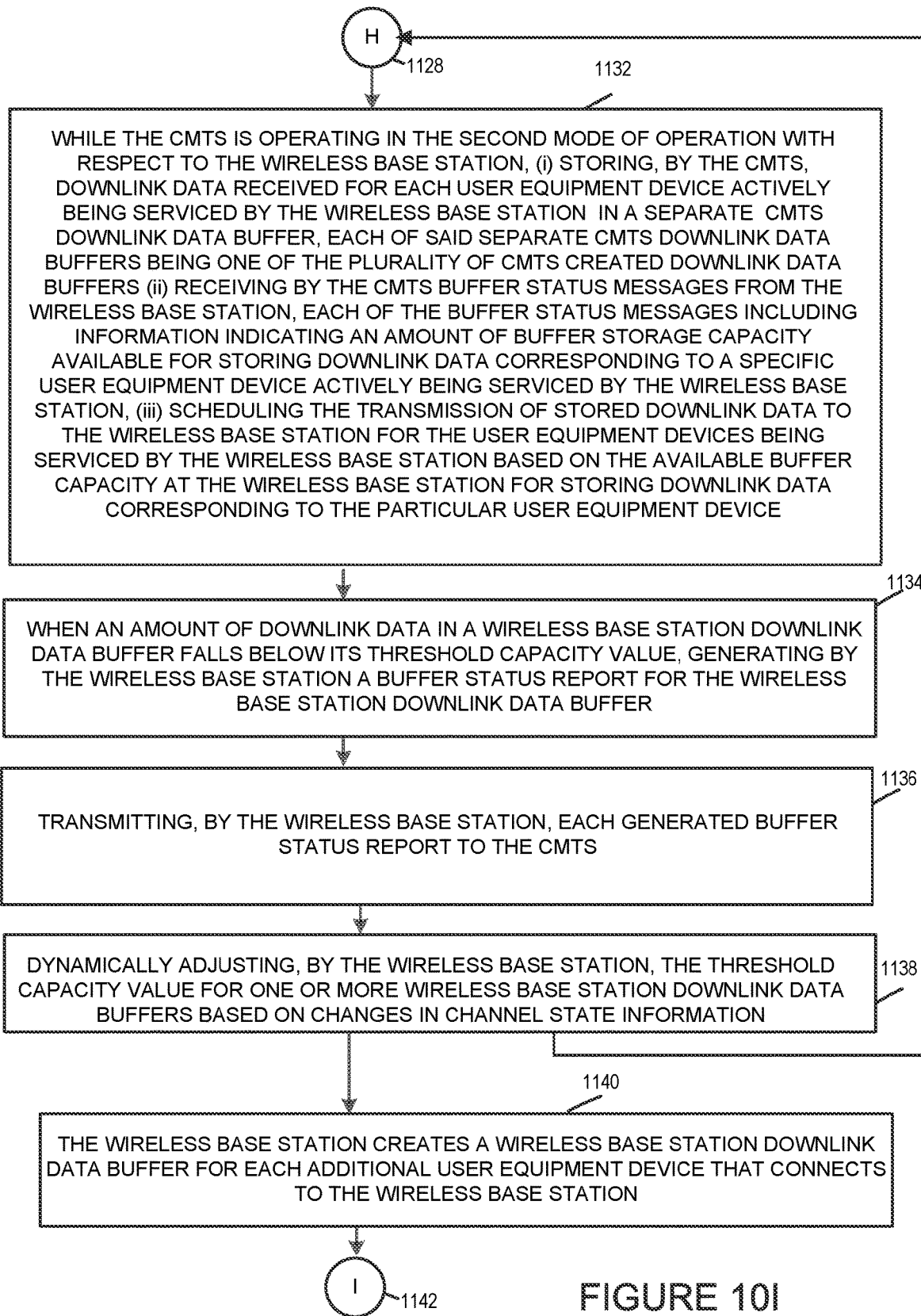
FIG. 10I illustrates the steps of the ninth part of an exemplary method in accordance with an embodiment of the present invention.

Operation proceeds from step 1096 via connection node F 1102 to step 1104 shown on FIG. 10G.

In step 1104, the CMTS receives the information sent from the wireless base station to the CMTS for creating CMTS downlink data buffers to be used for storing downlink data to be sent to the wireless base station. Operation proceeds from step 1104 to step 1106.

In step 1106, while operating in the second mode of operation with respect to the wireless base station, (i) creating by the CMTS at the CMTS a plurality of downlink data buffers, each of said plurality of CMTS downlink data buffers corresponding to a different user equipment device to which the wireless base station is actively providing services, (ii) receiving at the CMTS a first downlink data packet for one of the user equipment devices to which the wireless base station is actively providing services, (iii) determining from the first downlink data packet to which user equipment device being serviced by the wireless base station the first downlink has been sent, (vi) determining which CMTS downlink data buffer of the plurality of CMTS downlink data buffers corresponds to the determined user equipment device to which the first downlink data packet has been sent, and (v) storing the received first downlink data packet in one of the plurality of CMTS downlink data buffers, e.g., storing the first downlink data packet in the determined CMTS downlink data buffer which corresponds to the determined user equipment device to which the first downlink data packet has been sent. Operation proceeds from step 1106 to step 1108.

In step 1108, while the CMTS is operating in the second mode of operation with respect to the wireless base station, (i) receiving by the CMTS a second downlink data packet, the second downlink data packet including a second destination IP address, the second destination IP address being the second IP address; and (ii) storing by the CMTS the received second downlink data packet in the second CMTS downlink data buffer. Operation proceeds from step 1108 to step 1110.

In step 1110, maintaining the first downlink data packet in buffer storage at the CMTS until the CMTS makes a determination that the wireless base station active downlink data buffer corresponding to the determined user equipment device to which the first data packet has been sent has available capacity to store the first downlink data packet.

In step 1112, maintaining the second downlink data packet in buffer storage at the CMTS until the CMTS makes a determination that the wireless base station active downlink data buffer corresponding to the determined user equipment device to which the second data packet has been sent has available capacity to store the second downlink data packet. Operation proceeds from step 1112 via connection node G 1114 to step 1116 shown on FIG. 10H.

In step 1116, receiving a buffer status report at the CMTS from the wireless base station, the buffer status report including information from which the available capacity of the wireless base station downlink data buffer being used to store downlink data for the user equipment device corresponding to the determined user equipment device to which the first data packet has been sent. Operation proceeds from step 1116 to step 1118.

In step 1118, the CMTS makes the determination that the wireless base station active downlink buffer corresponding to the determined user equipment device to which the first data packet has been sent has available capacity to store the first data packet based on the received buffer status report. Operation proceeds from step 1118 to step 1120.

In step 1120, the CMTS determines the amount of available downlink data buffer capacity at the wireless base station for downlink data for the user equipment device to which the buffer status report corresponds based on information received and/or derived from the received buffer status report. In some embodiments, step 1120 includes sub-step 1122. In sub-step 1122 the CTMS determines the amount of available downlink data buffer capacity at the wireless base station for downlink data for the user equipment device to which the buffer status report corresponds includes the operation of: subtracting the amount of buffer capacity currently in use by the wireless base station for the user equipment device to which the buffer status report corresponds from the maximum size of the wireless base station downlink buffer corresponding to the user equipment device to which the buffer status report corresponds.

Operation proceeds from step 1120 to step 1124. In step 1124, the CMTS transmits to the wireless base station an amount of downlink data for the user equipment device to which the received buffer status report corresponds equal to or less than the determined amount of available downlink data buffer capacity at the wireless base station for downlink data for the user equipment device to which the buffer status report corresponds. In some embodiments, step 1124 includes sub-step 1126.

In sub-step 1126, the CMTS transmits to the wireless base station the first downlink data packet. The first downlink data packet being included in a set of downlink data packets, the set in total including data of an amount equal to or smaller than the determined amount of downlink data buffer capacity for the user equipment device corresponding to the buffer status message, said buffer status message corresponding to the user equipment device to which the first downlink data packet was sent. Operation proceeds from step 1124 via connection node H 1128 to step 1132.

In step 1132, while the CMTS is operating in the second mode of operation with respect to the wireless base station the CTMS performs the following operations: (i) storing downlink data received for each user equipment device actively being serviced by the wireless base station in a separate CMTS downlink data buffer, each of the separate CMTS downlink data buffers being one of the plurality of CMTS created downlink data buffers, (ii) receiving by the CMTS buffer status messages from the wireless base station, each of the buffer status messages including information indicating an amount of buffer storage capacity available for storing downlink data corresponding to a specific user equipment device actively being serviced by the wireless base station, (iii) scheduling the transmission of stored downlink data to the wireless base station for the user equipment devices being serviced by the wireless base station based on the available buffer capacity at the wireless base station for storing downlink data corresponding to the particular user equipment device. Operation proceeds from step 1132 to step 1134.

In step 1134, when an amount of downlink data in a wireless base station downlink data buffer falls below its threshold capacity value, generating by the wireless base station a buffer status report for the wireless base station downlink data buffer. Operation proceeds from step 1134 to step 1136.

In step 1136, transmitting, by the wireless base station, each generated buffer status report to the CMTS. Each buffer status indicating or including information indicating the amount of available buffer space in the wireless base station downlink buffer corresponding to the buffer status report. Operation proceeds from step 1136 to step 1138.

In step 1138, dynamically adjusting, by the wireless base station, the threshold capacity value for one or more wireless base station downlink data buffers based on changes in channel state information. For example, changes in channel state information corresponding to the wireless connection between the wireless base station and one or more user equipment devices corresponding to the one or more wireless base station downlink data buffers. Operation proceeds from step 1138 to step 1132 via connection node H 1130 and to step 1144 shown on FIG. 10J via connection node I 1142. Step 1132 is implemented as additional downlink data for user equipment devices being serviced by the wireless base station is received and stored by the CMTS. The steps of the method repeating.

In step 1144, the wireless base station sends updated wireless base station buffer information to the CMTS identifying: (i) wireless base station downlink data buffers which are no longer active (e.g., UE is no longer being actively serviced by the wireless base station) and (ii) additional user equipment devices which have connected to wireless base station and are actively being provided serviced (e.g., identifying UE IP address of additional UE), updated information on wireless base station downlink data buffers which are active (e.g., additional wireless base station downlink data buffers and corresponding UE IP addresses for which the buffers are to be used to store downlink data. Operation proceeds from step 1144 to step 1146.

In step 1146, the CMTS receives and uses the updated wireless base station buffer information to create downlink data buffers for each of the additional user equipment devices connected to the wireless base station and actively being provided services and to identify and deleted CMTS downlink data buffers that correspond to wireless base station downlink data buffers which are no longer active. Operation proceeds from step 1146 via connection node H 1148 to step 1132 shown on FIG. 10I where processing proceeds as previously described.

In some embodiments, steps 1106, 1108, 1110, 1112, 1116, 1118, 1120, 1124 are optional and the method proceeds from step 1104 to step 1132.

Various implementations and optional features of the method 1000 will now be discussed.

While the process of management of CMTS buffer storage with respect to a single CMTS and a single wireless base station has been described the process may be, and in some embodiments is implemented by numerous wireless base stations being serviced by a single CMTS. Similarly, each CMTS may implement the method for multiple wireless base stations it is serving.

In some embodiments, the wireless base station is part of a wireless network operated by a first service provider. In some embodiments, the cable modem is part of a cable network operated by the first service provider. In some embodiments, the cable modem termination system is part of the cable network operated by the first service provider. In some embodiments, the wireless base station is a Citizens Broadband Service Device (CBSD) and the wireless network is a Citizens Broadband Radio Service (CBRS) network. In most embodiments, the cable modem is powered by the cable modem termination system. In some embodiments, the wireless base station is powered by the cable modem termination system via the cable modem.

Various exemplary numbered embodiments illustrating different features of the present invention will now be discussed. The various features discussed may be used in variety of different combinations. The numbered embodiments are only exemplary and are not meant to be limiting to the scope of the invention.

List of Exemplary Numbered Method Embodiments:

Method Embodiment 1: A communications method comprising: receiving a buffer management mode of operation message at a cable modem termination system (CMTS) from a first wireless base station via a cable modem located on a communications path between the CMTS and the first wireless base station; switching, by the CMTS, from operating in a first mode of operation to operating in a second mode of operation with respect to buffering and communicating downlink data to the first wireless base station in response to receiving said buffer management mode of operation message; while operating in said second mode of operation: (i) creating by the CMTS a plurality of CMTS downlink data buffers, each of said plurality of CMTS downlink data buffers corresponding to a different user equipment device to which the first wireless base station is actively providing services; (ii) receiving at the CMTS a first downlink data packet for one of the user equipment devices to which the first wireless base station is actively providing services; and (iii) storing said received first downlink data packet in one of said plurality of CMTS downlink data buffers.

Method Embodiment 2. The communications method of Method Embodiment 1, further comprising: prior to storing said received first downlink data packet in one of said plurality of CMTS downlink data buffers: (i) determining from the first downlink data packet a user equipment device to which the first downlink data packet has been sent, said user equipment device being one of the user equipment devices to which the first wireless base station is actively providing services; (ii) determining which CMTS downlink data buffer of the plurality of CMTS downlink data buffers corresponds to the determined user equipment device to which the first downlink data packet has been sent; and (iii) wherein said storing, said received first downlink data packet in one of said plurality of CMTS downlink data buffers includes: storing said first downlink data packet in the determined CMTS downlink data buffer which corresponds to the determined user equipment device to which the first downlink data packet has been sent.

Method Embodiment 2A. The communications method of Method Embodiment 2, wherein one of said plurality of user equipment devices to which the first wireless base station is actively providing services is a first user equipment device, said first user equipment device having a first Internet Protocol address; wherein said plurality of CMTS downlink data buffers includes a first CMTS downlink data buffer corresponding to the first user equipment device; wherein said first downlink data packet includes a first IP destination address, said first IP destination address being the first IP address; and wherein said storing said first downlink data packet in the determined CMTS downlink data buffer which corresponds to the determined user equipment device to which the first downlink data packet has been sent includes: storing the first downlink data packet in the first CMTS downlink data buffer.

Method Embodiment 2B. The communications method of Method Embodiment 2A, wherein one of said plurality of user equipment devices to which the first wireless base station is actively providing services is a second user equipment device, said second user equipment device having a second Internet Protocol address; wherein said plurality of CMTS downlink data buffers includes a second CMTS downlink data buffer corresponding to the second user equipment device.

Method Embodiment 2C. The communications method of Method Embodiment 2B, further comprising: while operating in said second mode of operation: (i) receiving a second downlink data packet, said second downlink data packet including a second destination IP address, said second destination IP address being said second IP address; and (ii) storing by the CMTS the received second downlink data packet in the second CMTS downlink data buffer.

Method Embodiment 2D. The communications method of Method Embodiment 1, wherein the first wireless base station is a Citizens Broadband Radio Service Device operating as part of a Citizens Broadband Radio Service Network.

Method Embodiment 2E. The communications method of Method Embodiment 1, wherein said second mode of operation is a buffer management mode of operation; and wherein said first mode of operation is a non-buffer management mode of operation.

Method Embodiment 2F. The communications method of Method Embodiment 2B, further comprising: while operating in said first mode of operation with respect to the first wireless base station, utilizing a single CMTS downlink buffer for storing all downlink data received from a core network for the first wireless base station without regard to user equipment devices being serviced by the first wireless base station to which the received downlink data is to be sent.

Method Embodiment 2F1. The communications method of Method Embodiment 2F, further comprising: while operating in said first mode of operation: (i) receiving downlink data at the CMTS for two different user equipment devices being serviced by the first wireless base station; (ii) storing said received downlink data in the single downlink data buffer for the first wireless base station; and (iii) transmitting said stored downlink data to the first wireless base station without waiting to receive a buffer status message from the first wireless base station.

Method Embodiment 3. The communications method of Method Embodiment 2, wherein the buffer management mode message includes information notifying the CMTS that the CMTS is serving a wireless base station.

Method Embodiment 4. The communications method of Method Embodiment 3 further comprising: receiving at the CMTS from the first wireless base station first information, said first information including an identifier for each user equipment device to which the first wireless base station is actively providing services, said first information including a first user equipment device identifier for the first user equipment device to which the first wireless base station is actively providing services.

Method Embodiment 4A. The communications method of Method Embodiment 4, wherein said first information is included in the buffer management mode of operation message.

Method Embodiment 4AA. The communications method of Method Embodiment 4, wherein said first information is included in one or more messages which are different than said buffer management mode of operation message.

Method Embodiment 4B. The communications method of Method Embodiment 4, wherein said first information includes one or more of the following: (i) a maximum number of user equipment devices that the first wireless base station is capable of supporting; (ii) number of active downlink data buffers at the first wireless base station, (iii) number of user equipment devices actively being serviced by the first wireless base station, (iv) size of each active downlink data buffer and the corresponding user equipment device for which it is being used to store received downlink data, and (v) Internet Protocol (IP) address of each user equipment device actively being serviced by the first wireless base station.

Method Embodiment 4BB. The communications method of Method Embodiment 4B, wherein said user equipment device IP address is used as a downlink data buffer identifier by the first wireless base station; and wherein the size of each active downlink data buffers is specified in bytes.

Method Embodiment 4BBB. The communications method of Method Embodiment 4BB, wherein said user equipment IP address is used as a downlink data buffer identifier by the CMTS.

Method Embodiment 4C. The communications method of Method Embodiment 4B, wherein said first information is included in the buffer management mode of operation message.

Method Embodiment 4CC. The communications method of Method Embodiment 4BBB, wherein said first information is included in one or more messages which are different than said buffer management mode of operation message.

Method Embodiment 4CCC. The communications method of Method Embodiment 4B, wherein said first information is included in a plurality of messages which are different from the buffer management mode of operation message, each of said plurality of messages including a portion of the first information corresponding to a single user equipment device.

Method Embodiment 5. The communications method of Method Embodiment 4, wherein the identifier for each user equipment device is an Internet Protocol (IP) address being used by the user equipment device, each of said IP addresses being different; and wherein the first user equipment device identifier is a first IP address being used by the first user equipment device.

Method Embodiment 5A. The communications method of Method Embodiment 5, wherein said determining from the first downlink data packet to which user equipment device being serviced by the first wireless base station the first downlink data packet has been sent includes: identifying the user equipment device to which the first downlink data packet has been sent based on a destination IP address included in the first downlink data packet and said first information received from said first wireless base station.

Method Embodiment 6. The communications method of Method Embodiment 5, wherein each user equipment device to which the wireless base station is actively providing services has a separate active wireless base station downlink data buffer located at the wireless base station; wherein said first information further includes a buffer size of each of the active wireless base station downlink data buffers and an indication as to which wireless base station downlink data buffer each buffer size corresponds and an indication as to which user equipment device each active wireless base station downlink data buffer corresponds.

Method Embodiment 7. The communications method of Method Embodiment 2, further comprising: maintaining the first downlink data packet in buffer storage at the CMTS until the CMTS makes a determination that a first wireless base station active downlink data buffer corresponding to the determined user equipment device to which the first data packet has been sent has available capacity to store the first downlink data packet.

Method Embodiment 8. The communications method of Method Embodiment 7, further comprising: receiving a buffer status report at the CMTS from the first wireless base station, said buffer status report including information from which the available capacity of the first wireless base station downlink data buffer, being used to store downlink data for the user equipment device corresponding to the determined user equipment device to which the first data packet has been sent, can be determined; and wherein said CMTS makes said determination that the first wireless base station active downlink data buffer corresponding to the determined user equipment device to which the first data packet has been sent has available capacity to store the first data packet based on said received buffer status report.

Method Embodiment 9. The communications method of Method Embodiment 8, wherein the buffer status report includes: (i) a user equipment device IP address of the user equipment device to which the buffer status report corresponds and (ii) an amount of buffer capacity corresponding to the user equipment device IP address currently being used for data storage at the first wireless base station.

Method Embodiment 9A. The communications method of Method Embodiment 8, wherein the buffer status report includes: (i) the user equipment device IP address of the user equipment device to which the buffer status report corresponds and (ii) the amount of available downlink buffer capacity corresponding to the user equipment device having the IP address to which the buffer status report corresponds.

Method Embodiment 10. The communications method of Method Embodiment 9, further comprising: determining by the CMTS the amount of available downlink data buffer capacity at the first wireless base station for downlink data for the user equipment device having the IP address to which the buffer status report corresponds includes: subtracting the amount of buffer capacity currently in use by the first wireless base station for the user equipment device having the IP address to which the buffer status report corresponds from the maximum size of the first wireless base station downlink buffer corresponding to the user equipment device having the IP address to which the buffer status report corresponds (e.g., UE 1 has a first IP address, first wireless base station creates a first downlink data buffer corresponds to first IP address to store data received for the UE 1, the first downlink data buffer has a maximum size of 100 bytes, the buffer status report indicates 20 bytes are in use, the CMTS determines that 80 bytes of data can be transmitted to the first wireless base station for UE 1 from the CMTS downlink data buffer for UE 1 corresponding to the first IP address).

Method Embodiment 11. The communications method of Method Embodiment 1, further comprising: while the CMTS is operating in said second mode of operation, (i) storing, by the CMTS, downlink data received for each user equipment device actively being serviced by the first wireless base station in a separate CMTS downlink data buffer, each of said separate CMTS downlink data buffers being one of the plurality of CMTS created downlink data buffers; (ii) receiving by the CMTS buffer status messages from the first wireless base station, each of said buffer status messages including information indicating an amount of buffer storage capacity available for storing downlink data corresponding to a specific user equipment device actively being serviced by the first wireless base station; and (iii) scheduling the transmission of stored downlink data to the first wireless base station for the user equipment devices being serviced by the first wireless base station based on the available buffer capacity at the first wireless base station for storing downlink data corresponding to the particular user equipment device.

Method Embodiment 12. The communications method of Method Embodiment 11, wherein said scheduling the transmission of stored downlink data to the first wireless base station for the user equipment devices being serviced by the first wireless base station based on the available buffer capacity at the first wireless base station for storing downlink data corresponding to the particular user equipment device includes only scheduling the transmission of downlink data to the first wireless base station for a particular user equipment device in response to receiving a buffer status message including information that the first wireless base station has an amount of buffer capacity available for storing downlink data for the particular user equipment device at the first wireless base station and then only scheduling the transmission of the amount of downlink data equal to or less than the amount of available buffer capacity indicated as being available.

Method Embodiment 13. The communications method of Method Embodiment 1, further comprising: establishing a plurality of wireless connections between the first wireless base station and the plurality of user equipment devices to which the first wireless base station is providing wireless services; and creating by the first wireless base station a wireless base station downlink data buffer for each of the plurality of user equipment devices.

Method Embodiment 14. The communications method of Method Embodiment 13, further comprising: prior to creating a wireless base station downlink data buffer for a user equipment device, determining the size of the downlink data buffer to be created for the user equipment device based on one or more of the following: information received from the user equipment device (e.g., device type, hardware version, software version, model type, anticipated traffic type (e.g., downlink dominated traffic type or uplink dominated traffic type), latency requirements, amount of storage space available for buffering downlink data at the first wireless base station, number of user equipment devices being serviced by the first wireless base station, maximum number of user equipment devices which the first wireless base station is capable of servicing, historical amount of downlink data traffic received for the user equipment device; and associating with each created wireless base station downlink data buffer a unique buffer identifier, said wireless base station downlink buffer identifier identifying the user equipment device for which the wireless base station downlink data buffer is to be used.

Method Embodiment 15. The communications method of Method Embodiment 14, wherein said unique wireless base station buffer identifier is a user equipment device IP address; and wherein said user equipment device IP address is the user equipment device IP address of the user equipment device for which wireless base station downlink data buffer is to be used.

Method Embodiment 16. The communications method of Method Embodiment 15, further comprising: setting, by the wireless base station, a threshold capacity value, for each created wireless base station downlink data buffer, said threshold capacity value being based on one or more of the following: (i) user equipment device type of the user equipment for which the wireless base station downlink data buffer is to be used, (ii) traffic latency requirements of the user equipment device for which the wireless base station downlink data buffer is to be used (e.g., low latency requirement or a maximum amount of transmission latency), (iii) data rate or speed with which an amount of data can be transmitted from the CMTS to the first wireless base station, (iv) channel state information of the wireless downlink communications channel between the first wireless base station and the user equipment device for which the wireless base station downlink buffer is to be used, (v) channel conditions between the first wireless base station and the user equipment device for which the wireless base station downlink buffer is to be used, (vi) modulation coding scheme used by the first wireless base station to transmit downlink data to the user equipment device for which the wireless base station downlink data buffer is to be used, and (vii) distance of the user equipment device, for which the wireless base station downlink data buffer is to be used, from the first wireless base station.

Method Embodiment 17. The communications method of Method Embodiment 16, further comprising: when an amount of downlink data in a wireless base station downlink data buffer falls below its threshold capacity value, generating, by the wireless base station, a buffer status report for the wireless base station downlink data buffer; and transmitting, by the wireless base station, said generated buffer status report to the CMTS.

Method Embodiment 18. The communications method of Method Embodiment 17, wherein said buffer status report includes: (i) an indication of the user equipment device for which downlink buffer data is to be sent, and (ii) a maximum amount of downlink data that is to be sent in response to the buffer status report.

Method Embodiment 19. The communications method of Method Embodiment 18, further comprising: dynamically adjusting the threshold capacity value for one or more wireless base station downlink data buffers based on changes in channel state information.

Method Embodiment 20. The communications method of Method Embodiment 19, wherein said setting, by the wireless base station, a threshold capacity value, for each created wireless base station downlink data buffer includes determining an optimum threshold capacity for each created wireless base station downlink data buffer based on latency requirements for the data traffic being stored in the particular wireless base station downlink data buffer and which also prevents buffer overflow for the created wireless base station downlink data buffer.

List of Exemplary Numbered System Embodiments:

System Embodiment 1. A communications system comprising: a cable modem termination system, said cable modem termination system including: a memory; and a first processor that controls the cable modem termination system to perform the following operations: receiving a buffer management mode of operation message from a first wireless base station via a cable modem located on a communications path between the CMTS and the first wireless base station; switching, by the CMTS, from operating in a first mode of operation to operating in a second mode of operation with respect to buffering and communicating downlink data to the first wireless base station in response to receiving said buffer management mode of operation message; while operating in said second mode of operation: (i) creating by the CMTS in the memory included in the CMTS a plurality of CMTS downlink data buffers, each of said plurality of CMTS downlink data buffers corresponding to a different user equipment device to which the first wireless base station is actively providing services; (ii) receiving at the CMTS a first downlink data packet for one of the user equipment devices to which the first wireless base station is actively providing services; and (iii) storing said received first downlink data packet in one of said plurality of CMTS downlink data buffers.

System Embodiment 2. The communications system of System Embodiment 1, wherein the first processor further controls the cable modem termination system to perform the following additional operations: prior to storing said received first downlink data packet in one of said plurality of CMTS downlink data buffers: (i) determining from the first downlink data packet a user equipment device to which the first downlink data packet has been sent, said user equipment device being one of the user equipment devices to which first wireless base station is actively providing services; (ii) determining which CMTS downlink data buffer of the plurality of CMTS downlink data buffers corresponds to the determined user equipment device to which the first downlink data packet has been sent; and (iii) wherein said operation of storing, said received first downlink data packet in one of said plurality of CMTS downlink data buffers includes: storing said first downlink data packet in the determined CMTS downlink data buffer which corresponds to the determined user equipment device to which the first downlink data packet has been sent.

System Embodiment 2A. The communications system of System Embodiment 2, wherein one of said plurality of user equipment devices to which the first wireless base station is actively providing services is a first user equipment device, said first user equipment device having a first Internet Protocol address; wherein said plurality of CMTS downlink data buffers includes a first CMTS downlink data buffer corresponding to the first user equipment device; wherein said first downlink data packet includes a first IP destination address, said first IP destination address being the first IP address; and wherein said operation of storing said first downlink data packet in the determined CMTS downlink data buffer which corresponds to the determined user equipment device to which the first downlink data packet has been sent includes: storing the first downlink data packet in the first CMTS downlink data buffer.

System Embodiment 2B. The communications system of System Embodiment 2A, wherein one of said plurality of user equipment devices to which the first wireless base station is actively providing services is a second user equipment device, said second user equipment device having a second Internet Protocol address; and wherein said plurality of CMTS downlink data buffers includes a second CMTS downlink data buffer corresponding to the second user equipment device.

System Embodiment 2C. The communications system of System Embodiment 2B, wherein the first processor further controls the CMTS to perform the additional operations of: while operating in said second mode of operation: (i) receiving a second downlink data packet, said second downlink data packet including a second destination IP address, said second destination IP address being said second IP address; and (ii) storing by the CMTS the received second downlink data packet in the second CMTS downlink data buffer.

System Embodiment 2D. The communications system of System Embodiment 1, wherein the first wireless base station is a Citizens Broadband Radio Service Device operating as part of a Citizens Broadband Radio Service Network.

System Embodiment 2E. The communications system of System Embodiment 1, wherein said second mode of operation is a buffer management mode of operation; and wherein said first mode of operation is a non-buffer management mode of operation.

System Embodiment 2F. The communications system of System Embodiment 2B, wherein the first processor further controls the CMTS to perform the additional operation of: while operating in said first mode of operation with respect to the first wireless base station, utilizing a single CMTS downlink buffer for storing all downlink data received from a core network for the first wireless base station without regard to user equipment devices being serviced by the first wireless base station to which the received downlink data is to be sent.

System Embodiment 2F1. The communications system of System Embodiment 2F, wherein the first processor further controls the CMTS to perform the following additional operations while operating in said first mode of operation: (i) receiving downlink data at the CMTS for two different user equipment devices being serviced by the first wireless base station; (ii) storing said received downlink data in the single downlink data buffer for the first wireless base station; and (iii) transmitting said stored downlink data to the first wireless base station without waiting to receive a buffer status message from the first wireless base station.

System Embodiment 3. The communications system of System Embodiment 2, wherein the buffer management mode of operation message includes information notifying the CMTS that the CMTS is serving a wireless base station.

System Embodiment 4. The communications system of System Embodiment 3, wherein the first processor further controls the CMTS to perform the additional operation of: receiving at the CMTS from the first wireless base station first information, said first information including an identifier for each user equipment device to which the first wireless base station is actively providing services, said first information including a first user equipment device identifier for the first user equipment device to which the first wireless base station is actively providing services.

System Embodiment 4A. The communications system of System Embodiment 4, wherein said first information is included in the buffer management mode of operation message.

System Embodiment 4AA. The communications system of System Embodiment 4, wherein said first information is included in one or more messages which are different than said buffer management mode of operation message.

System Embodiment 4B. The communications system of System Embodiment 4, wherein said first information includes one or more of the following: (i) a maximum number of user equipment devices that the first wireless base station is capable of supporting; (ii) number of active downlink data buffers at the first wireless base station, (iii) number of user equipment devices actively being serviced by the first wireless base station, (iv) size of each active downlink data buffer and the corresponding user equipment device for which it is being used to store received downlink data, and (v) Internet Protocol (IP) address of each user equipment device actively being serviced by the first wireless base station.

System Embodiment 4BB. The communications system of System Embodiment 4B, wherein said user equipment device IP address is used as a downlink data buffer identifier by the first wireless base station; and wherein the size of each active downlink data buffers is specified in bytes.

System Embodiment 4BBB. The communications system of System Embodiment 4BB, wherein said user equipment IP address is used as a downlink data buffer identifier by the CMTS.

System Embodiment 4C. The communications system of System Embodiment 4B, wherein said first information is included in the buffer management mode of operation message.

System Embodiment 4CC. The communications system of System Embodiment 4BBB, wherein said first information is included in one or more messages which are different than said buffer management mode of operation message.

System Embodiment 4CCC. The communications system of System Embodiment 4B, wherein said first information is included in a plurality of messages which are different from the buffer management mode of operation message, each of said plurality of messages including a portion of the first information corresponding to a single user equipment device.

System Embodiment 5. The communications system of System Embodiment 4, wherein the identifier for each user equipment device is an Internet Protocol (IP) address being used by the user equipment device, each of said IP addresses being different; and wherein the first user equipment device identifier is a first IP address being used by the first user equipment device.

System Embodiment 5A. The communications system of System Embodiment 5, wherein said operation of determining from the first downlink data packet to which user equipment device being serviced by the first wireless base station the first downlink data packet has been sent includes: identifying the user equipment device to which the first downlink data packet has been sent based on a destination IP address included in the first downlink data packet and said first information received from said first wireless base station.

System Embodiment 6. The communications system of System Embodiment 5, wherein each user equipment device to which the wireless base station is actively providing services has a separate active wireless base station downlink data buffer located at the wireless base station; wherein said first information further includes a buffer size of each of the active wireless base station downlink data buffers and an indication as to which wireless base station downlink data buffer each buffer size corresponds and an indication as to which user equipment device each active wireless base station downlink data buffer corresponds.

System Embodiment 7. The communications system of System Embodiment 2, wherein the first processor further controls the CMTS to perform the additional operation of: maintaining the first downlink data packet in buffer storage at the CMTS until the CMTS makes a determination that a first wireless base station active downlink data buffer corresponding to the determined user equipment device to which the first data packet has been sent has available capacity to store the first downlink data packet.

System Embodiment 8. The communications system of System Embodiment 7, wherein the first processor further controls the CMTS to perform the additional operation of: receiving a buffer status report at the CMTS from the first wireless base station, said buffer status report including information from which the available capacity of the first wireless base station downlink data buffer, being used to store downlink data for the user equipment device corresponding to the determined user equipment device to which the first data packet has been sent, can be determined; and wherein said CMTS makes said determination that the first wireless base station active downlink data buffer corresponding to the determined user equipment device to which the first data packet has been sent has available capacity to store the first data packet based on said received buffer status report.

System Embodiment 9. The communications system of System Embodiment 8, wherein the buffer status report includes: (i) a user equipment device IP address of the user equipment device to which the buffer status report corresponds and (ii) an amount of buffer capacity corresponding to the user equipment device IP address currently being used for data storage at the first wireless base station.

System Embodiment 9A. The communications system of System Embodiment 8, wherein the buffer status report includes: (i) the user equipment device IP address of the user equipment device to which the buffer status report corresponds and (ii) the amount of available downlink buffer capacity corresponding to the user equipment device having the IP address to which the buffer status report corresponds.

System Embodiment 10. The communications system of System Embodiment 9, wherein the first processor further controls the CMTS to performing the following additional operation: determining the amount of available downlink data buffer capacity at the first wireless base station for downlink data for the user equipment device having the IP address to which the buffer status report corresponds includes: subtracting the amount of buffer capacity currently in use by the first wireless base station for the user equipment device having the IP address to which the buffer status report corresponds from the maximum size of the first wireless base station downlink buffer corresponding to the user equipment device having the IP address to which the buffer status report corresponds (e.g., UE 1 has a first IP address, first wireless base station creates a first downlink data buffer corresponds to first IP address to store data received for the UE 1, the first downlink data buffer has a maximum size of 100 bytes, the buffer status report indicates 20 bytes are in use, the CMTS determines that 80 bytes of data can be transmitted to the first wireless base station for UE 1 from the CMTS downlink data buffer for UE 1 corresponding to the first IP address).

System Embodiment 11. The communications system of System Embodiment 1, wherein the first processor further controls the CMTS to perform the following additional operations: while the CMTS is operating in said second mode of operation, (i) storing, by the CMTS, downlink data received for each user equipment device actively being serviced by the first wireless base station in a separate CMTS downlink data buffer, each of said separate CMTS downlink data buffers being one of the plurality of CMTS created downlink data buffers; (ii) receiving by the CMTS buffer status messages from the first wireless base station, each of said buffer status messages including information indicating an amount of buffer storage capacity available for storing downlink data corresponding to a specific user equipment device actively being serviced by the first wireless base station; and (iii) scheduling the transmission of stored downlink data to the first wireless base station for the user equipment devices being serviced by the first wireless base station based on the available buffer capacity at the first wireless base station for storing downlink data corresponding to the particular user equipment device.

System Embodiment 12. The communications system of System Embodiment 11, wherein said operation of scheduling the transmission of stored downlink data to the first wireless base station for the user equipment devices being serviced by the first wireless base station based on the available buffer capacity at the first wireless base station for storing downlink data corresponding to the particular user equipment device includes only scheduling the transmission of downlink data to the first wireless base station for a particular user equipment device in response to receiving a buffer status message including information that the first wireless base station has an amount of buffer capacity available for storing downlink data for the particular user equipment device at the first wireless base station and then only scheduling the transmission of the amount of downlink data equal to or less than the amount of available buffer capacity indicated as being available.

System Embodiment 13. The communications system of System Embodiment 1, wherein the first wireless base station includes a memory and a second processor, said processor controls the first wireless base station to perform the following operations: establishing a plurality of wireless connections between the first wireless base station and the plurality of user equipment devices to which the first wireless base station is providing wireless services; and creating in memory included in the first wireless base station a wireless base station downlink data buffer for each of the plurality of user equipment devices.

System Embodiment 14. The communications system of System Embodiment 13, wherein the second processor further controls the first wireless base station to perform the following operations: prior to creating a wireless base station downlink data buffer for a user equipment device, determining the size of the downlink data buffer to be created for the user equipment device based on one or more of the following: information received from the user equipment device (e.g., device type, hardware version, software version, model type, anticipated traffic type (e.g., downlink dominated traffic type or uplink dominated traffic type), latency requirements, amount of storage space available for buffering downlink data at the first wireless base station, number of user equipment devices being serviced by the first wireless base station, maximum number of user equipment devices which the first wireless base station is capable of servicing, historical amount of downlink data traffic received for the user equipment device; and associating with each created wireless base station downlink data buffer a unique buffer identifier, said wireless base station downlink buffer identifier identifying the user equipment device for which the wireless base station downlink data buffer is to be used.

System Embodiment 15. The communications system of System Embodiment 14, wherein said unique wireless base station buffer identifier is a user equipment device IP address; and wherein said user equipment device IP address is the user equipment device IP address of the user equipment device for which wireless base station downlink data buffer is to be used.

System Embodiment 16. The communications system of System Embodiment 15, wherein the second processor further controls the first wireless base station to perform the following operation: setting, by the wireless base station, a threshold capacity value, for each created wireless base station downlink data buffer, said threshold capacity value being based on one or more of the following: (i) user equipment device type of the user equipment for which the wireless base station downlink data buffer is to be used, (ii) traffic latency requirements of the user equipment device for which the wireless base station downlink data buffer is to be used (e.g., low latency requirement or a maximum amount of transmission latency), (iii) data rate or speed with which an amount of data can be transmitted from the CMTS to the first wireless base station, (iv) channel state information of the wireless downlink communications channel between the first wireless base station and the user equipment device for which the wireless base station downlink buffer is to be used, (v) channel conditions between the first wireless base station and the user equipment device for which the wireless base station downlink buffer is to be used, (vi) modulation coding scheme used by the first wireless base station to transmit downlink data to the user equipment device for which the wireless base station downlink data buffer is to be used, and (vii) distance of the user equipment device, for which the wireless base station downlink data buffer is to be used, from the first wireless base station.

System Embodiment 17. The communications system of System Embodiment 16, wherein the second processor further controls the first wireless base station to perform the following additional operations: when an amount of downlink data in a wireless base station downlink data buffer falls below its threshold capacity value, generating, by the wireless base station, a buffer status report for the wireless base station downlink data buffer; and transmitting, by the wireless base station, said generated buffer status report to the CMTS.

System Embodiment 18. The communications system of System Embodiment 17, wherein said buffer status report includes: (i) an indication of the user equipment device for which downlink buffer data is to be sent, and (ii) a maximum amount of downlink data that is to be sent in response to the buffer status report.

System Embodiment 19. The communications system of System Embodiment 18, wherein the second processor further controls the first wireless base station to perform the following additional operation: dynamically adjusting the threshold capacity value for one or more wireless base station downlink data buffers based on changes in channel state information.

System Embodiment 20. The communications system of System Embodiment 19, wherein the operation of setting, by the wireless base station, a threshold capacity value, for each created wireless base station downlink data buffer includes determining an optimum threshold capacity for each created wireless base station downlink data buffer based on latency requirements for the data traffic being stored in the particular wireless base station downlink data buffer and which also prevents buffer overflow for the created wireless base station downlink data buffer.

List of Exemplary Numbered Non-transitory Computer Readable Medium Embodiments:

Non-transitory Computer Readable Medium Embodiment 1. A non-transitory computer readable medium including a first set of computer executable instructions which when executed by a processor of a cable modem termination system (CMTS) cause the CMTS to perform the steps of: receiving a buffer management mode of operation message from a first wireless base station via a cable modem located on a communications path between the CMTS and the first wireless base station; switching, by the CMTS, from operating in a first mode of operation to operating in a second mode of operation with respect to buffering and communicating downlink data to the first wireless base station in response to receiving said buffer management mode of operation message; and while operating in said second mode of operation: (i) creating by the CMTS a plurality of CMTS downlink data buffers, each of said plurality of CMTS downlink data buffers corresponding to a different user equipment device to which the first wireless base station is actively providing services; (ii) receiving at the CMTS a first downlink data packet for one of the user equipment devices to which the first wireless base station is actively providing services; and (iii) storing said received first downlink data packet in one of said plurality of CMTS downlink data buffers.

Non-transitory Computer Readable Medium Embodiment 2. The Non-transitory Computer Readable Medium of Non-transitory Computer Readable Medium Embodiment 1, wherein the first set of computer executable instructions which when executed by the processor of the CMTS further cause the CMTS to perform the additional steps of: prior to storing said received first downlink data packet in one of said plurality of CMTS downlink data buffers: (i) determining from the first downlink data packet a user equipment device to which the first downlink data packet has been sent, said user equipment device being one of the user equipment devices to which the first wireless base station is actively providing services; (ii) determining which CMTS downlink data buffer of the plurality of CMTS downlink data buffers corresponds to the determined user equipment device to which the first downlink data packet has been sent; and (iii) wherein said storing, said received first downlink data packet in one of said plurality of CMTS downlink data buffers includes: storing said first downlink data packet in the determined CMTS downlink data buffer which corresponds to the determined user equipment device to which the first downlink data packet has been sent.

The techniques of various embodiments may be implemented using software, hardware and/or a combination of software and hardware. Various embodiments are directed to apparatus, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements. Various embodiments are also directed to methods, e.g., method of controlling and/or operating cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements described herein are implemented using one or more components to perform the steps corresponding to one or more methods, for example, generating or creating buffers, implementing timers, connections, message reception, message transmission, powering on and off receivers, transmitters, and or transceivers, buffering data, flushing data from buffers, determining buffer sizes and amount of time for a buffer to fill to its capacity, signal processing, sending, comparing, determining and/or transmission steps. Thus, in some embodiments various features are implemented using components or in some embodiments logic such as for example logic circuits.

Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements are configured to perform the steps of the methods described as being performed by the cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements, with a processor which includes a component corresponding to each of the steps of the various described methods performed by the device in which the processor is included. In some but not all embodiments a device, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements, Session Management Function nodes/devices, subscriber devices, servers, nodes and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
    receiving first information, at a Cable Modem Termination System (CMTS), from a first wireless base station via a cable modem located on a communications path between the first wireless base station and the CMTS, said first information including a first identifier for a first user equipment device to which the first wireless base station is actively providing services and a wireless base station downlink data buffer size for the first user equipment device;
    creating, at the CMTS, a first CMTS downlink data buffer for the first user equipment device;

receiving, at the CMTS, a first downlink data packet for the first user equipment device; and storing said received first downlink data packet in said first CMTS downlink data buffer.

2. The communications method of claim 1, further comprising:
prior to storing said received first downlink data packet in said first CMTS downlink data buffer:
(i) determining from the first downlink data packet, by the CMTS, a user equipment device to which the first downlink data packet has been sent; and
(ii) determining, by the CMTS, which CMTS downlink data buffer from a plurality of CMTS downlink data buffers at the CMTS corresponds to the determined user equipment device to which the first downlink data packet has been sent.

3. The communications method of claim 2,
wherein said determining from the first downlink data packet, by the CMTS, the user equipment device to which the first downlink data packet has been sent includes: identifying the user equipment device to which the first downlink data packet has been sent based on a destination Internet Protocol address included in the first downlink data packet and said first identifier included in the first information; and
wherein said first identifier for the first user equipment device is a first Internet Protocol address being used by the first user equipment device, said destination Internet Protocol address included in the first downlink data packet matching the first Internet Protocol address being used by the first user equipment device.

4. The communications method of claim 3, further comprising:
receiving second information, at the CMTS, from the first wireless base station via the cable modem located on the communications path between the first wireless base station and the CMTS, said second information including a second identifier for a second user equipment device to which the first wireless base station is actively providing services and a wireless base station downlink data buffer size for the second user equipment device;
creating, at the CMTS, a second CMTS downlink data buffer for the second user equipment device using said second information;
receiving, at the CMTS, a second downlink data packet for the second user equipment device; and
storing said received second downlink data packet in said second CMTS downlink data buffer.

5. The communications method of claim 4, further comprising:
prior to storing said received second downlink data packet in said second CMTS downlink data buffer:
(i) determining from the second downlink data packet, by the CMTS, a user equipment device to which the second downlink data packet has been sent; and
(ii) determining, by the CMTS, which CMTS downlink data buffer from the plurality of CMTS downlink data buffers at the CMTS corresponds to the determined user equipment device to which the second downlink data packet has been sent, said plurality of CMTS downlink data buffers including the first CMTS downlink data buffer and the second CMTS downlink data buffer.

6. The communications method of claim 5,
wherein said determining from the second downlink data packet, by the CMTS, the user equipment device to which the second downlink data packet has been sent includes: identifying the user equipment device to which the second downlink data packet has been sent based on a destination Internet Protocol address included in the second downlink data packet and said second identifier included in the second information; and
wherein said second identifier for the second user equipment device is a second Internet Protocol address being used by the second user equipment device, said destination Internet Protocol address included in the second downlink data packet matching the second Internet Protocol address being used by the second user equipment device, said second Internet Protocol address being different than said first Internet Protocol address.

7. The communications method of claim 1, further comprising:
maintaining the first downlink data packet in said first CMTS downlink data buffer until the CMTS makes a determination that a wireless base station downlink data buffer at the first wireless base station corresponding to the first user equipment device to which the first downlink data packet has been sent has available capacity to store the first downlink data packet.

8. The communications method of claim 7, further comprising:
receiving a buffer status report at the CMTS from the first wireless base station, said buffer status report including information from which the available capacity of the wireless base station downlink data buffer, being used to store downlink data for the first user equipment device at the first wireless base station, can be determined; and
wherein said CMTS makes said determination that the wireless base station downlink data buffer at the first wireless base station corresponding to the first user equipment device to which the first downlink data packet has been sent has available capacity to store the first downlink data packet based on said received buffer status report.

9. The communications method of claim 8,
wherein the buffer status report includes: (i) an identifier for the user equipment device to which the buffer status report corresponds, said identifier being the identifier for the first user equipment device included in the first information, and (ii) an amount of buffer capacity corresponding to the wireless base station downlink data buffer being used for data storage at the first wireless base station for the first user equipment device.

10. The communications method of claim 9, further comprising:
determining by the CMTS the amount of available downlink data buffer capacity at the first wireless base station for downlink data for the first user equipment device having the identifier to which the buffer status report corresponds by subtracting the amount of buffer capacity corresponding to the wireless base station downlink data buffer being used for data storage at the first wireless base station for the first user equipment device from the wireless base station downlink data buffer size corresponding to the first user equipment device.

11. The communications method of claim 7, further comprising:
receiving a buffer status report at the CMTS from the first wireless base station, said buffer status report including the first identifier and information indicating the available capacity of the wireless base station downlink data buffer, being used to store downlink data for the first user equipment device at the first wireless base station; and in response to receiving the buffer status report at the CMTS from the first wireless base station, scheduling the transmission of the stored first downlink data packet to the first wireless base station based on the indicated available buffer capacity at the first wireless base station for storing downlink data corresponding to the first user equipment device.

12. A cable modem termination system (CMTS) comprising:
one or more receivers;
one or more transmitters;
memory, and
one or more processors or processing circuitry that controls the CMTS to perform the following operations:
receiving first information, at the CMTS, from a first wireless base station via a cable modem located on a communications path between the first wireless base station and the CMTS, said first information including a first identifier for a first user equipment device to which the first wireless base station is actively providing services and a wireless base station downlink data buffer size for the first user equipment device;
creating, at the CMTS, a first CMTS downlink data buffer for the first user equipment device;
receiving, at the CMTS, a first downlink data packet for the first user equipment device; and
storing said received first downlink data packet in said first CMTS downlink data buffer.

13. The cable modem termination system of claim 12, wherein the one or more processors or processing circuitry further controls the CMTS to perform the following additional operations:
prior to storing said received first downlink data packet in said first CMTS downlink data buffer:
(i) determining from the first downlink data packet, by the CMTS, a user equipment device to which the first downlink data packet has been sent; and
(ii) determining, by the CMTS, which CMTS downlink data buffer from a plurality of CMTS downlink data buffers at the CMTS corresponds to the determined user equipment device to which the first downlink data packet has been sent.

14. The cable modem termination system of claim 13, wherein said determining from the first downlink data packet, by the CMTS, the user equipment device to which the first downlink data packet has been sent includes: identifying the user equipment device to which the first downlink data packet has been sent based on a destination Internet Protocol address included in the first downlink data packet and said first identifier included in the first information; and
wherein said first identifier for the first user equipment device is a first Internet Protocol address being used by the first user equipment device, said destination Internet Protocol address included in the first downlink data packet matching the first Internet Protocol address being used by the first user equipment device.

15. The cable modem termination system of claim 14, wherein the one or more processors or processing circuitry further controls the CMTS to perform the following additional operations:

receiving second information, at the CMTS, from the first wireless base station via the cable modem located on the communications path between the first wireless base station and the CMTS, said second information including a second identifier for a second user equipment device to which the first wireless base station is actively providing services and a wireless base station downlink data buffer size for the second user equipment device;
creating, at the CMTS, a second CMTS downlink data buffer for the second user equipment device using said second information;
receiving, at the CMTS, a second downlink data packet for the second user equipment device; and
storing said received second downlink data packet in said second CMTS downlink data buffer.

16. The cable modem termination system of claim 15, wherein the one or more processors or processing circuitry further controls the CMTS to perform the following additional operations:
prior to storing said received second downlink data packet in said second CMTS downlink data buffer:
(i) determining from the second downlink data packet, by the CMTS, a user equipment device to which the second downlink data packet has been sent; and
(ii) determining, by the CMTS, which CMTS downlink data buffer from the plurality of CMTS downlink data buffers at the CMTS corresponds to the determined user equipment device to which the second downlink data packet has been sent, said plurality of CMTS downlink data buffers including the first CMTS downlink data buffer and the second CMTS downlink data buffer.

17. The cable modem termination system of claim 16, wherein said determining from the second downlink data packet, by the CMTS, the user equipment device to which the second downlink data packet has been sent includes: identifying the user equipment device to which the second downlink data packet has been sent based on a destination Internet Protocol address included in the second downlink data packet and said second identifier included in the second information; and
wherein said second identifier for the second user equipment device is a second Internet Protocol address being used by the second user equipment device, said destination Internet Protocol address included in the second downlink data packet matching said second Internet Protocol address being used by the second user equipment device, said second Internet Protocol address being different than said first Internet Protocol address.

18. The cable modem termination system of claim 12, wherein the one or more processors or processing circuitry further controls the CMTS to perform the following additional operation:
maintaining the first downlink data packet in said first CMTS downlink data buffer until the CMTS makes a determination that a wireless base station downlink data buffer at the first wireless base station corresponding to the first user equipment device to which the first downlink data packet has been sent has available capacity to store the first downlink data packet.

19. The cable modem termination system of claim 18, wherein the one or more processors or processing circuitry further controls the CMTS to perform the following additional operations:

receiving a buffer status report at the CMTS from the first wireless base station, said buffer status report including information from which the available capacity of the wireless base station downlink data buffer, being used to store downlink data for the first user equipment device at the first wireless base station, can be determined; and wherein said CMTS makes said determination that the wireless base station downlink data buffer at the first wireless base station corresponding to the first user equipment device to which the first downlink data packet has been sent has available capacity to store the first downlink data packet based on said received buffer status report.

20. A non-transitory computer readable medium including a first set of computer executable instructions which when executed by a processor of a cable modem termination system (CMTS) cause the CMTS to perform the steps of:

receiving first information, at the CMTS, from a first wireless base station via a cable modem located on a communications path between the first wireless base station and the CMTS, said first information including a first identifier for a first user equipment device to which the first wireless base station is actively providing services and a wireless base station downlink data buffer size for the first user equipment device;

creating, at the CMTS, a first CMTS downlink data buffer for the first user equipment device;

receiving, at the CMTS, a first downlink data packet for the first user equipment device; and storing said received first downlink data packet in said first CMTS downlink data buffer.

\* \* \* \* \*